US012573686B2

(12) United States Patent
Li et al.

(10) Patent No.: US 12,573,686 B2
(45) Date of Patent: Mar. 10, 2026

(54) THERMAL MANAGEMENT COMPONENT, BATTERY AND POWERED DEVICE

(71) Applicant: CONTEMPORARY AMPEREX TECHNOLOGY (HONG KONG) LIMITED, Hong Kong (CN)

(72) Inventors: Xiang Li, Ningde City (CN); Shoulong Wang, Ningde City (CN); Ting Xiao, Ningde City (CN); Xiaoteng Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 334 days.

(21) Appl. No.: 18/181,573

(22) Filed: Mar. 10, 2023

(65) Prior Publication Data

US 2023/0231225 A1     Jul. 20, 2023

Related U.S. Application Data

(63) Continuation of application No. PCT/CN2021/108010, filed on Jul. 22, 2021.

(51) Int. Cl.
*H01M 10/6557* (2014.01)
*H01M 50/213* (2021.01)
(Continued)

(52) U.S. Cl.
CPC ..... *H01M 10/6557* (2015.04); *H01M 50/213* (2021.01); *H01M 10/613* (2015.04);
(Continued)

(58) Field of Classification Search
CPC ............. H01M 10/613; H01M 10/617; H01M 10/625; H01M 10/643; H01M 10/647;
(Continued)

(56) References Cited

U.S. PATENT DOCUMENTS

2003/0054255 A1    3/2003  Hidaka et al.
2004/0069620 A1*   4/2004  Bitsche .............. H01M 50/213
                                                                204/267
(Continued)

FOREIGN PATENT DOCUMENTS

CA          3157310 A1   10/2008
CN          1366717 A     8/2002
(Continued)

OTHER PUBLICATIONS

The Decision to Grant a Pate received in the counterpart Japanese application 2022-568604, mailed on Jan. 6, 2025.
(Continued)

*Primary Examiner* — Lingwen R Zeng
(74) *Attorney, Agent, or Firm* — K&L Gates LLP

(57) ABSTRACT

A thermal management component, a battery, and a powered device are provided. The thermal management component includes: a set of first heat exchange surfaces, including a plurality of first heat exchange surfaces configured to cooperate with a plurality of outer battery units located on one side of the thermal management component for temperature regulation, each of the first heat exchange surfaces being configured to cooperate with one of the outer battery units for temperature regulation; and a set of second edge heat exchange surfaces, including a plurality of second edge heat exchange surfaces configured to cooperate with a plurality of intermediate battery units located on the other side of the thermal management component for temperature regulation, each of the second edge heat exchange surfaces being configured to cooperate with one of the intermediate battery units for temperature regulation.

14 Claims, 15 Drawing Sheets

(51) Int. Cl.

| | |
|---|---|
| H01M 10/613 | (2014.01) |
| H01M 10/617 | (2014.01) |
| H01M 10/625 | (2014.01) |
| H01M 10/643 | (2014.01) |
| H01M 10/647 | (2014.01) |
| H01M 10/651 | (2014.01) |
| H01M 10/6556 | (2014.01) |
| H01M 10/6566 | (2014.01) |
| H01M 10/6568 | (2014.01) |
| H01M 50/209 | (2021.01) |
| H01M 50/249 | (2021.01) |

(52) U.S. Cl.

CPC ........ *H01M 10/617* (2015.04); *H01M 10/625* (2015.04); *H01M 10/643* (2015.04); *H01M 10/647* (2015.04); *H01M 10/651* (2015.04); *H01M 10/6556* (2015.04); *H01M 10/6566* (2015.04); *H01M 10/6568* (2015.04); *H01M 50/209* (2021.01); *H01M 50/249* (2021.01); *H01M 2220/20* (2013.01); *Y02E 60/10* (2013.01)

(58) Field of Classification Search

CPC .......... H01M 10/651; H01M 10/6554; H01M 10/6555; H01M 10/6556; H01M 10/6557; H01M 10/6566; H01M 10/6568; H01M 2220/20; H01M 50/209; H01M 50/213; H01M 50/249; Y02E 60/10

See application file for complete search history.

(56) References Cited

U.S. PATENT DOCUMENTS

| | | | |
|---|---|---|---|
| 2015/0017502 A1 | 1/2015 | Brenner et al. | |
| 2016/0372805 A1 | 12/2016 | Kim et al. | |

FOREIGN PATENT DOCUMENTS

| | | | |
|---|---|---|---|
| CN | 101290997 | A | 10/2008 |
| CN | 205960164 | U | 2/2017 |
| CN | 206422186 | U | 8/2017 |
| CN | 206505995 | U | 9/2017 |
| CN | 107369863 | A | 11/2017 |
| CN | 112397805 | A | 11/2017 |
| CN | 13150957 | U | 5/2021 |
| JP | 2002124306 | A | 4/2002 |
| JP | 2010528406 | A | 8/2010 |
| KR | 102255633 | B1 | 5/2021 |
| WO | 2019209523 | A1 | 10/2019 |
| WO | 2020094364 | A1 | 5/2020 |
| WO | 2020094366 | A1 | 5/2020 |

OTHER PUBLICATIONS

Notice of Reasons for Refusal received in the corresponding Japanese Application 2022-568604, mailed Feb. 5, 2024.

Request for the Submission of an Opinion received in the counterpart Korean Application 10-2022-7039194, mailed on Mar. 4, 2025.

International Search Report received in the corresponding International Application PCT/CN2021/108010, mailed Nov. 5, 2021.

Notice of Allowance received in the counterpart KR application 10-2022-7039194, dated Jul. 4, 2025, 8 pages with English translation.

The The partial supplementary European search report received in the counterpart European application 22827055.9, mailed on Oct. 18, 2024.

The extended European search report received in the corresponding European Application 21940014.0, mailed Feb. 21, 2024.

Office Action (with English Machine Translation), mailed Aug. 14, 2025, for corresponding Chinese Patent Application Serial No. 202180072734.9.

* cited by examiner

4-A

A-A

B-B

C—C

D-D

C-C

D-D

E-E

F - F

L-L

H-H

THERMAL MANAGEMENT COMPONENT, BATTERY AND POWERED DEVICE

CROSS-REFERENCE TO RELATED APPLICATIONS

This application is a continuation of International Application PCT/CN2021/108010, filed on Jul. 22, 2021 and entitled "THERMAL MANAGEMENT COMPONENT, BATTERY AND POWERED DEVICE", which is incorporated herein by reference in its entirety.

TECHNICAL FIELD

Embodiments of the present application relate to the field of batteries, and more particularly, to a thermal management component, a battery, and a powered device.

BACKGROUND ART

Power batteries are one of the core components of electric vehicles, and their charge and discharge are based on electrochemical reactions, so the safety, performance and life of the batteries are closely related to temperature. With the rapid development of electric vehicle technology, the power batteries have increasingly high requirements on the specific energy, the charge/discharge rate and the service life, so battery thermal management has become more and more important.

Since a battery pack of the electric vehicle is composed of a large number of battery units which are connected in series and parallel and arranged in a multi-layer array, the temperature difference between the battery units will cause inconsistent battery states, thereby affecting the overall performance of the battery pack. It is necessary to try to reduce the maximum temperature difference between the battery units. In some cases, a thermal management component is used to cool the battery units. The thermal management component is generally of a hollow plate-like structure. The interior of the thermal management component is configured to receive a flowable heat exchange fluid, and the battery units are cooled by the heat exchange fluid. The battery units are arranged in multiple layers, and one side of each layer of battery units cooperates with one side of one liquid cooling plate for heat exchange, or a liquid cooling plate is provided on either side of each layer of battery units so as to realize the combination of multiple thermal management components and multiple layers of batteries to form a battery, which has a large overall volume. In this case, how to improve the space adaptability of the battery to meet the requirements of different usage situations is a technical problem that needs to be solved urgently in the battery technology.

SUMMARY OF THE INVENTION

The embodiments of the present application provide a thermal management component, a battery, a powered device, a preparation method and a device, which can improve the space adaptability of the battery.

According to a first aspect of the present application, there is provided a thermal management component, comprising a set of first heat exchange surfaces and a set of second edge heat exchange surfaces. The set of first heat exchange surfaces comprise a plurality of first heat exchange surfaces configured to cooperate with a plurality of outer battery units located on one side of the thermal management component for temperature regulation, each of the first heat exchange surfaces being configured to cooperate with one of the outer battery units for temperature regulation; and the set of second edge heat exchange surfaces comprise a plurality of second edge heat exchange surfaces configured to cooperate with a plurality of intermediate battery units located on the other side of the thermal management component for temperature regulation, each of the second edge heat exchange surfaces being configured to cooperate with one of the intermediate battery units for temperature regulation, wherein the heat exchange area of each of the first heat exchange surfaces is a first heat exchange area S1, and the heat exchange area of each of the second edge heat exchange surfaces is a second heat exchange area S2, the first heat exchange area S1 being greater than the second heat exchange area S2.

In this embodiment, the thermal management component has two sets of heat exchange surfaces with different heat exchange areas, which can be flexibly used with the battery units, so that two thermal management components are arranged on two sides of one layer of intermediate battery units, and each intermediate battery unit of one layer of intermediate battery units exchanges heat with two second edge heat exchange surfaces with a smaller heat exchange area of the two thermal management components; and each outer battery unit of one layer of outer battery units can exchange heat with a first heat exchange surface with a larger heat exchange area of one of the thermal management components, such that the intermediate battery units and the outer battery units achieve substantially the same heat exchange effect. The thermal management component of this embodiment can meet the requirements of uniform heat exchange for batteries having odd-numbered layers of battery units and batteries having even-numbered layers of battery units, and can adjust the thickness of the battery more flexibly, so that the space adaptability of the battery can be enhanced, the grouping flexibility of the battery can be improved.

In some embodiments, a first heat exchange flow channel is formed in the thermal management component and is configured to provide a movement path of the heat exchange fluid; the thermal management component comprises a first side plate and a second side plate arranged opposite the first side plate, and the first heat exchange flow channel is formed between the first side plate and the second side plate, wherein the set of first heat exchange surfaces are formed on the first side plate, and the heat exchange fluid passes over the first heat exchange surfaces to perform temperature regulation on the outer battery units; and the set of second edge heat exchange surfaces are formed on the second side plate, and the heat exchange fluid also passes over the second edge heat exchange surfaces to perform temperature regulation on the intermediate battery units.

In this embodiment, the two sets of heat exchange surfaces with different heat exchange areas are respectively formed on the first side plate and the second side plate, and the first heat exchange flow channel is formed between the first side plate and the second side plate and is configured to provide the movement path of the heat exchange fluid, so that the heat exchange fluid can exchange heat with the battery units through the first heat exchange surfaces and the second edge heat exchange surfaces, and continuous temperature regulation of the battery units can be achieved by means of the circulating flow of the heat exchange fluid.

In some embodiments, a first side flow channel is formed in the first side plate, and a portion of the first side flow channel that cooperates with a plurality of the outer battery units forms a plurality of the first heat exchange surfaces; a second side flow channel is formed in the second side plate, and a portion of the second side flow channel that cooperates with a plurality of the intermediate battery units forms a plurality of the second edge heat exchange surfaces; and the first side flow channel cooperates with the second side flow channel to form the first heat exchange flow channel.

In this embodiment, the side flow channels are respectively formed in the first side plate and the second side plate, the first heat exchange surfaces and the second edge heat exchange surfaces are respectively formed on the side flow channels, and the first side flow channel and the second side flow channel are combined to form the first heat exchange flow channel, so that the first heat exchange surfaces and the second edge heat exchange surfaces can exchange heat with the heat exchange fluid in the common first heat exchange flow channel, and the first heat exchange surfaces have a better heat exchange effect than the second edge heat exchange surfaces by setting the heat exchange areas thereof differently.

In some embodiments, one first side flow channel is provided, a portion of the first side flow channel that cooperates with one of the outer battery units forms the one of the first heat exchange surfaces, and the first heat exchange area S1 is the surface area of the first heat exchange surface; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet; each of the second edge heat exchange surfaces comprises a plurality of second edge heat exchange facets; and the second heat exchange area S2 is the sum of the surface areas of the plurality of second edge heat exchange facets.

In this embodiment, one first side flow channel is provided, the second side flow channel is divided into a plurality of second side branch flow channels, and the second heat exchange area is the sum of the surface areas of the plurality of second edge heat exchange facets of the plurality of second side branch flow channels. By adjusting the surface area and the number of second edge heat exchange facets, not only can the second heat exchange area be smaller than the first heat exchange area, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved, and the uniformity of heat exchange can be improved.

In some embodiments, the first side flow channel and the plurality of second side branch flow channels are in communication with each other to form the heat exchange flow channel.

In this embodiment, by configuring the first side flow channel and the plurality of second side branch flow channels to be in communication with each other, the heat exchange fluid in the heat exchange flow channel can exchange heat with both the first side plate and the second side plate, simplifying the design of the heat exchange flow channel and facilitating the manufacture of the thermal management component.

In some embodiments, each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the width of the first heat exchange surface; the second heat exchange width W2 is the sum of the widths of the plurality of second edge heat exchange facets; and the ratio of the second heat exchange width W2 to the first heat exchange width W1 is between 0.1-0.9.

In this embodiment, the ratio adjustment of the first heat exchange area S1 and the second heat exchange area S2 is realized by adjusting the ratio of the first heat exchange width W1 of the first heat exchange surfaces to the second heat exchange width W2 of the second edge heat exchange surfaces. The adjustment of the second heat exchange width W2 of the second edge heat exchange surfaces is realized by adjusting the width and the number of second edge heat exchange facets. Through the control of the ratio of the first heat exchange width W1 to the second heat exchange width W2, the ratio adjustment of the first heat exchange area S1 and the second heat exchange area S2 can be simply realized.

In some embodiments, the first side flow channel comprises a plurality of first side branch flow channels arranged in parallel perpendicular to a flow direction of the heat exchange fluid, and a part of each first side branch flow channel that cooperates with one of the outer battery units forms a first heat exchange facet; each of the first heat exchange surfaces comprises a plurality of first heat exchange facets; the first heat exchange area S1 is the sum of the surface areas of the plurality of first heat exchange facets; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet; each of the second edge heat exchange surfaces comprises a plurality of second edge heat exchange facets; and the second heat exchange area S2 is the sum of the surface areas of the plurality of second edge heat exchange facets.

In this embodiment, the first side flow channel is divided into a plurality of first side branch flow channels, and the first heat exchange area is the sum of the surface areas of the plurality of first heat exchange facets; and the second side flow channel is divided into a plurality of second side branch flow channels, and the second heat exchange area is the sum of the surface areas of the second edge heat exchange facets of the plurality of second side branch flow channels. By adjusting the surface areas and the numbers of first heat exchange facets and second edge heat exchange facets, not only can the second heat exchange area S2 be smaller than the first heat exchange area S1, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved.

In some embodiments, the first heat exchange flow channel comprises a plurality of flow sub-channels arranged in parallel perpendicular to the flow direction of the heat exchange fluid, each flow sub-channel comprises at least one of the first side branch flow channels and at least one of the second side branch flow channels, and the first and second side branch flow channels constituting one of the flow sub-channels are in communication with each other.

In this embodiment, by configuring part of the first side branch flow channel and the plurality of second side branch flow channels to be in communication with each other, the first heat exchange flow channel is divided into a plurality of flow sub-channels, and the heat exchange fluid in each flow sub-channel can exchange heat with both the first side plate and the second side plate, simplifying the design of the first heat exchange flow channel and facilitating the manufacture of the thermal management component.

In some embodiments, each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the sum of the widths of the plurality of first heat exchange facets, and the second heat exchange width W2 is the sum of the widths of the plurality of second edge heat exchange facets; and the ratio of the second heat exchange width W2 to the first heat exchange width W1 is between 0.1-0.9.

In this embodiment, the ratio adjustment of the first heat exchange area and the second heat exchange area is realized by adjusting the ratio of the first heat exchange width W1 of the first heat exchange surfaces to the second heat exchange width W2 of the second edge heat exchange surfaces. The adjustment of the first heat exchange width W1 of the first heat exchange surfaces is realized by adjusting the width and the number of first heat exchange facets, and the adjustment of the second heat exchange width W2 of the second edge heat exchange surfaces is realized by adjusting the width and the number of second edge heat exchange facets. Through the control of the first heat exchange width W1 and the second heat exchange width ratio W2, the ratio adjustment of the first heat exchange area S1 and the second heat exchange area S2 can be simply realized.

In some embodiments, a first turbulator portion is further comprised, which is arranged in the first side flow channel and/or in the second side flow channel and configured to generate a turbulent flow of the heat exchange fluid flowing through the first side flow channel and/or the second side flow channel.

In this embodiment, by arranging the first turbulator portion in the first side flow channel and/or the second side flow channel, the turbulence of the heat exchange fluid flowing through the first side flow channel and/or the second side flow channel can be caused, so that the temperature of the heat exchange fluid is uniform, and the temperature regulation of the battery units is more uniform.

In some embodiments, the first turbulator portion is arranged at a portion of the first side flow channel that does not cooperate with any of the outer battery units, and/or the first turbulator portion is arranged at a portion of the second side flow channel that does not cooperate with any of the intermediate battery units.

In this embodiment, if the first turbulator portion is arranged at a portion cooperating with a battery unit, the first turbulator portion may occupy the surface area of the first heat exchange surface and/or the second edge heat exchange surface, thereby affecting the heat exchange effect. By arranging the first turbulator portion at a portion that does not cooperate with any of the battery units, the first turbulator portion will not affect the first heat exchange area S1 and the second heat exchange area S2, and can create a turbulent flow at the downstream first heat exchange surface and/or second edge heat exchange surface, so that the temperature distribution of the heat exchange fluid is more uniform, the heat exchange coefficient is increased, the heat exchange between the heat exchange fluid and the battery units is enhanced, and the heat exchange efficiency is increased.

In some embodiments, the ratio of the second heat exchange area S2 to the first heat exchange area S1 is between 0.1-0.9.

In this embodiment, the ratio of the second heat exchange area S2 to the first heat exchange area S1 is between 0.1 and 0.9, and the change in the ratio of the second heat exchange area S2 to the first heat exchange area S1 can be adjusted according to the different heat exchange performance requirements of the battery units on two sides of the thermal management component, so as to meet the heat exchange performance requirements of different battery units.

In some embodiments, each of the first heat exchange surfaces is arranged in a width direction of the thermal management component, and the set of first heat exchange surfaces are arranged in a length direction of the thermal management component; and each of the second edge heat exchange surfaces is arranged in the width direction of the thermal management component, and the set of second edge heat exchange surfaces are arranged in the length direction of the thermal management component.

In this embodiment, the first heat exchange surfaces and the second edge heat exchange surfaces are arranged in the width direction of the thermal management component, so that the outer battery units and the intermediate battery units are arranged on the first side plate and the second side plate of the thermal management component in such a way that the length directions of the outer battery units and the intermediate battery units are consistent with the width direction of the thermal management component. The set of first heat exchange surfaces and the set of second edge heat exchange surfaces are both arranged in the length direction of the thermal management component, so that multiple rows of outer battery units and intermediate battery units can be arranged in the length direction of the thermal management component to enable one thermal management component to exchange heat with a plurality of outer battery units and a plurality of intermediate battery units.

In a second aspect, there is provided a battery, comprising at least three layers of battery units and a temperature regulation system. The at least three layers of battery units comprises two layers of outer battery units and at least one layer of intermediate battery units, the at least one layer of intermediate battery units being located between the two layers of outer battery units, and each layer of outer battery units and each layer of intermediate battery units respectively comprising a plurality of battery units; the temperature regulation system is configured to exchange heat with the outer battery units and with the intermediate battery units; the temperature regulation system comprises two sets of first heat exchange surfaces and a plurality of sets of second heat exchange surfaces, each set of first heat exchange surfaces comprising a plurality of the first heat exchange surfaces, and each set of second heat exchange surfaces comprising a plurality of the second heat exchange surfaces; the first heat exchange surfaces and the second heat exchange surfaces are capable of exchanging heat with a heat exchange fluid inside the temperature regulation system, wherein the temperature regulation system is configured such that a set of side faces of each layer of outer battery units cooperate with a set of first heat exchange surfaces for temperature regulation, wherein a side face of each outer battery unit cooperates with one of the first heat exchange surfaces for temperature regulation, and each of the first heat exchange surfaces has a first heat exchange area S1; each layer of intermediate battery units is arranged between two sets of second heat exchange surfaces, and two sets of opposite side faces of each layer of intermediate battery units respectively cooperate with an adjacent set of second heat exchange surfaces for temperature regulation; two opposite side faces of each intermediate battery unit respectively cooperate with an adjacent second heat exchange surface for temperature regulation; and the first heat exchange area S1 is greater than the heat exchange area of the second heat exchange surface.

In this embodiment, the temperature regulation system comprises two sets of first heat exchange surfaces and a plurality of sets of second heat exchange surfaces, and exchanges heat with two layers of outer battery units and at least one layer of intermediate battery units, wherein a side face of each layer of outer battery units exchanges heat with a set of first heat exchange surfaces, that is, each outer battery unit exchanges heat with the temperature regulation system through the first heat exchange area S1; and two opposite side faces of each layer of intermediate battery units respectively exchange heat with an adjacent set of second heat exchange surfaces, that is, each intermediate battery unit exchanges heat with the temperature regulation system through the heat exchange area of the two second heat exchange surfaces. Furthermore, the construction of a battery with odd-numbered layers of battery units and a battery with even-numbered layers of battery units can be realized, the number of layers and the thickness of the battery can be designed more freely, and the battery has a better space adaptability. In addition, since the first heat exchange area is greater than the heat exchange area of the second heat exchange surface, it is possible to freely adjust the cooling effects of the intermediate battery units and the outer battery units. By changing the ratio of the first heat exchange area to the heat exchange area of the second heat exchange surface, the outer battery units and the intermediate battery units can obtain a relatively close cooling effect, reducing the temperature difference between the battery units, making the battery states thereof consistent, and improving the overall performance of the battery.

In some embodiments, the ratio of the heat exchange area of the second heat exchange surface to the first heat exchange area S1 is between 0.1-0.9. In this embodiment, the ratio of twice the heat exchange area of the second heat exchange surface to one first heat exchange area is between 0.2-1.8, so that the cooling area of the intermediate battery units and the outer battery units can be freely adjusted between 0.2-1.8.

In some embodiments, three layers of battery units are provided, comprising two layers of outer battery units and one layer of intermediate battery units; the temperature regulation system comprises two edge thermal management components in each of which a first heat exchange flow channel is formed, the heat exchange flow channel being configured to provide a movement path of the heat exchange fluid; the edge thermal management component comprises a first side plate and a second side plate that are arranged opposite to each other; a set of the first heat exchange surfaces are formed on the first side plate; the plurality of sets of second heat exchange surfaces comprise two sets of second edge heat exchange surfaces, each set of second edge heat exchange surfaces comprising a plurality of second edge heat exchange surfaces; a set of the second edge heat exchange surfaces are formed on each of the second side plates of the two edge thermal management components; each of the second edge heat exchange surfaces has a second heat exchange area S2; the two second side plates of the two edge thermal management components are adjacent to each other, and the two first side plates are opposite to each other; a layer of the outer battery units is arranged on each of the first side plates of the two edge thermal management components, and a side face of each of the outer battery units cooperates with a corresponding one of the first heat exchange surfaces; and a layer of the intermediate battery units is arranged between the two edge thermal management components, and two opposite side faces of each of the intermediate battery units respectively cooperate with one of the second edge heat exchange surfaces of the two edge thermal management components.

In this embodiment, the temperature regulation system comprises two edge thermal management components, and a set of first heat exchange surfaces is formed on the first side plate of each edge thermal management component; and the plurality of sets of second heat exchange surfaces comprise two sets of second edge heat exchange surfaces, and a set of second edge heat exchange surfaces are formed on each of the second side plates of the two edge thermal management components. The two layers of outer battery units respectively cooperate with a set of the first heat exchange surfaces of the two edge thermal management components, a layer of intermediate battery units is arranged between the two edge thermal management components, and the two opposite side faces of each intermediate battery unit respectively cooperate with one of the second edge heat exchange surfaces of the two edge thermal management components. The heat exchange of three layers of battery units is realized by means of two edge thermal management components. The number of thermal management components is reduced while realizing the arrangement of odd-numbered layers of battery units, the structure is more compact, the overall thickness is reduced, and the space adaptability is better.

In some embodiments, the ratio of the second heat exchange area S2 to the first heat exchange area S1 is between 0.1-0.9. In this embodiment, the ratio of twice the second heat exchange area 2S2 to one first heat exchange area S1 is between 0.2-1.8, so that the cooling area of the intermediate battery units and the outer battery units can be freely adjusted between 0.2-1.8.

In some embodiments, four or more layers of battery units are provided, comprising two layers of outer battery units and at least two layers of intermediate battery units; the temperature regulation system comprises two edge thermal management components in each of which a first heat exchange flow channel is formed, the first heat exchange flow channel being configured to provide a movement path of the heat exchange fluid; the edge thermal management component comprises a first side plate and a second side plate that are arranged opposite to each other; a set of the first heat exchange surfaces are formed on the first side plate; the plurality of sets of second heat exchange surfaces comprise two sets of second edge heat exchange surfaces, each set of second edge heat exchange surfaces comprising a plurality of second edge heat exchange surfaces; a set of the second edge heat exchange surfaces are formed on each of the second side plates of the two edge thermal management components the plate; each of the second edge heat exchange surfaces has a second heat exchange area S2; the temperature regulation system further comprises at least one intermediate thermal management component in each of which a second heat exchange flow channel is formed, the second heat exchange flow channel also being configured to provide a movement path of the heat exchange fluid; each intermediate thermal management component comprises two third side plates on opposite sides; the plurality of sets of second heat exchange surfaces further comprises a plurality of sets of second intermediate heat exchange surfaces, wherein a set of the second intermediate heat exchange surfaces are formed on each of the third side plates, and each set of second intermediate heat exchange surfaces comprises a plurality of the second intermediate heat exchange surfaces; each of the second intermediate heat exchange surfaces has a third heat exchange area S3; the first heat exchange area S1 is greater than the third heat exchange area S3; the number of the intermediate thermal management components is the number of layers of the battery units minus 3; wherein the at least one intermediate thermal management component is arranged between the two edge thermal management components; the two second side plates of the two edge thermal management components are respectively adjacent to one of the third side plates of one of the intermediate thermal management components; the two first side plates of the two edge thermal management components are opposite to each other; a layer of the outer battery units is arranged on each of the first side plates of the two edge thermal management components, and each of the outer battery units cooperates with one of the first heat exchange surfaces of the corresponding first side plate; wherein a layer of intermediate battery units is arranged between each of the edge thermal management components and an adjacent one of the intermediate thermal management components; in the layer of intermediate battery units cooperating with the edge thermal management component, a side face of each of the intermediate battery units cooperates with one of the second edge heat exchange surfaces of the second side face of the edge thermal management component, and a further side face of each of the intermediate battery units cooperates with one of the second intermediate heat exchange surfaces of the third side plate of the one of the intermediate thermal management components, and/or a layer of intermediate battery units is further arranged between every two adjacent intermediate thermal management components, and in a layer of intermediate battery units cooperating with the intermediate thermal management components on two sides, two side faces of each of the intermediate battery units respectively cooperate with one of the second intermediate heat exchange surfaces of the opposite third side plates of the two intermediate thermal management components.

In this embodiment, four or more layers of battery units are provided, comprising two layers of outer battery units and at least two layers of intermediate battery units. The temperature regulation system comprises two first thermal management components and at least one second thermal management component, a set of second intermediate heat exchange surfaces are formed on each of the two third side plates of the second thermal management component, the second intermediate heat exchange surfaces also belong to the second heat exchange surfaces, the second intermediate heat exchange surface has a third heat exchange area S3, and the third heat exchange area S3 is also smaller than the first heat exchange area S1. In this way, the first heat exchange surfaces of the first thermal management component is used for cooling a single side of the outer battery units, and heat exchange of a layer of intermediate battery units adjacent to the first thermal management component is performed jointly by the second edge heat exchange surfaces of the second side face of the edge thermal management component and the second intermediate heat exchange surfaces of the third side plates of one of the intermediate thermal management components. The two side faces of the remaining layers of intermediate battery units cooperate with the second intermediate heat exchange surfaces of the opposite third side plates of the two intermediate thermal management components on two sides for heat exchange. In this way, a battery arrangement structure of any number of layers of intermediate battery units plus two layers of outer battery units can be realized, and the number of thermal management components is one less than the number of layers of battery units, so that the number of thermal management components is reduced, the structure is more compact, the overall thickness is reduced, and the space adaptability is better.

In some embodiments, the ratio of the third heat exchange area S3 to the first heat exchange area S1 is between 0.1-0.9, and/or the ratio of the sum of the second heat exchange area S2 and the third heat exchange area S3 to the first heat exchange area S1 is between 0.2-1.8.

In this embodiment, the ratio 2S2/S1 of twice the second heat exchange area S2 to the first heat exchange area S1 is between 0.2-1.8, and/or the ratio of the sum of the second heat exchange area S2 and the third heat exchange area S3 to the first heat exchange area S1 is between 0.2-1.8, so that the ratio of the total heat exchange area for the heat exchange between the temperature regulation system and one intermediate battery unit to the heat exchange area for the heat exchange between the temperature regulation system and one outer battery unit can vary between 0.2-1.8. By changing the ratio, the outer battery units and the intermediate battery units can obtain a relatively close cooling effect, reducing the temperature difference between the battery units, making the battery states thereof consistent, and improving the overall performance of the battery.

In some embodiments, a first side flow channel is formed in the first side plate of the edge thermal management component, and a portion of the first side flow channel that cooperates with a layer of the outer battery units forms the plurality of the first heat exchange surfaces; a second side flow channel is formed in the second side plate of the edge thermal management component, and a portion of the second side flow channel that cooperates with a layer of the intermediate battery units forms the plurality of the second edge heat exchange surfaces; and the first side flow channel and the second side flow channel are combined to form the first heat exchange flow channel.

In this embodiment, the side flow channels are respectively formed in the first side plate and the second side plate of the edge thermal management component, the first heat exchange surfaces and the second edge heat exchange surfaces are formed on the side flow channels, and the first side flow channel and the second side flow channel are combined to form the first heat exchange flow channel, so that the first heat exchange surfaces and the second edge heat exchange surfaces can exchange heat with the heat exchange fluid in the common first heat exchange flow channel, and the first heat exchange surfaces have a better heat exchange effect than the second edge heat exchange surfaces by means of the different heat exchange areas thereof.

In some embodiments, one first side flow channel is provided, a portion of the first side flow channel that cooperates with one of the outer battery units forms the one of the first heat exchange surfaces, and the first heat exchange area S1 is the surface area of the first heat exchange surface; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet; the one of the second edge heat exchange surfaces comprises a plurality of second edge heat exchange facets cooperating with one of the intermediate battery units; and the second heat exchange area S2 is the sum of the surface areas of the plurality of second edge heat exchange facets.

In this embodiment, one first side flow channel is provided, the second side flow channel is divided into a plurality of second side branch flow channels, and the second heat exchange area is the sum of the surface areas of the second edge heat exchange facets of the plurality of second side branch flow channels. By adjusting the surface area and the number of second edge heat exchange facets, not only can the second heat exchange area be smaller than the first heat exchange area, but also the ratio relationship between the second heat exchange area and the first heat exchange area can be accurately adjusted, and an appropriate ratio of the second heat exchange area to the first heat exchange area can be determined according to actual requirements, so that more accurate heat exchange control is achieved.

In some embodiments, the first side flow channel and the plurality of second side branch flow channels are in communication with each other to form the first heat exchange flow channel.

In this embodiment, by configuring the first side flow channel and the plurality of second side branch flow channels to be in communication with each other, the heat exchange fluid in the first heat exchange flow channel can exchange heat with both the first side plate and the second side plate, simplifying the design of the first heat exchange flow channel and facilitating the manufacture of the edge thermal management component.

In some embodiments, the first side flow channel comprises a plurality of first side branch flow channels, and a part of each first side branch flow channel that cooperates with one of the outer battery units forms a first heat exchange facet; one of the first heat exchange surfaces comprises a plurality of first heat exchange facets cooperating with one of the outer battery units; the first heat exchange area S1 is the sum of the surface areas of the plurality of first heat exchange facets; the second side flow channel comprises a plurality of second side branch flow channels arranged at intervals, and a part of each second side branch flow channel that cooperates with one of the intermediate battery units forms a second edge heat exchange facet; the one of the second edge heat exchange surfaces comprises a plurality of second edge heat exchange facets cooperating with one of the intermediate battery units; and the second heat exchange area S2 is the sum of the surface areas of the plurality of second edge heat exchange facets.

In some embodiments, each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the width of the portion of the first side flow channel that cooperates with one of the outer battery units; the second heat exchange width W2 is the sum of the widths of the plurality of second edge heat exchange facets; and the ratio of the second heat exchange width W2 to the first heat exchange width W1 is between 0.1-0.9.

In this embodiment, the ratio of the first heat exchange area to the second heat exchange area is obtained by adjusting the ratio of the first heat exchange width W1 of the first heat exchange surfaces to the second heat exchange width W2. The adjustment of the second heat exchange width W2 of the second edge heat exchange surfaces is realized by adjusting the width and the number of second edge heat exchange facets. Through the control of the ratio of the first heat exchange width W1 to the second heat exchange width W2, the ratio adjustment of the first heat exchange area S1 and the second heat exchange area S2 can be simply realized.

In some embodiments, the first side flow channel comprises a plurality of first side branch flow channels arranged in parallel perpendicular to a flow direction of the heat exchange fluid, and a part of each first side branch flow channel that cooperates with one of the outer battery units forms a first heat exchange facet; each of the first heat exchange surfaces comprises a plurality of first heat exchange facets cooperating with one of the outer battery units; the first heat exchange area S1 is the sum of the surface areas of the plurality of first heat exchange facets; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet; each of the second edge heat exchange surfaces comprises a plurality of second edge heat exchange facets cooperating with one of the intermediate battery units; and the second heat exchange area S2 is the sum of the surface areas of the plurality of second edge heat exchange facets.

In this embodiment, the first side flow channel is divided into a plurality of first side branch flow channels, and the first heat exchange area S1 is the sum of the surface areas of the plurality of first heat exchange facets; and the second side flow channel is divided into a plurality of second side branch flow channels, and the second heat exchange area S2 is the sum of the surface areas of the second edge heat exchange facets of the plurality of second side branch flow channels. By adjusting the surface areas and the numbers of first heat exchange facets and second edge heat exchange facets, not only can the second heat exchange area S2 be smaller than the first heat exchange area S1, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved.

In some embodiments, each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the sum of the widths of the plurality of first heat exchange facets, and the second heat exchange width W2 is the sum of the widths of the plurality of second edge heat exchange facets; and the ratio of the second heat exchange width W2 to the first heat exchange width W1 is between 0.1-0.9.

In this embodiment, the ratio of the first heat exchange area S1 to the second heat exchange area S2 is obtained by adjusting the ratio of the first heat exchange width W1 of the first heat exchange surfaces to the second heat exchange width W2 of the second edge heat exchange surfaces. The adjustment of the first heat exchange width W1 of the first heat exchange surfaces is realized by adjusting the width and the number of first heat exchange facets, and the adjustment of the second heat exchange width W2 of the second edge heat exchange surfaces is realized by adjusting the width and the number of second edge heat exchange facets. Through the control of the ratio of the first heat exchange width W1 to the second heat exchange width W2, the ratio adjustment of the first heat exchange area S1 and the second heat exchange area S2 can be simply realized.

In some embodiments, the first heat exchange flow channel comprises a plurality of first flow sub-channels arranged in parallel perpendicular to the flow direction of the heat exchange fluid, each first flow sub-channel comprises at least one of the first side branch flow channels and at least one of the second side branch flow channels, and the first and second side branch flow channels constituting one of the first flow sub-channels are in communication with each other.

In this embodiment, by configuring the first side branch flow channel and the plurality of second side branch flow channels to be in communication with each other, the first heat exchange flow channel is divided into a plurality of branch flow channels, and the heat exchange fluid in each branch flow channel can exchange heat with both the first side plate and the second side plate, simplifying the design of the first heat exchange flow channel and facilitating the manufacture of the thermal management component.

In some embodiments, the edge thermal management component further comprises a first turbulator portion, which is arranged in the first side flow channel and/or in the second side flow channel and configured to generate a turbulent flow of the heat exchange fluid flowing through the first side flow channel and/or the second side flow channel.

In this embodiment, by arranging the first turbulator portion in the first side flow channel and/or the second side flow channel, the turbulence of the heat exchange fluid flowing through the first side flow channel and/or the second side flow channel can be caused, so that the heat exchange effect of the heat exchange fluid is improved.

In some embodiments, the first turbulator portion is arranged at a portion of the first side flow channel that does not cooperate with any of the outer battery units, and/or the first turbulator portion is arranged at a portion of the second side flow channel that does not cooperate with any of the intermediate battery units.

In this embodiment, if the first turbulator portion is arranged at a portion cooperating with a battery unit, the first turbulator portion may occupy the surface area of the first heat exchange surface and/or the second edge heat exchange surface, thereby affecting the heat exchange effect. By arranging the first turbulator portion at a portion that does not cooperate with any of the battery units, the first turbulator portion will not affect the first heat exchange area S1 and the second heat exchange area S2, and can create a turbulent flow at the downstream first heat exchange surface and/or second edge heat exchange surface, so that the temperature distribution of the heat exchange fluid is more uniform, the heat exchange coefficient is increased, the heat exchange between the heat exchange fluid and the battery units is enhanced, and the heat exchange efficiency is increased.

In some embodiments, each of the first heat exchange surfaces is distributed in a width direction of the edge thermal management component, and each set of the first heat exchange surfaces are arranged in a length direction of the edge thermal management component; and each of the second edge heat exchange surfaces is distributed in the width direction of the edge thermal management component, and a set of the second edge heat exchange surfaces are arranged in the length direction of the first thermal management component.

In this embodiment, the first heat exchange surfaces and the second edge heat exchange surfaces are distributed in the width direction of the edge thermal management component, so that the outer battery units and the intermediate battery units are arranged on the first side plate and the second side plate of the edge thermal management component in such a way that the length directions of the outer battery units and the intermediate battery units are consistent with the width direction of the edge thermal management component. The set of first heat exchange surfaces and the set of second edge heat exchange surfaces are both arranged in the length direction of the edge thermal management component, so that multiple rows of outer battery units and intermediate battery units can be arranged in the length direction of the edge thermal management component to enable one edge thermal management component to exchange heat with a plurality of outer battery units and a plurality of intermediate battery units.

In some embodiments, a third side flow channel is formed in each of the third side plates of the intermediate thermal management component, and a portion of each of the third side flow channels that cooperates with a layer of the intermediate battery units forms a set of the second intermediate heat exchange surfaces; and the third side flow channels of the two opposite third side plates are combined to form the second heat exchange flow channel.

In this embodiment, a third side flow channel is formed in each of the third side plates of the intermediate thermal management component, and the third side flow channels on two sides are combined to form the second heat exchange flow channel, so that two second intermediate heat exchange surfaces can exchange heat with the heat exchange fluid in the common second heat exchange flow channel.

In some embodiments, the third side flow channel comprises a plurality of third side branch flow channels arranged in parallel perpendicular to the flow direction of the heat exchange fluid, and a portion of each of the third side branch flow channels that cooperates with one of the intermediate battery units forms a second intermediate heat exchange facet; each of the second intermediate heat exchange surfaces comprises a plurality of second intermediate heat exchange facets cooperating with one of the intermediate battery units, and the third heat exchange area S3 is the sum of the surface areas of the plurality of second intermediate heat exchange facets.

In this embodiment, the third side flow channel is divided into a plurality of third side branch flow channels, and the third heat exchange area S3 is the sum of the surface areas of the second intermediate heat exchange facets of the plurality of third side branch flow channels. By adjusting the surface area and the number of second intermediate heat exchange facets, not only can the third heat exchange area S3 be smaller than the first heat exchange area S1, but also the ratio relationship between the third heat exchange area S3 and the first heat exchange area S1, and between the third heat exchange area and the second heat exchange area S2 can be accurately adjusted, and an appropriate ratio of the sum of the second heat exchange area S2 and the third heat exchange area S3 to the first heat exchange area S1, and an appropriate ratio of twice the third heat exchange area S3 to the first heat exchange area S1 can be determined according to actual requirements, so that more accurate heat exchange control is achieved.

In some embodiments, the third thermal management component further comprises a second turbulator portion which is arranged in the third side flow channel and configured to generate a turbulent flow of the heat exchange fluid flowing through the third side flow channel.

In this embodiment, by arranging the second turbulator portion in the third side flow channel, the turbulence of the heat exchange fluid flowing through the third side flow channel can be caused, so that the heat exchange effect of the heat exchange fluid is improved.

In some embodiments, the second turbulator portion is arranged at a portion of the third side flow channel that does not cooperate with any of the intermediate battery units.

In this embodiment, if the second turbulator portion is arranged at a portion cooperating with an intermediate battery unit, the second turbulator portion may occupy the surface area of the second intermediate heat exchange surface, thereby affecting the heat exchange effect. By arranging the second turbulator portion at a portion that does not cooperate with any of the intermediate battery units, the second turbulator portion will not affect the third heat exchange area S3, and can create a turbulent flow at the downstream second intermediate heat exchange surface, improving the heat exchange effect.

In some embodiments, each of the second intermediate heat exchange surfaces is arranged in a width direction of the intermediate thermal management component, and the set of the second intermediate heat exchange surfaces are arranged in a length direction of the intermediate thermal management component.

In this embodiment, the second intermediate heat exchange surfaces are arranged in the width direction of the intermediate thermal management component, so that the intermediate battery units are arranged on the third side plates of the intermediate thermal management component in such a way that the length direction of the intermediate battery units is consistent with the width direction of the intermediate thermal management component. The set of second intermediate heat exchange surfaces are arranged in the length direction of the intermediate thermal management component, so that multiple rows of intermediate battery units can be arranged in the length direction of the intermediate thermal management component to enable one intermediate thermal management component to exchange heat with two layers of intermediate battery units on two sides.

In a third aspect, there is provided a powered device, comprising a battery of the second aspect.

The thermal management components, batteries and related powered devices provided by the present application can meet the requirements of uniform heat exchange for batteries having odd-numbered layers of battery units and batteries having even-numbered layers of battery units, and can adjust the thickness of the battery more flexibly, so that the space adaptability of the battery can be enhanced.

DESCRIPTION OF DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. In the drawings.

DETAILED DESCRIPTION

Figure 1:
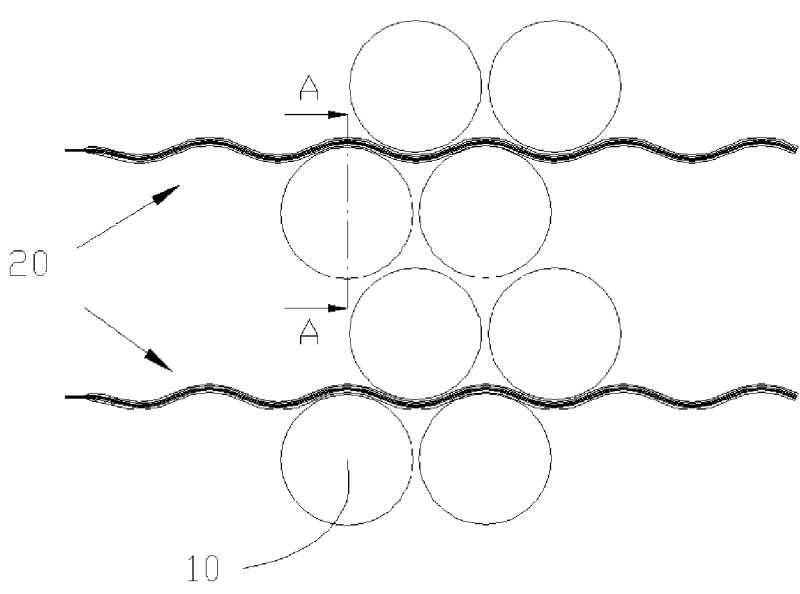
FIG. 1 is a schematic structural diagram of a battery in the prior art.

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are comprised in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that the terms "mounting", "connecting", "connection" and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In the present application, the battery unit may include a lithium ion secondary battery, a lithium ion primary battery, a lithium sulfur battery, a sodium/lithium ion battery, a sodium ion battery or a magnesium ion battery and so on, which will not be limited in the embodiments of the present application. The battery unit may be in a cylindrical shape, a flat shape, a cuboid shape or another shape, which is also not limited in the embodiments of the present application. The battery units are generally classified into three types depending on the way of package: cylindrical battery units, prismatic battery units and pouch battery units, which are also not limited in the embodiments of the present application.

The battery mentioned in the embodiments of the present application refers to a single physical module comprising one or more battery units to provide a higher voltage and capacity.

For example, the battery mentioned in the present application may include a battery module or a battery pack, etc. The battery generally comprises a case for enclosing one or more battery units. The case can prevent liquid or other foreign objects from affecting the charging or discharging of the battery unit.

In the development of the battery technology, in addition to improving the performance of the battery, the service life and safety are also the issues that cannot be ignored. If the service life of the battery does not reach an expected time, the maintenance and use of the battery will be very expensive. If the safety of the battery cannot be guaranteed, the battery cannot be used. One of the shortcomings of the battery is that its performance is greatly affected by temperature. The battery needs to work within a certain temperature range. Too low or too high temperature will cause irreversible damage to the battery, weaken the battery performance, and in severe cases cause an internal short circuit or even thermal runaway of the battery, resulting in serious accidents. Therefore, ensuring that the battery is within a suitable temperature range is a necessary condition to ensure the service life of the battery.

Compared with air cooling, the liquid-cooled battery in the prior art has a more compact structure and a better cooling effect. As shown in FIGS. 1 to 4, taking a battery unit composed of cylindrical battery units as an example, a cooling plate 20 in the form of a serpentine flat tube is usually used for cooling the battery unit 10. Upper and lower plates of the cooling plate 20 in the form of a serpentine flat tube are completely separated from each other to form a larger flow channel that can effectively cool the battery unit 10.

Figure 2:
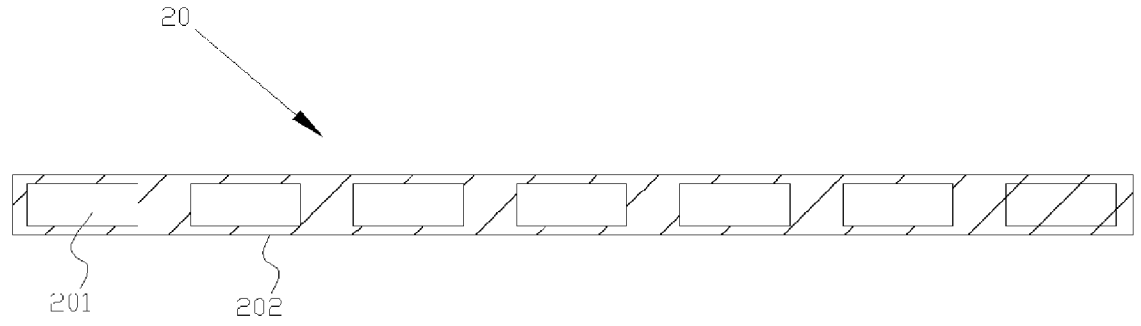
FIG. 2 is a schematic structural diagram of a thermal management component in the prior art along A-A cross section.
Figure 3:
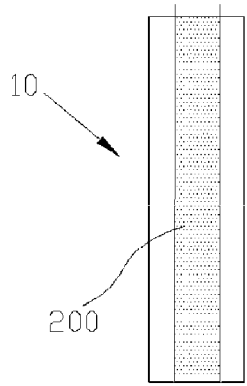
FIG. 3 is a top view of a portion of a battery unit that is in contact and exchanges heat with a thermal management component in the prior art.
Figure 4:
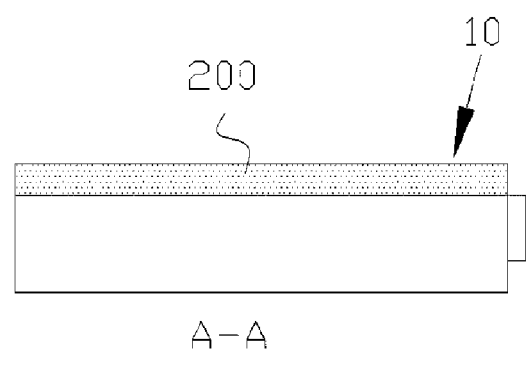
FIG. 4 is a schematic cross-sectional view, along A-A, of a portion of a battery unit that is in contact and exchanges heat with a thermal management component in the prior art.
Figure 5:
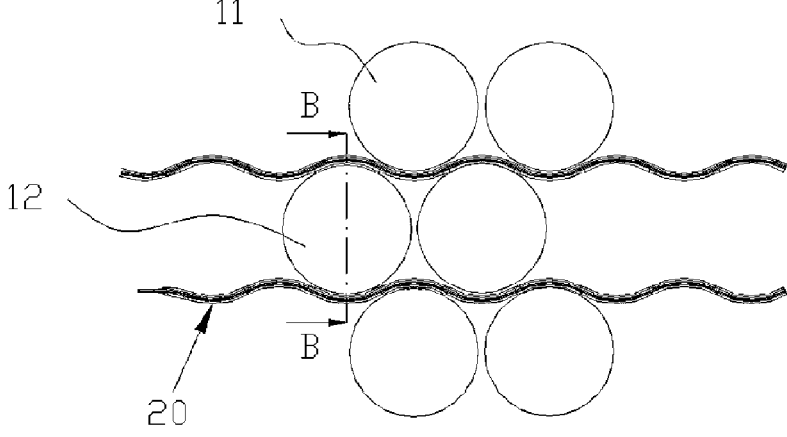
FIG. 5 is a schematic view of two thermal management components in the prior art if they jointly perform heat exchange with an intermediate layer of battery units.
Figure 6:
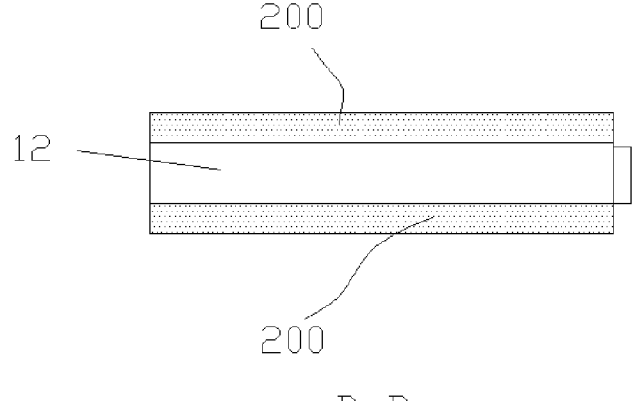
FIG. 6 is a schematic cross-sectional view, along B-B, of a portion of the intermediate layer of battery units in FIG. 5 that is in contact and exchanges heat with the thermal management components.

A schematic cross-sectional view, along A-A, of the cooling plate 20 in the prior art is shown in FIG. 2. A plurality of flow channels 201 are formed inside the cooling plate 20, and an upper side surface and a lower side surface 202 of the cooling plate 20 form a heat exchange surface 200 with the battery unit. One side face of each layer of battery units 10 is in contact with one side surface of one cooling plate for heat exchange. Schematic views of a portion of the heat exchange surface 200 of the cooling plate 20 on the battery unit 10 in the prior art that is in contact with the battery unit 10 are shown in FIGS. 3 and 4. The inventors of the present application have found that in the battery shown in FIGS. 1 to 4, one cooling plate is combined with two layers of battery units, only even-numbered layers of battery units can exist in the battery, and the thickness design of the battery is greatly limited. The space adaptability is poor. If odd-numbered layers of battery units are to be implemented, one side face of one cooling plate will not be equipped with any battery unit, resulting in a problem of waste. Alternatively, in the battery structure of three layers of battery units as shown in FIG. 5, the battery units located on the upper and lower sides have only one side face exchanging heat with a liquid cooling plate, and the battery units in the intermediate layer have upper and lower side faces both exchanging heat with the liquid cooling plates. The cooling effect of the battery units in the intermediate layer, as shown in the view B-B of FIG. 6 (the heat exchange area of the battery units in the intermediate layer in contact with the liquid cooling plates is double that of the battery units on the upper and lower sides), will be much stronger than the cooling effect of the battery units on the upper and lower sides (referring to FIG. 4), so that there is a large temperature difference between the battery units of different layers, which will cause inconsistent battery states, thereby affecting the overall performance of the battery. Therefore, the cooling plate 20 in the prior art is not suitable for cooling odd-numbered layers of battery units.

There is another battery structure (not shown in the figures) in the prior art, in which liquid cooling plates in the form of serpentine flat tubes are arranged on two sides of each layer of battery units, so that the structure of any number of layers of battery units can be implemented. However, the inventors of the present application have found that in this approach, one side of each of the two edgemost liquid cooling plates is not equipped with any battery unit, resulting in a problem of waste; and the number of liquid cooling plates is more than the number of layers of battery units, which will increase the overall thickness of the battery.

In order to solve or at least partially solve the above-mentioned problems and other potential problems of the battery in the prior art, the inventors of the present application propose a thermal management component and a battery, which can realize the combination of any number of layers of battery units while each layer of battery units is evenly cooled, and can also save space, reduce thickness, and improve the space adaptability of the battery.

The technical solutions described in the embodiments of the present application are all applicable to various devices using batteries, such as mobile phones, portable apparatuses, laptops, electromobiles, electronic toys, electric tools, electric vehicles, ships and spacecrafts. For example, the spacecrafts include airplanes, rockets, space shuttles, spaceships, etc.

The structures of thermal management components according to some embodiments of the present application are shown in FIGS. 7-17.

As shown in FIG. 1, the thermal management component mentioned in the embodiments of the present application is configured to receive a heat exchange fluid to perform temperature regulation on a plurality of battery units. The heat exchange fluid herein may be liquid or gas, and the temperature regulation refers to heating or cooling the plurality of battery units. In the case of cooling or lowering the temperature of the battery units, the thermal management component is configured to receive a cooling heat exchange fluid to lower the temperature of the plurality of battery units. In this case, the thermal management component may also be called a cooling component, a cooling system or a cooling plate, etc. The heat exchange fluid received by the thermal management component may also be called a cooling medium or a cooling heat exchange fluid, and more specifically, may be called a heat exchange fluid or a cooling gas. In addition, the thermal management component can also be used for heating to raise the temperature of the plurality of battery units, which will not be limited in the embodiments of the present application. Optionally, the heat exchange fluid may flow in a circulating manner to achieve a better temperature regulation effect. Optionally, the heat exchange fluid may be water, a mixture of water and ethylene glycol, air, a coolant, etc.

The wave shape of the thermal management component mentioned in the embodiments of the present application is a surface shape which is formed by connecting concave and convex surfaces and cooperates with the surface of the battery unit for receiving the battery unit. It should be noted herein that since the battery units may be cylindrical, flat, cuboid or in other shapes, etc., when considering other shapes of battery units, the wave shape of the thermal management component can be adaptively changed to match the surface of the battery unit. The cross-sectional shape of a heat exchange fluid channel in the thermal management component may also be adaptively changed.

The thermal management unit of the embodiments of the present application may be in direct contact with the surface of the battery unit for temperature regulation. A thermally conductive layer may also be arranged between the thermal management unit and the surface of the battery unit, and the thermal management unit is in indirect contact with the surface of the battery unit through the thermally conductive layer for temperature regulation. The thermally conductive layer has good thermal conductivity and insulation properties, facilitating heat transfer and insulation, and achieving better heat exchange while ensuring the performance of the battery unit. On the other hand, since the thermally conductive layer generally has a certain flexibility, the collision between the battery unit and the thermal management unit can be reduced. The thermally conductive layer may be made of elastic rubber, thermally conductive grease, thermally conductive silicone or other materials.

A battery cell mentioned in the embodiments of the present application may include a lithium ion secondary battery, a lithium ion primary battery, a lithium sulfur battery, a sodium/lithium ion battery, a sodium ion battery or a magnesium ion battery and so on, which will not be limited in the embodiments of the present application. The battery cell may be in a cylindrical shape, a flat shape, a cuboid shape or another shape, which is also not limited in the embodiments of the present application. The battery cells are generally classified into three types depending on the way of package: cylindrical battery units, prismatic battery units and pouch battery units, which are also not limited in the embodiments of the present application. The battery cell includes an electrode assembly and an electrolyte solution, the electrode assembly being composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and is used as a positive electrode tab. Taking a lithium ion battery as an example, the positive electrode current collector may be of a material of aluminum, and a positive electrode active material may be lithium cobalt oxide, lithium iron phosphate, ternary lithium or lithium manganate, etc. The negative electrode plate includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative electrode tab. The negative electrode current collector may be of a material of copper, and a negative electrode active material may be carbon or silicon, etc. In order to ensure that no fusing occurs when a large current passes, there are a plurality of positive electrode tabs which are stacked together, and there are a plurality of negative electrode tabs which are stacked together. The material of a separator may be PP, PE, etc. In addition, the electrode assembly may have a winding structure or a laminated structure, and the embodiments of the present application are not limited thereto.

The battery units mentioned in the embodiments of the present application refer to a plurality of battery units that are arranged on the same layer in the vertical direction when the battery is in normal use. Specifically, a plurality of battery units 11 in the same layer may be arranged in parallel in the length direction Y of the thermal management component, and one battery unit may be arranged in the width direction X of the thermal management component. Each battery unit may comprise one battery cell, or a plurality of coaxially-arranged battery cells. The plurality of battery cells of one battery unit may be electrically connected to each other, for example, may be connected in series or in parallel. Alternatively, the plurality of battery cells of one battery unit may not be electrically connected to each other. The plurality of coaxially-arranged battery cells form a row, and the axis direction thereof is parallel to the width direction X of the thermal management component. The battery units in adjacent columns of each layer of battery units may be connected in series or in parallel via a busbar. At least two layers of battery units means that the battery of the embodiments of the present application comprises at least the two layers of battery units described above that are stacked and arranged in the vertical direction, that is, may also comprise more than two layers of battery units. Of course, the battery units may also be arranged obliquely with respect to the length direction Y or the width direction X of the thermal management component, etc., which will not be limited in the present application.

The wave shape of the thermal management component mentioned in the embodiments of the present application refers to the wavy shape formed by assembling adjacent arc-shaped outer walls in the length direction Y of the thermal management component. The size of the concave and convex surfaces that form the wavy shape is defined by the distance between the battery units in adjacent columns, and the wavy shape depends on the shape of the outer surface of the battery units. The arc-shaped outer wall of the thermal management component mentioned in the embodiments of the present application is for those skilled in the art to better understand the solutions of the present application. The arc shape may be any continuous or discontinuous combination of curves or straight lines, such as ellipses and polygonal prisms.

The temperature regulation system mentioned in the embodiments of the present application refers to a system configured to perform temperature regulation on the battery units in the battery. In general, the temperature regulation system is used as a part of a vehicle thermal management system or the battery thermal management system, and performs temperature regulation on the battery units by means of the circulating flow of the heat exchange fluid.

In some embodiments, with reference to FIGS. 7 to 17, a first aspect of the embodiments of the present application provides a thermal management component 300, comprising a set of first heat exchange surfaces 310 and a set of second edge heat exchange surfaces 320. The set of first heat exchange surfaces 310 comprise a plurality of first heat exchange surfaces 310. The plurality of first heat exchange surfaces 310 are configured to cooperate with a plurality of outer battery units 13 located on one side of the thermal management component 300 for temperature regulation.

Each of the first heat exchange surfaces 310 is configured to cooperate with one of the outer battery units 13 for temperature regulation. The set of second edge heat exchange surfaces 320 comprise a plurality of second edge heat exchange surfaces 320. The plurality of second edge heat exchange surfaces 320 are configured to cooperate with a plurality of intermediate battery units 14 located on the other side of the thermal management component 300 for temperature regulation. Each of the second edge heat exchange surfaces 320 is configured to cooperate with one of the intermediate battery units 14 for temperature regulation. Each of the first heat exchange surfaces 310 has a heat exchange area which is a first heat exchange area S1, and each of the second edge heat exchange surfaces 320 has a heat exchange area which is a second heat exchange area S2. The first heat exchange area S1 is greater than the second heat exchange area S2.

In this embodiment, the thermal management component 300 has two sets of heat exchange surfaces 310, 320 with different heat exchange areas, which can be flexibly used with the battery units 13 and 14, so that two thermal management components are arranged on two sides of one layer of intermediate battery units 14, and each intermediate battery unit 14 of one layer of intermediate battery units 14 exchanges heat with two second edge heat exchange surfaces 320 with a smaller heat exchange area of the two thermal management components 300; and each outer battery unit 13 of one layer of outer battery units 13 can exchange heat with a first heat exchange surface 310 with a larger heat exchange area of one of the thermal management components 300, such that the intermediate battery units 14 and the outer battery units 13 achieve substantially the same heat exchange effect. The thermal management component 300 of this embodiment can meet the requirements of uniform heat exchange for batteries having odd-numbered layers of battery units and batteries having even-numbered layers of battery units can adjust the thickness of the battery more flexibly, so that the space adaptability of the battery can be enhanced.

In some embodiments, a first heat exchange flow channel 34 is formed in the thermal management component 300, and the first heat exchange flow channel 34 is configured to provide a movement path of the heat exchange fluid. The thermal management component 300 comprises a first side plate 31 and a second side plate 32. The second side plate 32 is arranged opposite the first side plate 31, and the first heat exchange flow channel 34 is formed between the first side plate 31 and the second side plate 32. The set of first heat exchange surfaces 310 are formed on the first side plate 31, and the heat exchange fluid passes over the first heat exchange surfaces 310 to perform temperature regulation on the outer battery units 13. The set of second edge heat exchange surfaces 320 are formed on the second side plate 32, and the heat exchange fluid also passes over the second edge heat exchange surfaces 320 to perform temperature regulation on the intermediate battery units 14.

With the above arrangement, the first side plate 31 of the thermal management component 300 is provided with a plurality of first heat exchange surfaces 310, and at least one of the first heat exchange surfaces 310 has a first heat exchange area S1; the second side plate 32 is provided with a plurality of second edge heat exchange surfaces 320, and at least one of the second edge heat exchange surfaces 320 has a second heat exchange area S2; and the first heat exchange area S1 is greater than the second heat exchange area S2, that is, portions of the first side plate 31 and the second side plate 32 of the thermal management component 300 that exchange heat with the battery units have different heat exchange areas, so that two thermal management components 300 are arranged on two sides of one layer of intermediate battery units 14, and the layer of intermediate battery units 14 exchanges heat with two second edge heat exchange surfaces 320 with a smaller heat exchange area of the two thermal management components 300; and the outer battery units 13 can exchange heat with a first heat exchange surface 310 with a larger heat exchange area of one of the thermal management components 300, such that the intermediate battery units 14 and the outer battery units 13 achieve substantially the same heat exchange effect. In this way, for the thermal management component 300 of this embodiment, battery units in different positions may be combined with one first heat exchange surface 310 of one thermal management component 300 or two second edge heat exchange surfaces 320 of two thermal management components, for performing heat exchange with one layer of battery units and achieving substantially the same cooling effect, so that uniform heat exchange of any layer of battery units can be achieved, a good space adaptability is provided, and different space usage requirements can be met.

In some embodiments, the first heat exchange areas S1 of the plurality of first heat exchange surfaces 310 on the first side plate 31 may be the same as or different from each other; and the second heat exchange areas S2 of the plurality of second edge heat exchange surfaces 320 on the second side plate 32 may be the same as or different from each other. If the first heat exchange areas S1 of the plurality of first heat exchange surfaces 310 on the first side plate 31 are the same as each other, and the second heat exchange areas S2 of the plurality of second edge heat exchange surfaces 320 on the second side plate 32 are the same as each other, the first heat exchange area S1 being greater than the second heat exchange area S2 mentioned in the previous embodiments specifically refers to the first heat exchange areas S1 of the plurality of first heat exchange surfaces 310 on the first side plate 31 are all greater than the second heat exchange areas S2 of the plurality of second edge heat exchange surfaces 320 on the second side plate 32. If the first heat exchange areas S1 of the plurality of first heat exchange surfaces 310 on the first side plate 31 are different from each other, or the second heat exchange areas S2 of the plurality of second edge heat exchange surfaces 320 on the second side plate 32 are different from each other, the first heat exchange area S1 being greater than the second heat exchange area S2 mentioned in the previous embodiments may specifically means that the first heat exchange area S1 of at least one heat exchange surface 310 of the plurality of first heat exchange surfaces 310 on the first side plate 31 is greater than the second heat exchange area S2 of at least one second edge heat exchange surface of the plurality of second edge heat exchange surfaces 320 on the second side plate 32, or the average value of the first heat exchange areas S1 of the plurality of first heat exchange surfaces 310 on the side plate 31 is greater than the average value of the second heat exchange areas S2 of the plurality of second edge heat exchange surfaces 320 on the second side plate 32.

Figure 7:
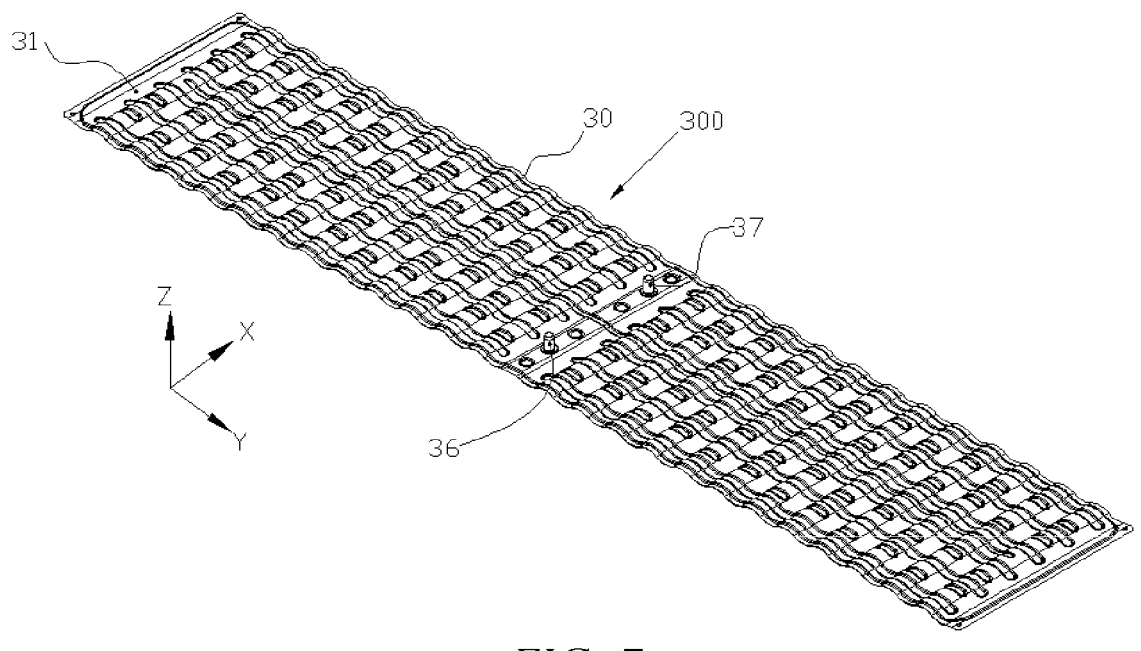
FIG. 7 is a schematic structural diagram of an edge thermal management component according to some embodiments of the present application.
Figure 8:
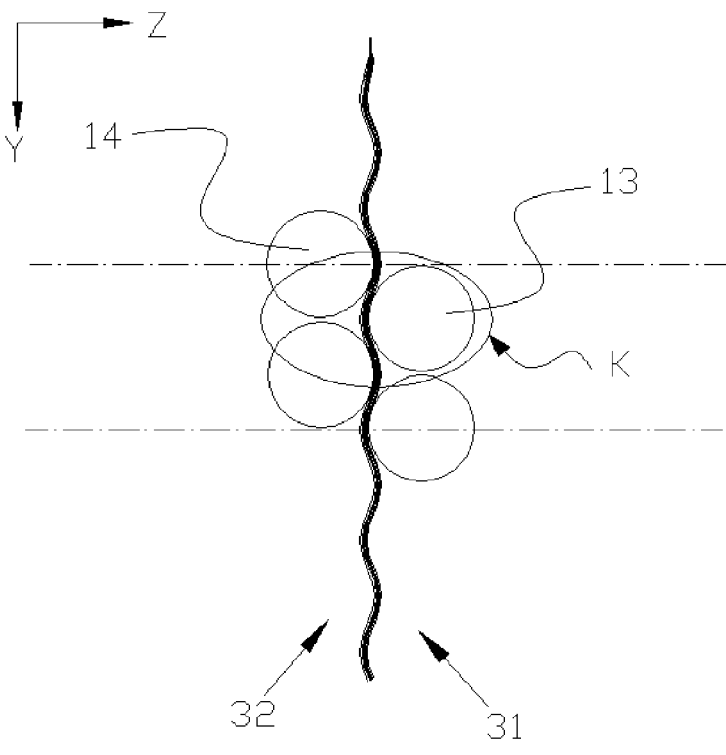
FIG. 8 is a side view of an edge thermal management component with battery units arranged on two sides thereof according to some embodiments of the present application.
Figure 9:
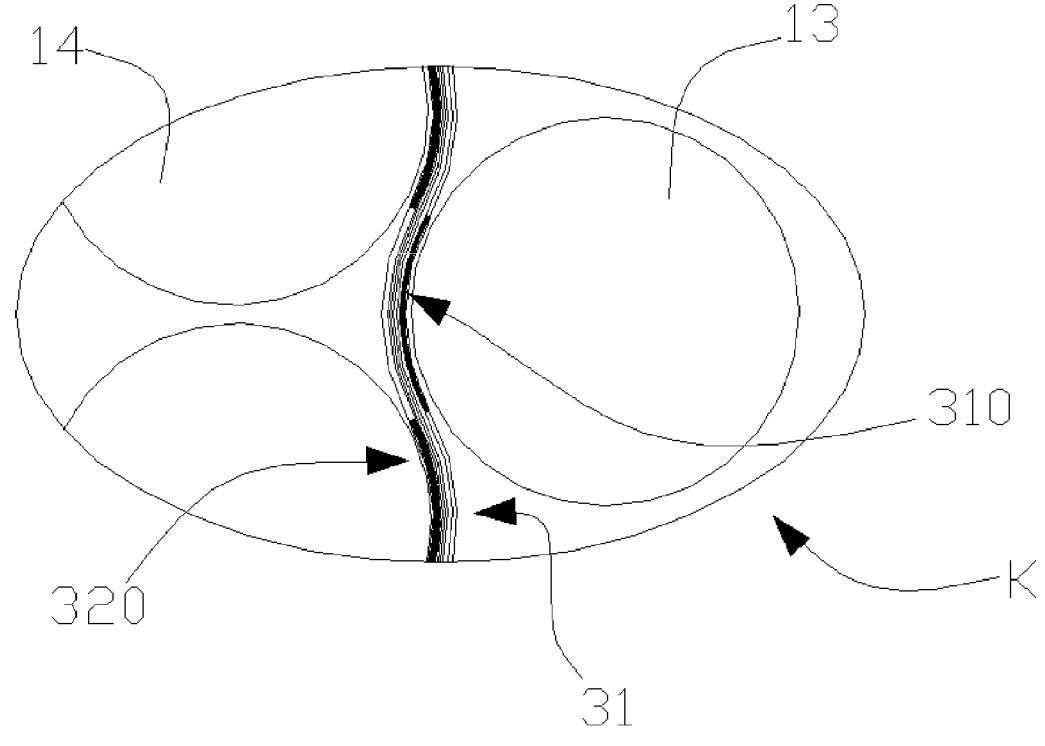
FIG. 9 is a partial enlarged schematic view of K portion of a heat exchange surface of the edge thermal management component that exchanges heat with the battery unit in FIG. 8.
Figure 10:
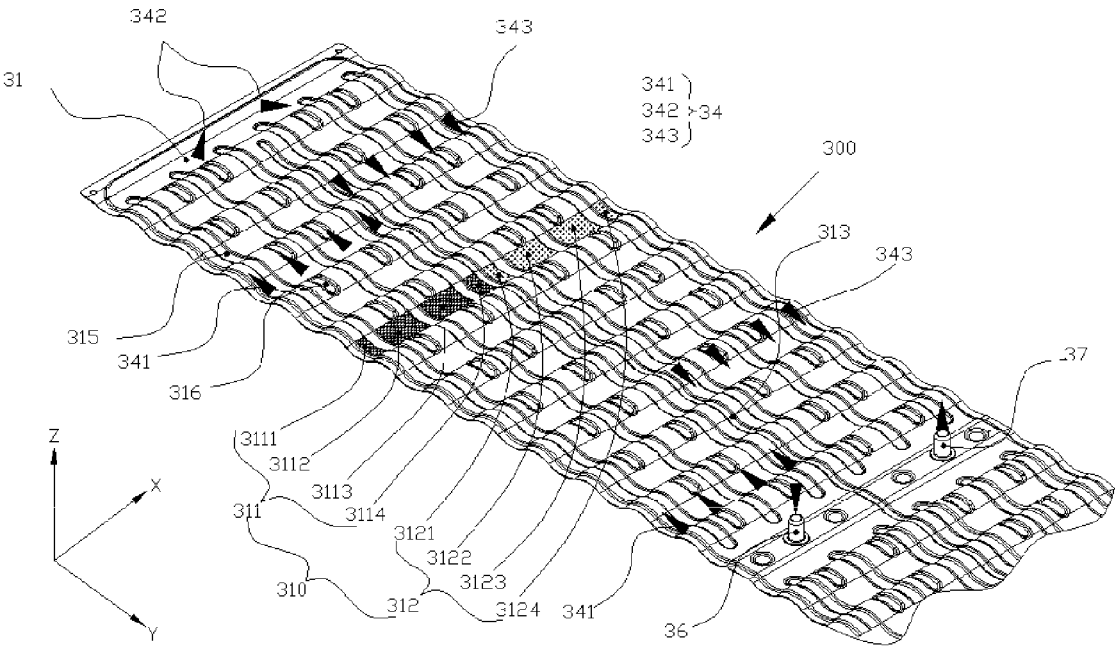
FIG. 10 is a partial enlarged view of a first side plate of an edge thermal management component according to some embodiments of the present application.

Specifically, taking the thermal management component 300 in FIGS. 7 and 10 as an example, the thermal management component 300 has a wave shape formed by assembling adjacent arc-shaped outer walls in the length direction Y. The set of first heat exchange surfaces 310 are arranged on the arc-shaped outer wall part of the first side plate 31 that is recessed toward the inside of the thermal management component 300, the set of first heat exchange surfaces 310 are arranged in the length direction Y, and each first heat exchange surface 310 is arranged in the width direction X. The set of second edge heat exchange surfaces 320 are arranged on the arc-shaped outer wall part of the second side plate 32 that is recessed toward the inside of the thermal management component 300, the set of second edge heat exchange surfaces 320 are arranged in the length direction Y, and each second edge heat exchange surface 320 is arranged in the width direction X.

In some embodiments, as shown in FIG. 7, the thermal management component 300 of the embodiments of the present application further comprises a first liquid inlet 36 and a first liquid outlet 37. The first liquid inlet 36 and the first liquid outlet 37 are both in communication with the first heat exchange flow channel 34 in the thermal management component 300.

In some embodiments, as shown in FIGS. 8, 9, 16 and 17, the plurality of first heat exchange surfaces 310 on the first side plate 31 of the thermal management component 300 of the embodiments of the present application are formed on a part of the arc-shaped outer wall on the side plate 31, and the second edge heat exchange surfaces 320 are formed on a part of the arc-shaped outer wall on the second side plate 32.

The definition of the heat exchange surface will be described below. The first heat exchange surface 310 is taken as an example, and the definition of other heat exchange surfaces such as the second edge heat exchange surface 320 in the embodiments of the present application may refer to the first heat exchange surface 310. When one outer battery unit 13 and the first side plate 31 are in direct contact with each other for thermal conduction type heat exchange, one first heat exchange surface 310 is a portion of the first side plate 31 that is in direct contact with the one outer battery unit 13. When a thermally conductive layer is arranged between one outer battery unit 13 and the first side plate 31, the first heat exchange surface 310 is a portion of the first side plate 31 that is in indirect contact with the one outer battery unit 13 via the thermally conductive layer for conduction type heat exchange. The first heat exchange surface 310 may be a continuous surface, or may be composed of a plurality of spaced heat exchange facets. The heat exchange facet is a portion of a part of the first side plate 31 that is in indirect contact with a part of one outer battery unit 13 via a thermally conductive layer for conduction type heat exchange. The specific approach will be described in detail with reference to the following embodiments.

In some embodiments, as shown in FIG. 10, the thermal management component comprises a first liquid inlet 36 and a first liquid outlet 37 which are in communication with the first heat exchange flow channel 34. A first heat exchange flow channel 34 comprises a plurality of flow channel segments arranged in a circuitous manner, and an isolation portion 33 provided between two adjacent flow channel segments. The first heat exchange flow channel 34 further comprises an intermediate flow channel segment 342, and the two adjacent flow channel segments are in communication with each other through the intermediate flow channel segment 342.

Specifically, as shown in FIG. 10, in this embodiment, a first heat exchange flow channel 34 is provided with a first flow channel segment 341 which is in communication with the first liquid inlet 36, and a second flow channel segment 343 which is in communication with the first liquid outlet 37. The first flow channel segment 341 and the second flow channel segment 343 extend in the length direction Y of the thermal management component. An isolation portion 33 is provided between the first flow channel segment 341 and the second flow channel segment 343, and the isolation portion 33 separates the first flow channel segment 341 from the second flow channel segment 343. The intermediate flow channel segment 342 is located at an edge of the isolation portion 33, and the intermediate flow channel segment 342 extends in the width direction X of the thermal management component. The adjacent first flow channel segment 341 and second flow channel segment 343 are in communication with each other through the intermediate flow channel segment 342. As a whole, the first heat exchange flow channel 34 forms a circuitous structure, and the adjacent first flow channel segment 341 and second flow channel segment 343 are folded 180°, so that the cooling space for cooling the battery units is relatively compact. The number of segments of one first heat exchange flow channel 34 is determined according to the size of the battery actually to be cooled and the actual use environment, and the specific number and specific length dimension of flow channel segments are not limited. Since the heat exchange fluid near the first liquid inlet 36 is at a lower temperature, and the heat exchange fluid near the first liquid outlet 37 is at a higher temperature, one heat exchange surface (including the first heat exchange surface 310 and the second edge heat exchange surface 320) that exchanges heat with one battery unit (including the outer battery unit 13 and the intermediate battery unit 14) includes both a heat exchange facet at a lower temperature near the first liquid inlet 36 and a heat exchange facet at a higher temperature near the first liquid outlet 37, which can neutralize the temperature so that the battery unit will not be at an extreme temperature, and at the same time, it is possible that the temperatures of the battery units near the first liquid inlet 36 and the first liquid outlet 37 are not much different from the temperature of the battery units near the intermediate flow channel segment 342 (located at the end of the thermal management component 300), improving the temperature uniformity of the battery unit.

In some embodiments, as shown in FIGS. 7 and 10, a first heat exchange flow channel 34 is respectively provided on either side of the connecting line between the first liquid inlet 36 and the first liquid outlet 37. Specifically, the first liquid inlet 36 and the first liquid outlet 37 are arranged in the middle of the thermal management component in the length direction Y, a first heat exchange flow channel 34 is respectively provided on either side of the connecting line between the first liquid inlet 36 and the first liquid outlet 37, and the first heat exchange flow channels 34 on the two sides are both in communication with the first liquid inlet 36 and the first liquid outlet 37, so that the first liquid inlet 36 and the first liquid outlet are 37 can supply liquid to the two first heat exchange flow channels 34 at the same time. The first liquid inlet 36 and the first liquid outlet 37 are arranged in the middle of the thermal management component 300, and a first heat exchange flow channel 34 is respectively provided on either side of the connecting line between the first liquid inlet 36 and the first liquid outlet 37, so that it is possible to shorten the flow distance of the heat exchange fluid, to increase the effective flow resistance of parallel circuits of the heat exchange fluid, and at the same time, to improve the temperature consistency of the battery units on two sides of the connecting line between the first liquid inlet 36 and the first liquid outlet 37 of the thermal management component 300.

In some embodiments, the first heat exchange flow channel 34, the first side plate 31 and the second side plate 32 are described with reference to FIGS. 10 to 17.

In some embodiments, as shown in FIG. 10, a first heat exchange flow channel 34 within the thermal management component 300 is divided into a first flow channel segment 341, a second flow channel segment 343 and an intermediate flow channel segment 342. The first flow channel segment 341 and the second flow channel segment 343 are mainly configured to cooperate with the battery units for temperature regulation. The first flow channel segment 341 and the second flow channel segment 343 have substantially the same structure, and the first flow channel segment 341 is taken as an example for description.

In some embodiments, as shown in FIGS. 10, 11, 16 and 17, at a portion where the first flow channel segment 341 is provided, a first side flow channel first segment 314 is formed at the first side plate 31 of the thermal management component 300 at the position corresponding to the first flow channel segment 341, and a portion of the first side flow channel first segment 314 that cooperates with the outer battery unit 13 forms a plurality of first heat exchange surface first segments 311 arranged in the length direction Y. At a portion where the second flow channel segment 343 is provided, a first side flow channel second segment 315 is formed at the first side plate 31 of the thermal management component 300 at the position corresponding to the second flow channel segment 343, and a portion of the first side flow channel second segment 315 that cooperates with the outer battery unit 13 forms a plurality of first heat exchange surface second segments 312 arranged in the length direction Y.

Figures 11, 12:
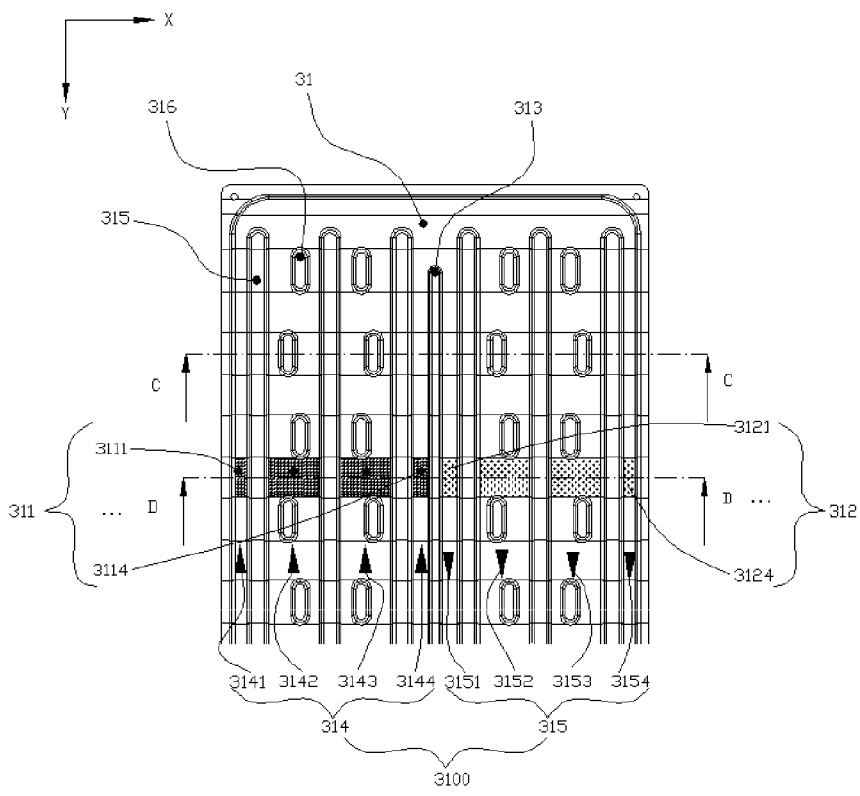
FIG. 11 is a partial top view of a first side plate of an edge thermal management component according to some embodiments of the present application.
FIG. 12 is a partial enlarged schematic view of a first heat exchange surface first segment of the first side plate of the edge thermal management component in FIG. 11.
Figure 13:
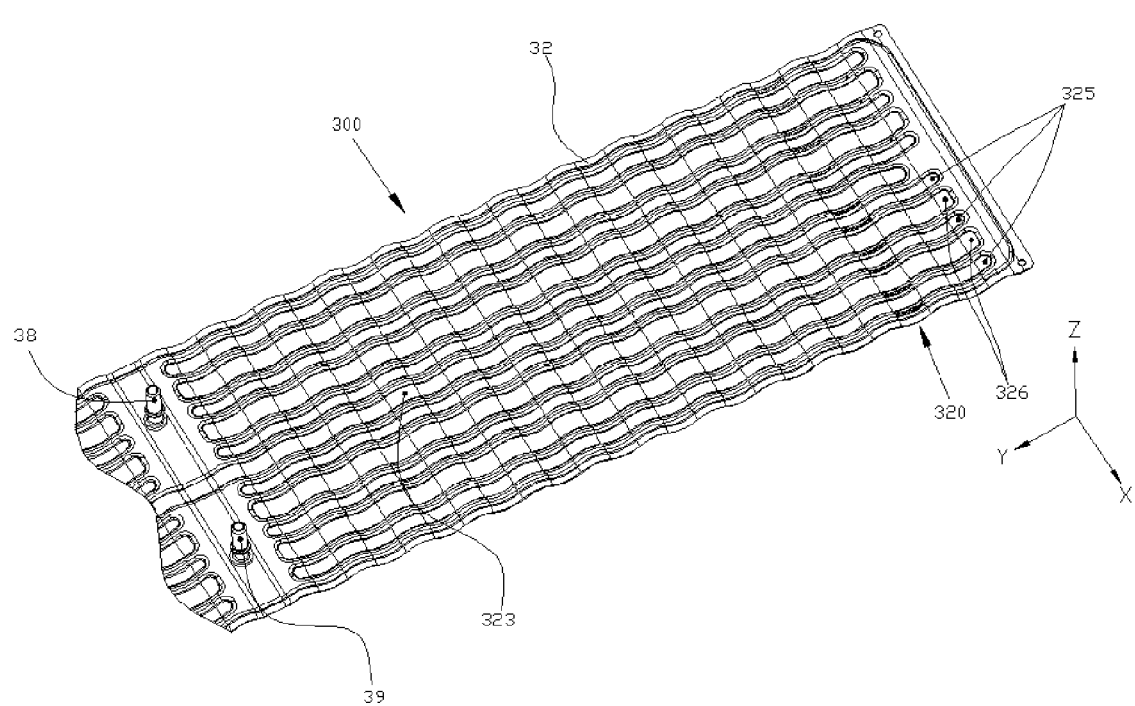
FIG. 13 is a partial enlarged view of a second side plate of an edge thermal management component according to an embodiment of the present application.

As shown in FIGS. 10 and 11, the first side flow channel 3100 comprises a plurality of first side branch flow channels 3141-3144 and 3151-3154 arranged in parallel perpendicular to the flow direction of the heat exchange fluid, a portion of each first side branch flow channel 3141-3144 and 3151-3154 that cooperates with one of the outer battery units forms a first heat exchange facet 3111-3114 and 3121-3124, the first heat exchange facets 3111-3114 constitute the first heat exchange surface first segments 311, and the first heat exchange facets 3121-3124 constitute the first heat exchange surface second segments 312; and the first heat exchange surface first segments 311 and the first heat exchange surface second segments 312 together constitute the first heat exchange surface 310. That is, each first heat exchange surface 310 comprises a plurality of first heat exchange facets 3111-3114 and 3121-3124; and the first heat exchange area S1 is the sum of the surface areas of the plurality of first heat exchange facets 3111-3114 and 3121-3124. However, the present application is not limited to this. If the first heat exchange surface first segment 311 or the smaller first heat exchange facets 3111-3114 are used to perform temperature regulation on one battery unit, the first heat exchange surface 310 may also be one first heat exchange surface first segment 311 or the smaller first heat exchange facets 3111-3114.

Figure 14:
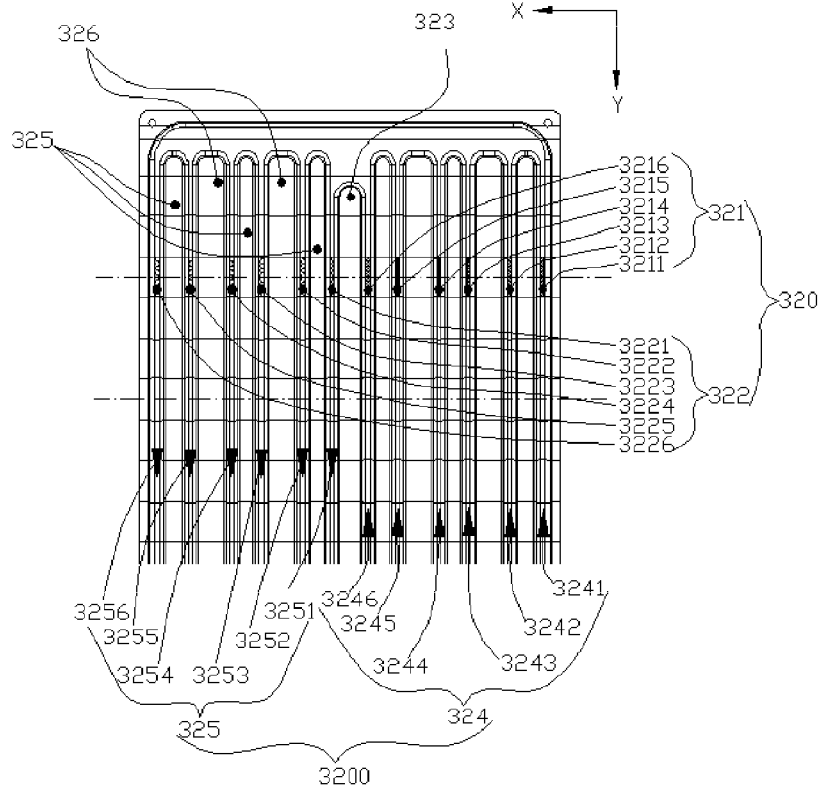
FIG. 14 is a partial top view of a second side plate of an edge thermal management component according to some embodiments of the present application.

As shown in FIG. 14, the second side flow channel 3200 comprises a plurality of second side branch flow channels 3241-3246 and 3251-3256 arranged in parallel perpendicular to the flow direction of the heat exchange fluid, and a part of each second side branch flow channel 3241-3246 and 3251-3256 that cooperates with one of the intermediate battery units forms a second edge heat exchange facet 3211-3216 and 3221-3226. The second heat exchange facets 3211-3216 constitute the second heat exchange surface first segment 321, and the second heat exchange facets 3221-3226 constitute the second heat exchange surface second segment 322; and the second heat exchange surface first segment 321 and the second heat exchange surface second segment 322 together constitute the second heat exchange surface 320. That is, each second edge heat exchange surface 320 comprises a plurality of second edge heat exchange facets 3211-3216 and 3221-3226; and the second heat exchange area S2 is the sum of the surface areas of the plurality of second edge heat exchange facets 3211-3216 and 3221-3226. However, the present application is not limited to this. If the second heat exchange surface first segment 321 or the plurality of smaller second edge heat exchange facets 3211-3216 are used to perform temperature regulation on one battery unit, the second edge heat exchange surface 320 may also be the second heat exchange surface first segment 321 or the plurality of smaller second edge heat exchange facets 3211-3216.

In this embodiment, by adjusting the surface areas and the numbers of first heat exchange facets 3111-3114, 3121-3124 and second edge heat exchange facets 3211-3216, 3221-3226, not only can the second heat exchange area S2 be smaller than the first heat exchange area S1, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved.

The details are as shown in FIGS. 10, 11, 16 and 17. The first side flow channel 3100 comprises two first side flow channel segments arranged in parallel perpendicular to the flow direction of the heat exchange fluid, namely the first side flow channel first segment 314 and the first side flow channel second segment 315.

The first side flow channel first segment 314 comprises a plurality of first side branch flow channels. In some embodiments, the first side branch flow channel segment 314 comprises four first side branch flow channels, namely a first side first branch flow channel 3141, a first side second branch flow channel 3142, a first side third branch flow channel 3143 and a first side fourth branch flow channel 3144. The four first side branch flow channels 3141, 3142, 3143, 3144 are portioned by a number of first side partition portions 315. The first side partition portions 315 are recessed toward the inside of the thermal management component 300 and have a certain distance from the outer battery unit, and the first side partition portions 315 do not make direct or indirect contact with the outer battery unit 13. The four first side branch flow channels protrude from the first side plate 31, and a part of each first side branch flow channel that cooperates with one of the outer battery units 13 forms a first heat exchange facet. That is, the part of the arc-shaped outer wall, which is recessed toward the inside of the thermal management component 300, of each first side branch flow channel that cooperates with the outer battery unit 13 forms a first heat exchange facet, the first heat exchange facet matches the shape the outer battery unit 13, and the first heat exchange facet is in direct contact with the outer battery unit 13 or is in indirect contact therewith via a thermally conductive layer for heat exchange. Adjacent first heat exchange facets are spaced apart from each other by the first side partition portions 315, so that in the arc-shaped outer wall of each first side branch flow channel recessed toward the inside of the thermal management component 300, only the first heat exchange facets are in direct contact with the outer battery unit 13 or are in indirect contact therewith via thermally conductive layers for heat exchange, while the first side partition portions 315 do not make direct or indirect contact with the outer battery unit 13, so that the heat exchange area of the first heat exchange surface can be adjusted by changing the areas and numbers of first heat exchange facets and first side partition portions. The first side branch flow channel segment 315 also comprises four first side branch flow channels, namely a first side fifth branch flow channel 3151, a first side sixth branch flow channel 3152, a first side seventh branch flow channel 3153 and a first side eighth branch flow channel 3154. That is, the first side flow channel 3100 comprises eight first side branch flow channels arranged in parallel perpendicular to the flow direction of the heat exchange fluid, namely the first side first branch flow channel 3141, the first side second branch flow channel 3142, the first side third branch flow channel 3143 and the first side fourth branch flow channel 3144, and the first side fifth branch flow channel 3151, the first side sixth branch flow channel 3152, the first side seventh branch flow channel 3153 and the first side eighth branch flow channel 3154.

Specifically, as shown in FIG. 10, a first heat exchange surface first segment 311 comprises a first heat exchange first facet 3111 located at the first side first branch flow channel 3141, a first heat exchange second facet 3112 located at the first side second branch flow channel 3142, a first heat exchange third facet 3113 located at the first side third branch flow channel 3143, and a first heat exchange fourth facet 3114 located at the first side fourth branch flow channel 3144. The first heat exchange first facet 3111, the first heat exchange second facet 3112, the first heat exchange third facet 3113 and the first heat exchange fourth facet 3114 are located on the same recessed arc-shaped outer wall of the first outer side plate 31, and the first heat exchange first facet 3111, the first heat exchange second facet 3112, the first heat exchange third facet 3113 and the first heat exchange fourth facet 3114 are arranged in the width direction X. Similarly, at a portion where the second flow channel segment 343 is provided, a first side flow channel second segment 315 is also formed at the first side plate 31 of the thermal management component 300 at the position corresponding to the second flow channel segment 343, and a portion of the first side flow channel second segment 315 that cooperates with the outer battery unit 13 forms a plurality of first heat exchange surface second segments 312 arranged in the length direction Y. Each first heat exchange surface second segment is arranged in parallel with one first heat exchange surface first segment 311 in the width direction X. Each first heat exchange surface second segment 312 also comprises four first heat exchange facets 3121-3124 arranged in the width direction X. The structure of the first heat exchange surface second segment 312 may refer to the structure of the first heat exchange surface first segment 311.

Specifically, as shown in FIG. 10, one first heat exchange surface first segment 311 and one first heat exchange surface second segment 312 arranged in parallel in the width direction X constitute one first heat exchange surface 310. That is, the first heat exchange surface 310 is arranged on the first flow channel segment 341 and the second flow channel segment 343. One first heat exchange surface 310 is composed of eight first heat exchange facets 3111-3114, 3121-3124. However, the present application is not limited to this. The number of segments and the number of facets of the first heat exchange surface depend on the number of flow channel segments and the number of first side flow channel segments in each flow channel segment, may be determined according to the size of the battery actually to be cooled and the actual use environment, and are both not specifically limited. One first heat exchange surface 310 cooperates with one outer battery unit 13 for temperature regulation, and one outer battery unit 13 may comprise one battery cell, or a plurality of coaxially-arranged battery cells.

It can be seen from the above embodiments that, as shown in FIG. 10, the first heat exchange area S1 of one first heat exchange surface 310 is the sum of the surface areas of a plurality of first heat exchange facets that cooperate with one outer battery unit 13 for temperature regulation. Specifically, the first heat exchange area S1 of one first heat exchange surface 310 is the sum of the surface areas of four first heat exchange facets 3111-3114 of one first heat exchange surface first segment 311 and four first heat exchange facets 3121-3124 of one first heat exchange surface second segment 312.

In some embodiments, each of the first heat exchange surfaces 310 has a first heat exchange width W1, and each of the second edge heat exchange surfaces 320 has a second heat exchange width W2. The first heat exchange width W1 is greater than the second heat exchange width W2. The first heat exchange width W1 is the sum of the widths of the plurality of first heat exchange facets, and the second heat exchange width W2 is the sum of the widths of the plurality of second edge heat exchange facets. The ratio of the second heat exchange width W2 to the first heat exchange width W1 is between 0.1-0.9.

In this embodiment, the ratio adjustment of the first heat exchange area and the second heat exchange area is realized by adjusting the ratio of the first heat exchange width W1 of the first heat exchange surfaces 310 to the second heat exchange width W2 of the second edge heat exchange surfaces 320. The adjustment of the first heat exchange width W1 of the first heat exchange surfaces 310 is realized by adjusting the width and the number of first heat exchange facets, and the adjustment of the second heat exchange width W2 of the second edge heat exchange surfaces 320 is realized by adjusting the width and the number of second edge heat exchange facets. Through the control of the first heat exchange width W1 and the second heat exchange width ratio W2, the ratio adjustment of the first heat exchange area S1 and the second heat exchange area S2 can be simply realized. The details will be described below with reference to the accompanying drawings.

In some embodiments, as shown in FIGS. 11 and 12, in one first heat exchange surface first segment 311, in the length direction Y, the widths of the first side first branch flow channel 3141, the first side second branch flow channel 3142, the first side third branch flow channel 3143 and the first side fourth branch flow channel 3144 all remain unchanged. The first heat exchange first facet 3111 has a first sub-width W11, the first heat exchange second facet 3112 has a second sub-width W12, the first heat exchange third facet 3113 has a third sub-width W13, and the first heat exchange fourth facet 3114 has a fourth sub-width W14. The first sub-width W11, the second sub-width W12, the third sub-width W13 and the fourth sub-width W14 may be the same or different, which will not be limited. For example, in FIG. 12, the second sub-width W12 and the third sub-width W13 may be greater than the first sub-width W11 and the fourth sub-width W14. In this way, the width of one first heat exchange surface 310 is the sum of the widths of the plurality of first heat exchange facets. The structure of the first heat exchange surface second segment 312 is the same as or symmetrical to the structure of the first heat exchange first segment 3111. Specifically, in FIG. 10, the width of one first heat exchange surface 310 is the sum of the withs of four heat exchange facets 3111-3114 of one first heat exchange surface first segment 311 and four heat exchange facets 3121-3124 of one first heat exchange surface second segment 312. The width of the first heat exchange surface 310 may be adjusted by changing the widths and numbers of first heat exchange facets and first side partition portions.

In some embodiments, the width of the side branch flow channel corresponding to one heat exchange surface segment may vary in the length direction Y, not a fixed value. In this case, the first width of one first heat exchange facet is the average width thereof in the length direction Y, and the width of one first heat exchange surface 310 is the sum of the average widths of the plurality of first heat exchange facets.

As shown in FIG. 14, the second side flow channel 3200 comprises two second side flow channel segments arranged in parallel perpendicular to the flow direction of the heat exchange fluid, namely a second side flow channel first segment 324 and a second side flow channel second segment 325. The second side flow channel 3200 cooperates with the first side flow channel 3100 to form the first heat exchange flow channel 34.

The details are as shown in FIGS. 13 to 17. Each second side flow channel first segment 324 comprises a plurality of second side branch flow channels. In some embodiments, one second side branch flow channel first segment 324 comprises six second side branch flow channels, namely a second side first branch flow channel 3241, a second side second branch flow channel 3242, a second side third branch flow channel 3243, a second side fourth branch flow channel 3244, a second side fifth branch flow channel 3245 and a second side sixth branch flow channel 3246. The six second side branch flow channels are portioned by a number of second side partition portions 325 and 326. The second side partition portions 325, 326 are recessed toward the inside of the thermal management component and have a certain distance from the intermediate battery unit 14, and the second side partition portions 325, 326 do not make direct or indirect contact with the intermediate battery unit 14. The six second side branch flow channels protrude from the second side plate 32, and a part of each second side branch flow channel that cooperates with one of the intermediate battery units 14 forms a second edge heat exchange facet. That is, the part of the arc-shaped outer wall, which is recessed toward the inside of the thermal management component 300, of each second side branch flow channel that cooperates with the intermediate battery unit 14 forms a second edge heat exchange facet. Adjacent second edge heat exchange facets are spaced apart from each other by the second side partition portions 325, 326, so that in the arc-shaped outer wall of each first side branch flow channel recessed toward the inside of the edge thermal management component, only the second edge heat exchange facets are in direct contact with the intermediate battery unit 14 or are in indirect contact therewith via thermally conductive layers for heat exchange, while the second side partition portions 325, 326 do not make direct or indirect contact with the intermediate battery unit 14, so that the heat exchange area of the second edge heat exchange surface can be adjusted by changing the areas and numbers of second edge heat exchange facets and second side partition portions. Similarly, one second side branch flow channel second segment 325 also comprises six second side branch flow channels, namely a second side seventh branch flow channel 3251, a second side eighth branch flow channel 3252, a second side ninth branch flow channel 3253, a second side tenth branch flow channel 3254, a second side eleventh branch flow channel 3255 and a second side twelfth branch flow channel 3256. That is, the second side flow channel 3200 comprises twelve second side branch flow channels arranged in parallel perpendicular to the flow direction of the heat exchange fluid, namely the second side first branch flow channel 3241, the second side second branch flow channel 3242, the second side third branch flow channel 3243, the second side fourth branch flow channel 3244, the second side fifth branch flow channel 3245, the second side sixth branch flow channel 3246, the second side seventh branch flow channel 3251, the second side eighth branch flow channel 3252, the second side ninth branch flow channel 3253, the second side tenth branch flow channel 3254, the second side eleventh branch flow channel 3255 and the second side twelfth branch flow channel 3256.

In some embodiments, as shown in FIGS. 13 to 17, at a portion where the first flow channel segment 341 is provided, a second side flow channel first segment 324 is formed at the second side plate 32 of the thermal management component 300 at the position corresponding to the first flow channel segment 341, and a portion of the second side flow channel first segment 324 that cooperates with one intermediate battery unit 14 forms a plurality of second edge heat exchange surface first segments 321 arranged in the length direction Y. At a portion where the second flow channel segment 343 is provided, a second side flow channel second segment 325 is formed at the second side plate 32 of the thermal management component 300 at the position corresponding to the second flow channel segment 343, and a portion of the second side flow channel second segment 325 that cooperates with one intermediate battery unit 14 forms a plurality of second edge heat exchange surface second segments 322 arranged in the length direction Y.

As shown in FIG. 14, one second edge heat exchange surface first segment 321 and one second edge heat exchange surface second segment 322 arranged in parallel constitute one second edge heat exchange surface 320.

Specifically, as shown in FIG. 14, a second edge heat exchange surface first segment 321 comprises a second heat exchange first facet 3211 located at the second side first branch flow channel 3241, a second heat exchange second facet 3212 located at the second side second branch flow channel 3242, a second heat exchange third facet 3213 located at the second side third branch flow channel 3243, a second heat exchange fourth facet 3214 located at the second side fourth branch flow channel 3244, a second side fifth facet 3215 located at the second side fifth branch flow channel 3245, and a second heat exchange sixth facet 3216 located at the second side sixth branch flow channel 3246. The second heat exchange first facet 3211, the second heat exchange second facet 3212, the second heat exchange third facet 3213, the second heat exchange fourth facet 3214, the second heat exchange fifth facet 3215 and the second heat exchange sixth facet 3216 are located on the same recessed arc-shaped outer wall of the second outer side wall 32, and the second heat exchange first facet 3211, the second heat exchange second facet 3212, the second heat exchange third facet 3213, the second heat exchange fourth facet 3214, the second heat exchange fifth facet 3215 and the second heat exchange sixth facet 3216 are arranged in the width direction X. Similarly, at a portion where the second flow channel segment 343 is provided, a second side flow channel second segment 325 is also formed at the second side plate 32 of the thermal management component 300 at the position corresponding to the second flow channel segment 343, and a portion of the second side flow channel second segment 325 that cooperates with the intermediate battery unit 14 forms a plurality of second edge heat exchange surface second segments 322 arranged in the length direction Y. Each second edge heat exchange surface second segment 322 also comprises six second edge heat exchange facets 3221-3226 arranged in the width direction X. The structure of the second edge heat exchange surface second segment 322 may refer to the structure of the second edge heat exchange surface first segment 321.

Specifically, as shown in FIG. 14, one second edge heat exchange surface first segment 321 and one second edge heat exchange surface second segment 322 arranged in parallel constitute one second edge heat exchange surface 320. That is, the second heat exchange surface 320 is arranged on the first flow channel segment 341 and the second flow channel segment 343. One second edge heat exchange surface 320 is composed of twelve second edge heat exchange facets 3211-3216, 3221-3226. However, the present application is not limited to this. The number of segments and the number of facets of the second edge heat exchange surface 320 depend on the number of flow channel segments and the number of second side flow channel segments in each flow channel segment, may be determined according to the size of the battery actually to be cooled and the actual use environment, and are both not specifically limited. One second edge heat exchange surface 320 cooperates with one intermediate battery unit 14 for temperature regulation, and one intermediate battery unit 14 may comprise one battery cell, or a plurality of battery cells.

It can be seen from the above embodiments that the second heat exchange area S2 of one second edge heat exchange surface 320 is the sum of the surface areas of a plurality of second edge heat exchange facets that cooperate with one intermediate battery unit 14 for temperature regulation. Specifically, the second heat exchange area S2 of one second edge heat exchange surface 320 is the sum of the surface areas of six second edge heat exchange facets 3211-3216 of one second edge heat exchange surface first segment 321 and six second edge heat exchange facets 3221-3226 of one second edge heat exchange surface second segment 322.

Figure 15:
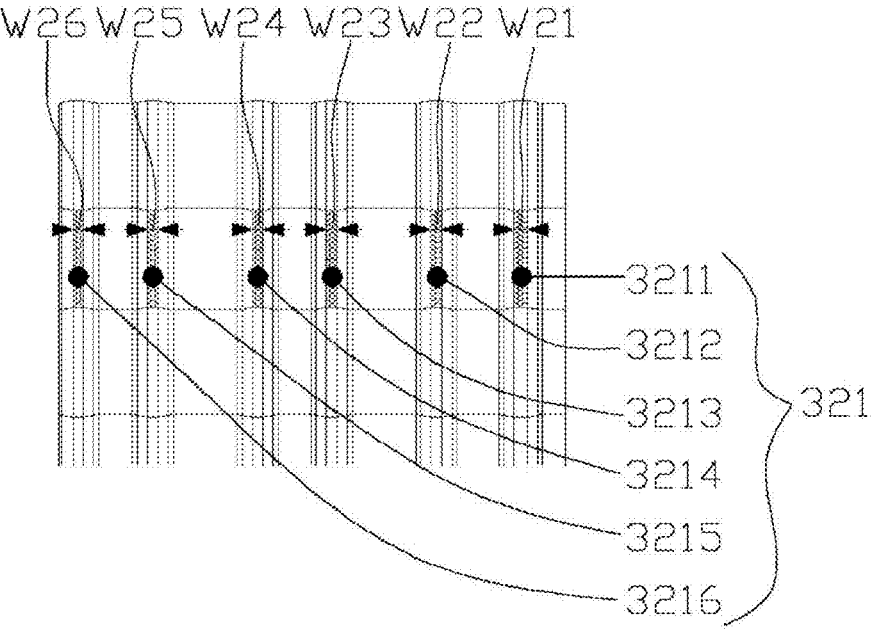
FIG. 15 is a partial enlarged schematic view of a second edge heat exchange surface first segment of the second side plate of the edge thermal management component in FIG. 14.

In some embodiments, as shown in FIG. 15, in one second edge heat exchange surface first segment 321, in the length direction Y, the widths of the second side first branch flow channel 3241, the second side second branch flow channel 3242, the second side third branch flow channel 3243, the second side fourth branch flow channel 3244, the second side fifth branch flow channel 3245 and the second side sixth branch flow channel 3246 all remain unchanged. The second heat exchange first facet 3211 has a first sub-width W21, the second heat exchange second facet 3212 has a second sub-width W22, the second heat exchange third facet 3223 has a third sub-width W23, the second heat exchange fourth facet 3214 has a fourth sub-width W24, the second heat exchange fifth facet 3225 has a fifth sub-width W25, and the second heat exchange sixth facet 3216 has a sixth sub-width W26. The first sub-width W21, the second sub-width W22, the third sub-width W23, the fourth sub-width W24, the fifth sub-width W25 and the sixth sub-width W26 may be the same or different, which will not be limited. In this way, the width of one second edge heat exchange surface 320 is the sum of the widths of the plurality of second edge heat exchange facets. Specifically, in FIG. 15, the width of one second edge heat exchange surface 320 is the sum of the withs of six heat exchange facets 3211-3216 of one second edge heat exchange surface first segment 321 and six heat exchange facets 3221-3226 of one second edge heat exchange surface second segment. The width of the second edge heat exchange surface 320 may be adjusted by changing the widths and numbers of second edge heat exchange facets and second side partition portions 325, 326.

In some embodiments, the width of the side branch flow channel of one heat exchange surface segment may vary in the length direction Y, not a fixed value. In this case, the width of one second edge heat exchange facet is the average width thereof in the length direction Y, and the width of one second edge heat exchange surface is the sum of the average widths of the plurality of second edge heat exchange facets.

In some embodiments, the first heat exchange flow channel 34 comprises a plurality of flow sub-channels arranged in parallel perpendicular to the flow direction of the heat exchange fluid, each flow sub-channel comprises at least one of the first side branch flow channels and at least one of the second side branch flow channels, and the first and second side branch flow channels constituting one of the flow sub-channels are in communication with each other.

In this embodiment, by configuring part of the first side branch flow channel and the plurality of second side branch flow channels to be in communication with each other, the first heat exchange flow channel 34 is divided into a plurality of flow sub-channels, and the heat exchange fluid in each flow sub-channel can exchange heat with both the first side plate and the second side plate, simplifying the design of the first heat exchange flow channel 34 and facilitating the manufacture of the thermal management component.

Figure 16:
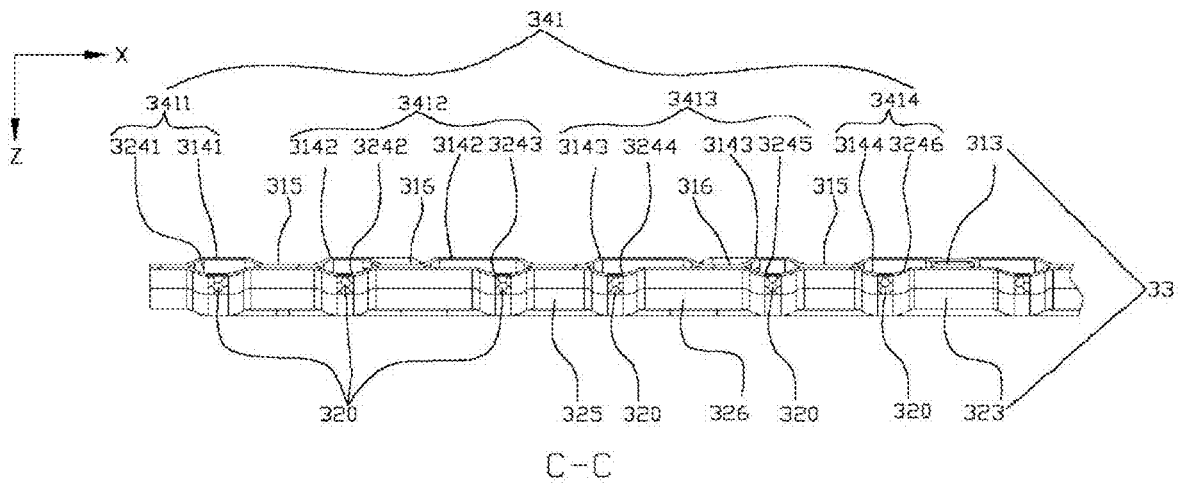
FIG. 16 is a schematic cross-sectional view, along C-C, of the edge thermal management component shown in FIG. 11.
Figure 17:
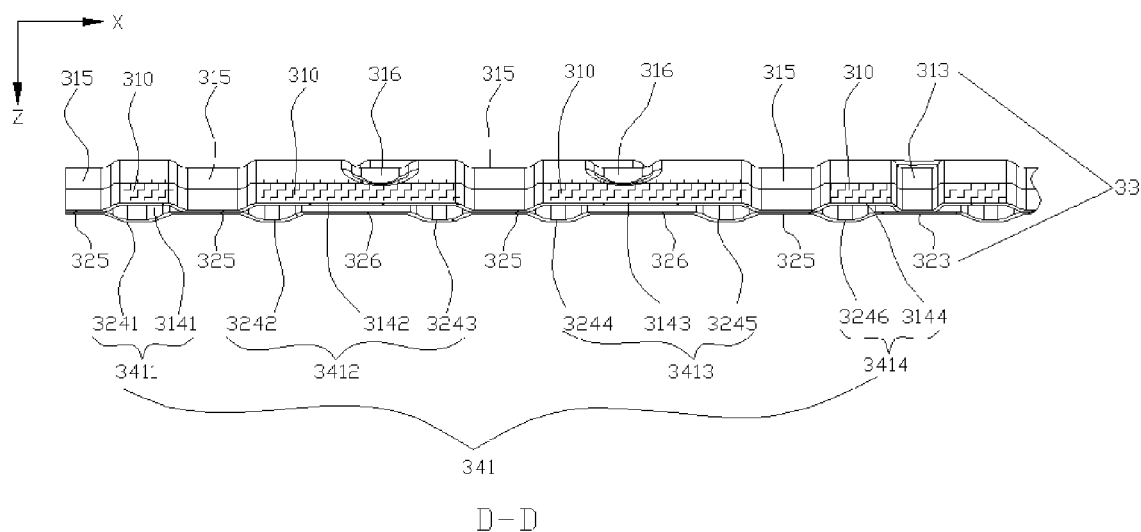
FIG. 17 is a schematic cross-sectional view, along D-D, of the edge thermal management component shown in FIG. 11.

In FIGS. 16 and 17, the first flow channel segment 341 is taken as an example for description. The second flow channel segment 343 has the same structure as the first flow channel segment. By configuring part of the first side branch flow channel 3100 and the plurality of second side branch flow channels 3200 to be in communication with each other, the first heat exchange flow channel 34 is divided into a plurality of flow sub-channels, and the heat exchange fluid in each flow sub-channel can exchange heat with both the first side plate 31 and the second side plate 32, simplifying the design of the first heat exchange flow channel 34 and facilitating the manufacture of the thermal management component 300. In some embodiments, the sum of the heat exchange areas of the at least one first side branch flow channel 3100 constituting one flow sub-channel is greater than the sum of the heat exchange areas of the at least one second side branch flow channel 3200 constituting one flow sub-channel. In some embodiments, the sum of the widths of the at least one first side branch flow channel 3100 constituting one flow sub-channel is greater than the sum of the widths of the at least one second side branch flow channel 3200 constituting one flow sub-channel.

Specifically, a first side isolation portion 313 is provided on the first side plate 31, and a second side isolation portion 323 is provided on the second side plate 32. The first side isolation portion 313 and the second side isolation portion 323 are recessed toward the inside of the thermal management component 300 and are connected to form an isolation portion 33, which divides the thermal management component 300 into a first flow channel segment 341 and a second flow channel segment 343 which are separated from each other.

In some embodiments, as shown in FIGS. 16 and 17, the first side flow channel 3100 of the first side plate 31 and the second side flow channel 3200 of the second side plate 32 are combined to form the first heat exchange flow channel 34. Specifically, the first heat exchange flow channel 34 may comprise a plurality of flow sub-channels arranged in parallel perpendicular to the flow direction of the heat exchange fluid. Taking the first flow channel segment 341 as an example, the first flow channel segment 341 comprises a plurality of flow sub-channels arranged in parallel perpendicular to the flow direction of the heat exchange fluid, namely a first flow sub-channel 3411, a second flow sub-channel 3412, a third flow sub-channel 3413 and a fourth flow sub-channel 3414. The structure of the second flow channel segment 343 may refer to the structure of the first flow channel segment 341. The first side branch flow channel 3100 and the second side branch flow channel 3200 constituting one flow sub-channel are in communication with each other.

In some embodiments, the first side flow channel 3100 comprises a plurality of first side branch flow channels arranged in parallel perpendicular to a flow direction of the heat exchange fluid, and a part of each first side branch flow channel that cooperates with one of the outer battery units forms a first heat exchange facet. Each first heat exchange surface comprises a plurality of first heat exchange facets. The second side flow channel 3200 comprises a plurality of second side branch flow channels arranged in parallel perpendicular to a flow direction of the heat exchange fluid, and a part of each of the second side branch flow channels that cooperates with one of the intermediate battery units forms a second edge heat exchange facet; each of the second edge heat exchange surfaces comprises a plurality of the second edge heat exchange facets; and the second heat exchange area S2 is the sum of the surface areas of the plurality of the second edge heat exchange facets.

In this embodiment, the first side flow channel 3100 is divided into a plurality of first side branch flow channels, and the first heat exchange area S1 is the sum of the surface areas of the plurality of first heat exchange facets. The second side flow channel 3200 is divided into a plurality of second side branch flow channels, and the second heat exchange area S2 is the sum of the surface areas of the second edge heat exchange facets of the plurality of second side branch flow channels. By adjusting the surface areas and the numbers of first heat exchange facets and second edge heat exchange facets, not only can the second heat exchange area S2 be smaller than the first heat exchange area S1, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved.

Specifically, as shown in FIGS. 16 and 17, the first flow channel segment 341 of the first side plate 31 is taken as an example, and the second flow channel segment 343 and the first flow channel segment 341 have similar structures.

The first flow channel segment 341 of the first side plate 31 is provided with four first side branch flow channels arranged in parallel perpendicular to the flow direction of the heat exchange fluid, namely a first side first branch flow channel 3141, a first side second branch flow channel 3142, a first side third branch flow channel 3143 and a first side fourth branch flow channel 3144. The first flow channel segment 341 of the second side plate 32 is provided with six second side branch flow channels, namely a second side first branch flow channel 3241, a second side second branch flow channel 3242, a second side third branch flow channel 3243, a second side fourth branch flow channel 3244, a second side fifth branch flow channel 3245, and a second side sixth branch flow channel 3246.

After the first outer side plate 31 and the second side plate 32 are assembled together, the first flow channel segment 341 is divided into four flow sub-channels, namely a first flow sub-channel 3411, a second flow sub-channel 3412, a third flow sub-channel 3413 and a fourth flow sub-channel 3414. The first flow sub-channel 3411 is formed by communicating the first side first branch flow channel 3141 and the second side first branch flow channel 3241 with each other, the width W11 of the first side first branch flow channel 3141 is greater than or equal to the width W21 of the second side first branch flow channel 3241, and the heat exchange area of the first side first branch flow channel 3141 is also greater than or equal to the heat exchange area of the second side first branch flow channel 3241. The second flow sub-channel 3412 is formed by communicating the first side second branch flow channel 3142 with the second side second branch flow channel 3242 and the second side third branch flow channel 3243 respectively. It should be noted that, as shown in FIG. 17, although the second side partition portion 326 separates the second side second branch flow channel 3242 from the second side third branch flow channel 3243, the second side partition portion 326 is not wholly connected to the first side plate 31, and the width W12 of the first side second branch flow channel 3142 is greater than the sum W22+W23 of the widths of the second side second branch flow channel 3242 and the second side third branch flow channel 3243, so the first side second branch flow channel 3142, the second side second branch flow channel 3242 and the second side third branch flow channel 3243 are all in communication with one another to form the second flow sub-channel 3412. The heat exchange area of the first side second branch flow channel 3142 is also greater than the sum of the heat exchange areas of the second side second branch flow channel 3242 and the second side third branch flow channel 3243.

Similarly, the third flow sub-channel 3413 is formed by communicating the first side third branch flow channel 3143 with the second side fourth branch flow channel 3244 and the second side fifth branch flow channel 3245, and the width W13 of the first side third branch flow channel 3143 is greater than the sum W24+W25 of the widths of the second side fourth branch flow channel 3244 and the second side fifth branch flow channel 3245; and the fourth flow sub-channel 3414 is formed by communicating the first side fourth branch flow channel 3144 and the second side sixth branch flow channel 3246 with each other, and the width W14 of the first side fourth branch flow channel 3144 is greater than the width W26 of the second side sixth branch flow channel 3246. That is, the first side branch flow channel and the second side branch flow channel constituting one flow sub-channel are in communication with each other.

By comparing FIG. 16 with FIG. 17, it can be seen that the total width of one first heat exchange surface 310, i.e., the first heat exchange width W1, is the sum of the widths of four heat exchange facets 3111-3114 of one first heat exchange surface first segment 311 and four heat exchange facets 3121-3124 of one first heat exchange surface second segment 312. In some embodiments, the first heat exchange width W1 may be considered to be twice the sum of the widths of the four heat exchange facets 3111-3114 of the first heat exchange surface first segment 311, namely W1=2*(W11+W12+W13+W14).

The total width of one second edge heat exchange surface 320, i.e., the second heat exchange width W2, is the sum of the widths of six heat exchange facets 3211-3216 of one second edge heat exchange surface first segment 321 and six heat exchange facets 3221-3226 of one second edge heat exchange surface second segment. In some embodiments, the second heat exchange width W2 may be considered to be twice the sum of the widths of the six heat exchange facets 3211-3216 of the second edge heat exchange surface first segment 321, namely W2=2*(W21+W22+W23+W24+W25+W26). In the case where W11+W12+W13+W14>W21+W22+W23+W24+W25+W26, the first heat exchange width W1 of the at least one first heat exchange surface 310 is greater than the second heat exchange width W2 of the at least one second edge heat exchange surface 320, namely W1>W2.

In the case where each battery unit has substantially the same length of direct contact or indirect contact with the first heat exchange surface 310 and the second edge heat exchange surface 320 of the thermal management component 300 in the length direction Y, the first heat exchange area S1 of one first heat exchange surface 310 is the sum of the heat exchange areas of four heat exchange facets 3111-3114 of one first heat exchange surface first segment 311 and four heat exchange facets 3121-3124 of one first heat exchange surface second segment 312. The second heat exchange area S2 of one second edge heat exchange surface 320 is the sum of the heat exchange areas of six heat exchange facets 3211-3216 of one second edge heat exchange surface first segment 321 and six heat exchange facets 3221-3226 of one second edge heat exchange surface second segment. In the case where the total width of the first heat exchange surface 310 is greater than the total width of the second edge heat exchange surface 320, the first heat exchange area S1 is also greater than the second heat exchange area S2, namely S1>S2.

Figure 18:
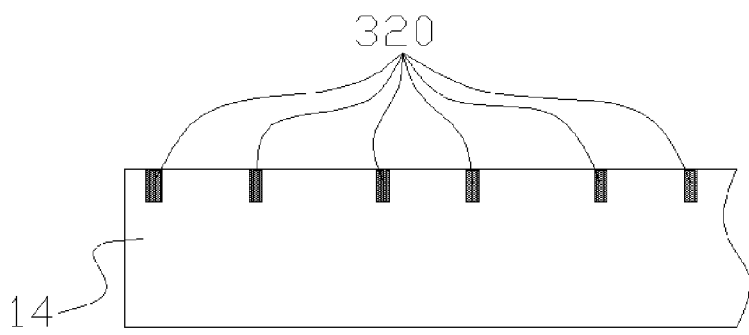
FIG. 18 is a cross-sectional view, along C-C, of a heat exchange portion between the battery unit and the second edge heat exchange surface first segment of the edge thermal management component shown in FIG. 11.
Figure 19:
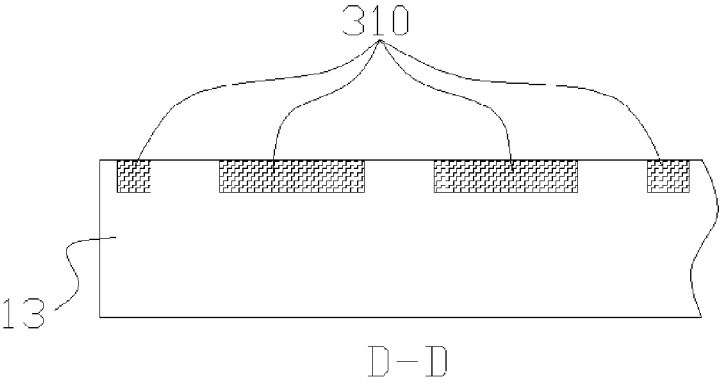
FIG. 19 is a cross-sectional view, along D-D, of a heat exchange portion between the battery unit and the first heat exchange surface first segment of the edge thermal management component shown in FIG. 11.

In addition, referring to FIGS. 18 and 19, FIG. 18 shows a partial schematic diagram of conduction type heat exchange between the surface of the outer battery unit 13 and the first heat exchange surface 310 as shown in a side view along the Y direction; and FIG. 19 shows a partial schematic diagram of conduction type heat exchange between the surface of the intermediate battery unit 14 and the second edge heat exchange surface 320 as shown in a side view along the Y direction. It can also be seen from FIGS. 18 and 19 that the first heat exchange width W1 is greater than the second heat exchange width W2, namely W1>W2; and the first heat exchange area S1 is also greater than the second heat exchange area S2, namely S1>S2.

In this embodiment, the ratio relationship between the second heat exchange area S2 and the first heat exchange area S1 can be precisely adjusted by adjusting the width/area of the branch flow channels and the number of branch flow channels on the first side plate 31 and the second side plate 32, and an appropriate ratio of the second heat exchange area to the first heat exchange area is determined according to actual requirements, so that more accurate heat exchange control is achieved. In this way, even if the two side plates 31 and 32 of the thermal management component are combined with battery units of the same type, the first side plate 31 and the second side plate 32 can produce different cooling effects on the battery units. In addition, by configuring part of the first side branch flow channel and the second side branch flow channels to be in communication with each other, the heat exchange fluid in the first heat exchange flow channel 34 can exchange heat with the battery units outside the first side plate 31 and the second side plate 32 at the same time, simplifying the design of the first heat exchange flow channel 34 and facilitating the manufacture of the thermal management component. Of course, if a partition plate is further provided between the first side plate 31 and the second side plate 32 such that the first side flow channel is not in communication with the second side flow channel, it is also possible that they respectively form an independent first heat exchange flow channel 34.

In some embodiments, the ratio of the second heat exchange width W2 to the first heat exchange width W1 is between 0.1-0.9. For example, W2/W1 may be selected among 0.15, 0.2, 0.25, 0.3, 0.35, 0.4, 0.45, 0.5, 0.6, 0.65, 0.7, 0.75, 0.8 and 0.85, but not limited to these specific values.

In some embodiments, the ratio of the second heat exchange area S2 to the first heat exchange area S1 is between 0.1-0.9. S2/S1 may be selected among 0.15, 0.2, 0.25, 0.3, 0.35, 0.4, 0.45, 0.5, 0.6, 0.65, 0.7, 0.75, 0.8 and 0.85, but not limited to these specific values.

In some embodiments not shown in the figures, it is also possible that only one first side flow channel 3100 is formed on the first side plate 31, and no branch flow channel is provided in the first side flow channel 3100. The second side flow channel 3200 of the second side plate 32 may also comprise a plurality of second side branch flow channels arranged at intervals as shown in the previous embodiments, and one first side flow channel 3100 is in communication with all the second side branch flow channels. A part of each of the second side branch flow channels that cooperates with one of the intermediate battery units forms a second edge heat exchange facet;

each of the second edge heat exchange surfaces comprises a plurality of the second edge heat exchange facets; and the second heat exchange area S2 is the sum of the surface areas of the plurality of the second edge heat exchange facets. One first side flow channel 3100 is provided. The second side flow channel 3200 is divided into a plurality of second side branch flow channels, and the second heat exchange area S2 is the sum of the surface areas of the second edge heat exchange facets of the plurality of second side branch flow channels. By adjusting the surface area and the number of second edge heat exchange facets, not only can the second heat exchange area be smaller than the first heat exchange area, but also the ratio relationship between the second heat exchange area S2 and the first heat exchange area S1 can be accurately adjusted, and an appropriate ratio of the second heat exchange area S2 to the first heat exchange area S1 can be determined according to actual requirements, so that more accurate heat exchange control is achieved.

In some embodiments, one first side flow channel 3100 and a plurality of second side branch flow channels are in communication with each other to form the first heat exchange flow channel 34. In this embodiment, by configuring one first side flow channel 3100 and a plurality of second side branch flow channels to be in communication with each other, the heat exchange fluid in the first heat exchange flow channel 34 can exchange heat with both the first side plate 31 and the second side plate 32, simplifying the design of the first heat exchange flow channel 34 and facilitating the manufacture of the edge thermal management component 300.

In some embodiments, each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the width of the first heat exchange surface; the second heat exchange width W2 is the sum of the widths of the plurality of second edge heat exchange facets; and the ratio of the second heat exchange width W2 to the first heat exchange width W1 is between 0.1-0.9. This arrangement can also realize that the first heat exchange width W1 of each first heat exchange surface is greater than the second heat exchange width W2 of each second edge heat exchange surface, namely W1>W2; and the first heat exchange area S1 is also greater than the second heat exchange area S2, namely S1>S2. In this way, the design of the first heat exchange flow channel 34 can be simplified, and the manufacture of thermal management component can be facilitated. Of course, if a partition plate is further provided between the first side plate 31 and the second side plate 32 such that the first side flow channel is not in communication with the second side flow channel, it is also possible that they respectively form an independent first heat exchange flow channel 34.

In some embodiments, the thermal management component 300 is further provided with a first turbulator portion 316. The first turbulator portion 316 is arranged in the first side flow channel 3100 and/or the second side flow channel 3200, and the first turbulator portion 316 is configured to generate a turbulent flow of the heat exchange fluid flowing through the first side flow channel 3100 and/or the second side flow channel 3200. By arranging the first turbulator portion 316 in the first side flow channel 3100 and/or the second side flow channel, the turbulence of the heat exchange fluid flowing through the first side flow channel 3100 and/or the second side flow channel 3200 can be caused, so that the heat exchange effect of the heat exchange fluid is improved.

Specifically, in one embodiment as shown in FIGS. 10, 11, 12 and 17, a plurality of first turbulator portions 316 are provided on the first side plate 31 corresponding to the second flow sub-channel 3412 and the third flow sub-channel 3413. The first turbulator portions 316 protrude from the first side second branch flow channel 3142 and the first side third branch flow channel 3143 toward the inside of the thermal management component 300. The first turbulator portions 316 may be in contact with the second side partition portion 326 on the opposite second side plate 32, or may have a certain gap from the second side partition portion 326. The first turbulator portions 316 can sufficiently cause turbulence in the second flow sub-channel 3412 and the third flow sub-channel 3413 to make the temperature of the heat exchange fluid in the first heat exchange flow channel 34 uniform, so as to make the temperature regulation of the battery units more even.

The plurality of first turbulator portions 316 are provided in the length direction Y of the second flow sub-channel 3412 and the third flow sub-channel 3413. In some embodiments, the plurality of first turbulator portions 316 may also be staggered in the width direction X. The first turbulator portion 316 may also be provided in the second side branch flow channel of the second side plate.

In some embodiments, the first turbulator portion 316 is arranged at a portion of the first side flow channel and/or the second side flow channel that does not cooperate with any battery unit. If the first turbulator portion 316 is arranged at a portion cooperating with a battery unit, the first turbulator portion 316 may occupy the surface area of the first heat exchange surface and/or the second edge heat exchange surface, thereby affecting the heat exchange effect. By arranging the first turbulator portion 316 at a portion that does not cooperate with any of the battery units, the first turbulator portion 316 will not affect the first heat exchange area S1 and the second heat exchange area S2, and can create a turbulent flow at the downstream first heat exchange surface 310 and/or second edge heat exchange surface 320, so that the heat exchange effect is increased. Specifically, as shown in FIG. 10, the first turbulator portion 316 is provided on the part of the arc-shaped outer wall of the first side plate 31 that protrudes in a direction away from the thermal management component 300, and this part does not cooperate with any battery unit. In this way, the first turbulator portion 316 will not affect the first heat exchange area S1 and the second heat exchange area S2.

A battery structure provided in the second aspect of the embodiments of the present application is shown in FIGS. 20-29. The edge thermal management components 400 and 500 in the embodiments shown in FIGS. 20-29 have the same structure as the thermal management component 300 provided in the first aspect of the embodiments of the present application, and refer to the description of the above embodiments for the specific structure.

The battery of the embodiment of the present application comprises at least three layers of battery units and a temperature regulation system. The at least three layers of battery units comprise two layers of outer battery units and at least one layer of intermediate battery units. The at least one layer of intermediate battery units is located between the two layers of outer battery units. Each layer of outer battery units and each layer of intermediate battery units respectively comprise a plurality of battery units. The temperature regulation system is configured to exchange heat with the outer battery units and with the intermediate battery units. The temperature regulation system comprises two sets of first heat exchange surfaces and a plurality of sets of second heat exchange surfaces. Each set of first heat exchange surfaces comprise a plurality of the first heat exchange surfaces, and each set of second heat exchange surfaces comprise a plurality of the second heat exchange surfaces. The first heat exchange surfaces and the second heat exchange surfaces can exchange heat with a heat exchange fluid inside the temperature regulation system. The temperature regulation system is configured such that a side face of each layer of outer battery units cooperates with a set of first heat exchange surfaces for temperature regulation, wherein a side face of each layer of outer battery units cooperates with one of the set of first heat exchange surfaces for temperature regulation, and at least one of the first heat exchange surfaces has a first heat exchange area S1; each layer of intermediate battery units is arranged between two sets of second heat exchange surfaces, and two opposite side faces of each layer of intermediate battery units respectively cooperate with an adjacent set of second heat exchange surfaces for temperature regulation; two opposite side faces of each intermediate battery unit respectively cooperate with an adjacent second heat exchange surface for temperature regulation; and the first heat exchange area S1 is greater than the heat exchange area of at least one of the second heat exchange surfaces.

In this embodiment, the temperature regulation system comprises two sets of first heat exchange surfaces and a plurality of sets of second heat exchange surfaces, and exchanges heat with two layers of outer battery units and at least one layer of intermediate battery units, wherein a side face of each layer of outer battery units exchanges heat with a set of first heat exchange surfaces, that is, each outer battery unit exchanges heat with the temperature regulation system through the first heat exchange area; and two opposite side faces of each layer of intermediate battery units respectively exchange heat with an adjacent set of second heat exchange surfaces, that is, each intermediate battery unit exchanges heat with the temperature regulation system through the heat exchange area of the two second heat exchange surfaces. Furthermore, the construction of a battery with odd-numbered layers of battery units and a battery with even-numbered layers of battery units can be realized, the number of layers and the thickness of the battery can then be designed more freely, and the battery has a better space adaptability. In addition, since the first heat exchange area is greater than the heat exchange area of the second heat exchange surface, it is possible to freely adjust the cooling effects of the intermediate battery units and the outer battery units. By changing the ratio of the first heat exchange area to the heat exchange area of the second heat exchange surface, the outer battery units and the intermediate battery units can obtain a relatively close cooling effect, reducing the temperature difference between the battery units, making the battery states thereof consistent, and improving the overall performance of the battery.

In some embodiments, a plurality of outer battery units in the same layer may be arranged in parallel in the length direction Y of the thermal management component, and one outer battery unit may be arranged in the width direction X of the thermal management component. Each outer battery unit may comprise one battery cell, or a plurality of coaxially-arranged battery cells.

The plurality of battery cells of one outer battery unit may be or may not be electrically connected to each other. The battery units in adjacent columns of each layer of outer battery units may be connected in series or in parallel via a busbar. The structure of each layer of intermediate battery units may refer to the structure of each layer of outer battery units.

In some embodiments, the ratio of the heat exchange area of the second heat exchange surface to the first heat exchange area S1 is between 0.1-0.9.

Figure 20:
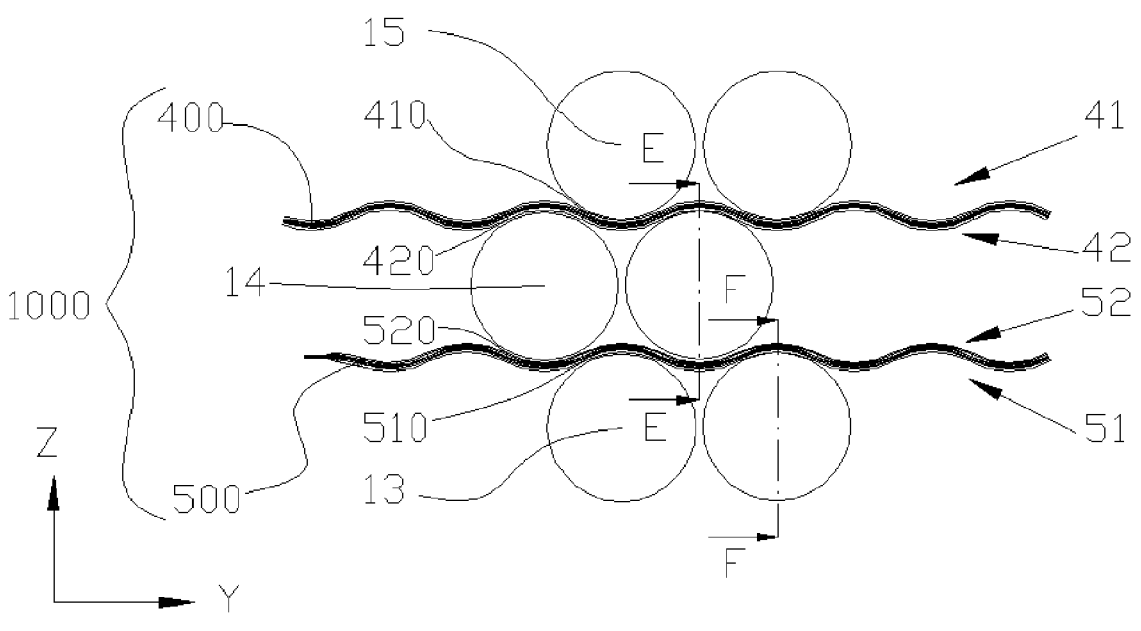
FIG. 20 is a schematic diagram of a battery having a three-layer battery unit structure according to an embodiment of the present application.

In some embodiments, as shown in FIGS. 20-24, the battery of this embodiment comprises three layers of battery units and a temperature regulation system 1000. As shown in FIG. 20, the three layers of battery units comprise two layers of outer battery units 13, 15 and one layer of intermediate battery units 14. The two layers of outer battery units 13, 15 and the one layer of intermediate battery units 14 are parallel to each other. Each layer of outer battery units 13, 15 comprises a plurality of outer battery units 13, 15; and the one layer of intermediate battery units 14 comprises a plurality of intermediate battery units 14. The temperature regulation system 1000 comprises two edge thermal management components 400, 500 arranged in parallel. The structures of the edge thermal management components 400, 500 shown in FIGS. 20-24 are the same as the structure of the thermal management component 300 in FIGS. 7-17, and the description thereof will not be repeated.

Specifically, a set of the first heat exchange surfaces 410 of the temperature regulation system 1000 are formed on the first side plate 41 of the edge thermal management component 400, and a set of the first heat exchange surfaces 510 of the temperature regulation system 1000 are also formed on the first side plate 51 of the edge thermal management component 500. The first heat exchange surfaces 410, 510 of the edge thermal management components 400, 500 have the same structure as the first heat exchange surface 310 in FIGS. 7-11, 16 and 17, and have a first heat exchange area S1. The plurality of sets of second heat exchange surfaces of the temperature regulation system 1000 comprise two sets of second edge heat exchange surfaces 420, 520 respectively formed on the second side plates 42, 52 of the two edge thermal management components 400, 500. The second edge heat exchange surfaces 420, 520 have the same structure as the second edge heat exchange surface 320 in FIGS. 13-17; and the second edge heat exchange surfaces 420, 520 have a second heat exchange area S2.

The two second side plates 42, 52 of the two edge thermal management components 400, 500 are adjacent to each other, and the two first side plates 41, 51 are opposite to each other. A layer of the outer battery units 13, 15 is arranged on each of the first side plates 41, 51 of the two edge thermal management components 400, 500, and a side face of each of the outer battery units 15, 13 cooperates with a corresponding first heat exchange surface 410, 510. A layer of the intermediate battery units 14 is arranged between the two edge thermal management components 400, 500, and two opposite side faces of each of the intermediate battery units 14 respectively exchange heat with one of the second edge heat exchange surfaces 420, 520 of the two edge thermal management components 400, 500.

Figure 21:
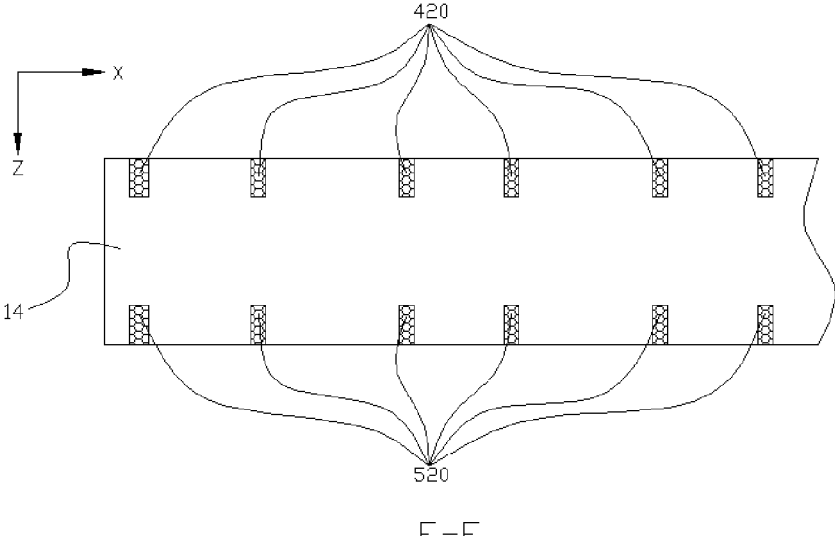
FIG. 21 is a schematic cross-sectional view of a heat exchange portion between the battery unit and a heat exchange surface segment of the thermal management component, along E-E portion in FIG. 20.
Figure 22:
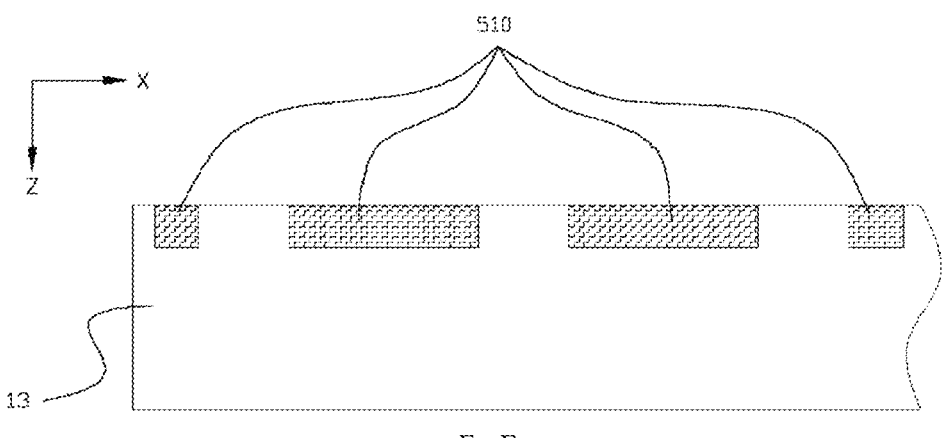
FIG. 22 is a schematic cross-sectional view of a heat exchange portion between the battery unit and a heat exchange surface segment of the thermal management component, along F-F portion in FIG. 20.

In this way, referring to FIGS. 21 and 22, FIG. 21 shows a partial schematic diagram of a portion where the intermediate battery unit 14 cooperates with the two thermal management components 400, 500 for temperature regulation as shown in a side view along the Y direction. An upper side face of the intermediate battery unit 14 exchanges heat with the second edge heat exchange surface 420 of the second side plate 42 of the upper edge thermal management component 400, and the heat exchange area is the second heat exchange area S2; and a lower side face of the intermediate battery unit 14 exchanges heat with the second edge heat exchange surface 520 of the second side plate 52 of the upper edge thermal management component 500, and the heat exchange area is also the second heat exchange area S2, so the total heat exchange area between the intermediate battery unit 14 and the two edge thermal management components 400, 500 is twice the second heat exchange area, 2S2. FIG. 19 shows a partial schematic diagram of a portion where the outer battery unit 13 cooperates with one of the thermal management components 500 for temperature regulation as shown in a side view along the Y direction. The surface of the outer battery unit 13 performs conduction type heat exchange with the first heat exchange surface 510 of the first side plate 51 of the lower edge thermal management component 500, and the total heat exchange area is the first area S1. In the uppermost layer of outer battery units, the total heat exchange area between one outer battery unit 15 and the edge thermal management component 400 is the same as the total heat exchange area of the outer battery unit 13, and is also S1.

According to the embodiments in the first aspect, the ratio of the second heat exchange area S2 to the first heat exchange area S1 is between 0.1-0.9. S2/S1 may be 0.15, 0.2, 0.25, 0.3, 0.35, 0.4, 0.45, 0.5, 0.6, 0.65, 0.7, 0.75, 0.8 and 0.85. Therefore, in the battery of this embodiment, the total heat exchange area ratio 2S2/S1 of the intermediate battery unit to the outer battery unit may be between 0.2-1.8. In some embodiments, 2S2/S1 may be 0.3, 0.4, 0.5, 0.6, 0.7, 0.8, 0.9, 1.0, 1.1, 1.2, 1.3, 1.4, 1.5, 1.6, 1.7, etc., but not limited to these specific values. The total heat exchange area ratio 2S2/S1 of the intermediate battery unit 14 to the outer battery unit 13, 15 can be selected in an appropriate range according to actual requirements. As an example, when the intermediate battery unit 14 and the outer battery unit 13, 15 are of the same type, 2S2/S1 may be between 0.3-1.2, for example, between 0.4-1.0 or 0.3-0.6, or 0.6-0.8. In this way, the intermediate battery unit 14 and the outer battery units 13, 15 can obtain substantially the same cooling effect, so that the temperatures and performances of the intermediate battery units 14 and the outer battery units 13, 15 are kept consistent, and the battery has more stable performance, good reliability and longer life. As another example, when the heat dissipation effect of the intermediate battery unit 14 is poor, or the intermediate battery unit 14 and the outer battery units 13, 15 are of different types, etc., so that the intermediate battery unit 14 needs a stronger cooling effect, 2S2/S1 may also be between 1.2-1.8, for example, between 1.3-1.6 or 1.4-1.5. In this way, the intermediate battery can obtain stronger temperature regulation performance, so that the temperatures and performances of the intermediate battery units 14 and the outer battery units 13, 15 are kept consistent, and the battery has more stable performance, good reliability and longer life. Therefore, the battery of this embodiment can realize the freely adjustable cooling effects of the intermediate battery unit 14 and the outer battery units 13, 15 by adjusting the ratio of 2S2/S1, and can be compatible with different types of batteries, so as to meet different temperature regulation performance requirements of batteries at different portions. In addition, the combination of odd-numbered layers of batteries can also be realized, and the two side plates of each thermal management component are both configured to perform temperature regulation on the battery units, and the number of thermal management components is one less than the number of layers of battery units. The overall thickness of the battery is reduced, and a better space adaptability is provided.

Figure 23:
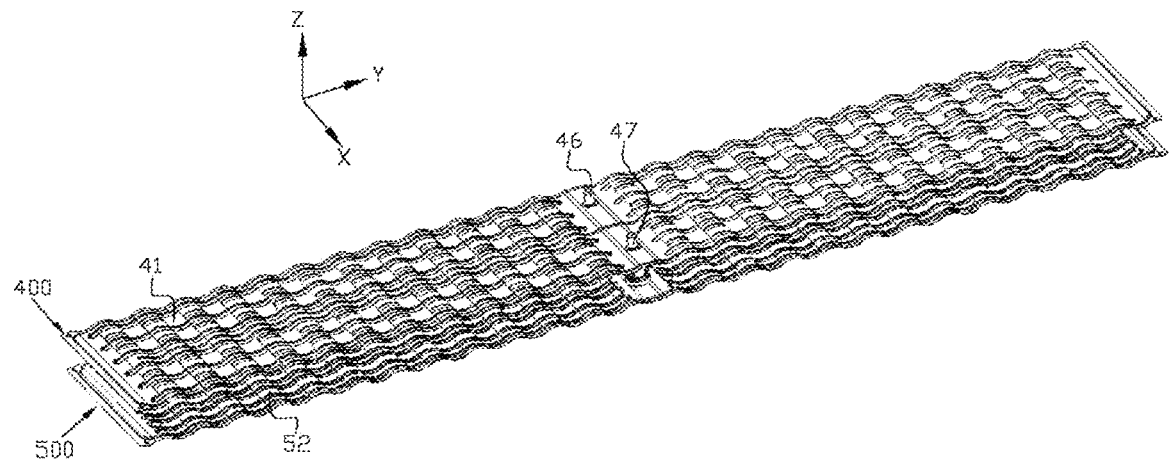
FIG. 23 is a schematic perspective view of a combined structure of thermal management components of a battery according to an embodiment of the present application.
Figure 24:
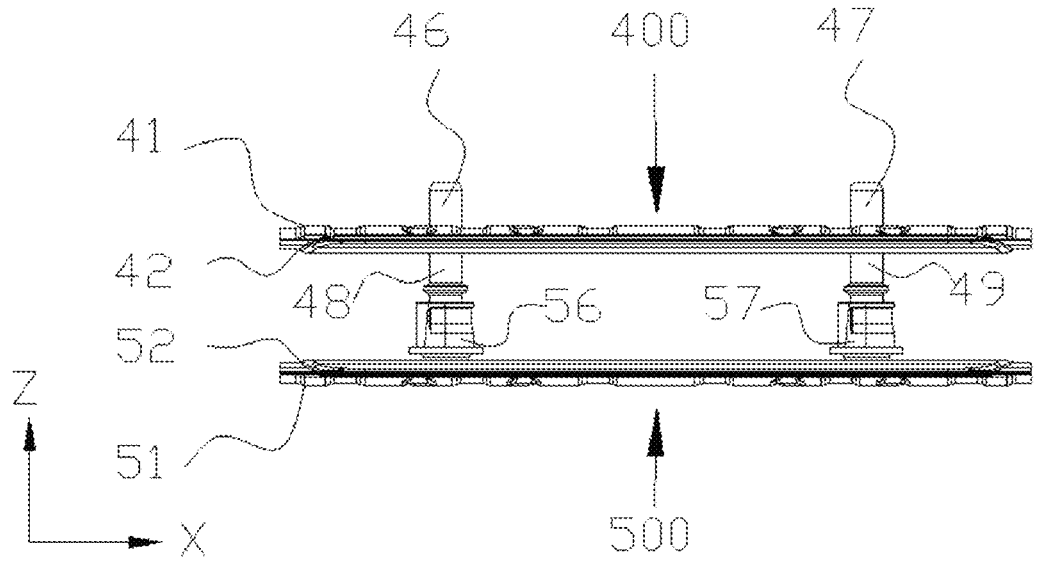
FIG. 24 is a schematic diagram of the battery of FIG. 23 in the Y direction.

In some embodiments, as shown in FIGS. 23 and 24, the two edge thermal management components 400, 500 are in heat exchange fluid communication with each other. Specifically, the edge thermal management component 400 is provided with a first liquid inlet 46 and a first liquid outlet 47. The first liquid inlet 46 and the first liquid outlet 47 have the same structure as the liquid inlet 36 and the liquid outlet 37 in FIG. 10. On this basis, the edge thermal management component 400 is further provided with a second liquid outlet 48 and a second liquid inlet 49. The second liquid outlet 48 is in communication with the first liquid inlet 46, and the second liquid inlet 49 is in communication with the first liquid outlet 47. The lower edge thermal management component 500 is provided with a third liquid inlet 56 and a third liquid outlet 57. Then, the third liquid inlet 56 is in communication with the second liquid outlet 48, and the third liquid outlet 57 is in communication with the second liquid inlet 49, and the two edge thermal management components 400, 500 are thus in heat exchange fluid communication with each other. In this way, the two thermal management components 400, 500 are connected to the same thermal management system, so that the pipeline can be simplified, the cost can be reduced, and the battery can have a more compact structure. However, the way of making the two edge thermal management components 400, 500 in heat exchange fluid communication with each other is not limited to the way shown in FIGS. 23 and 24. The way of making the two edge thermal management components 400, 500 in heat exchange fluid communication with each other may be series connection or parallel connection, which will not be limited in the present application.

Figures 25, 26:
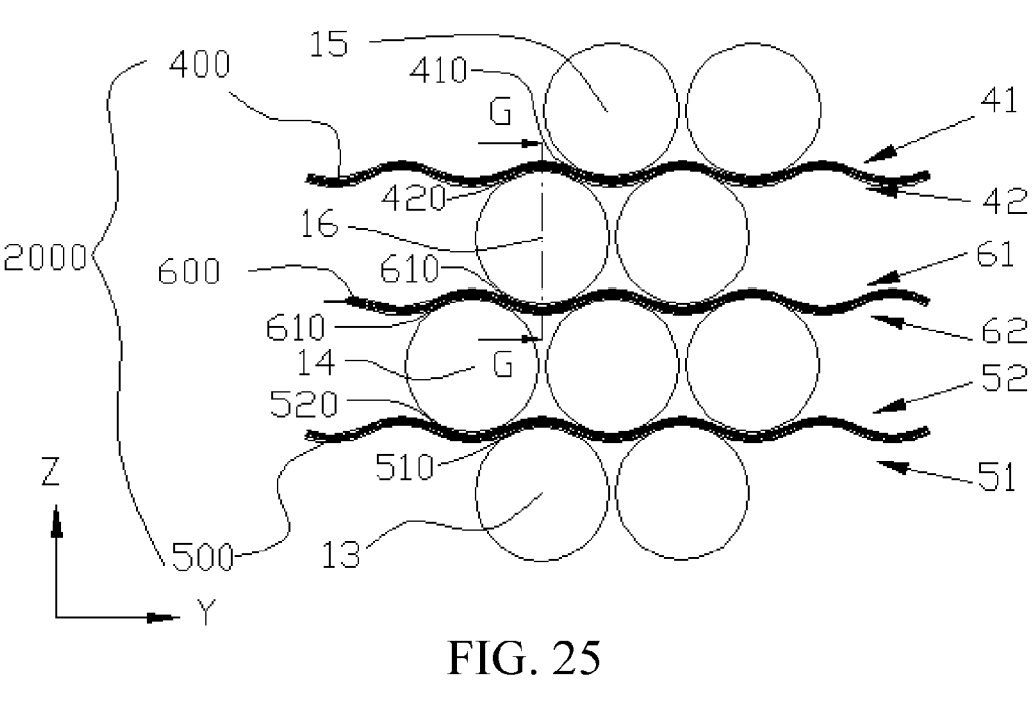
FIG. 25 is a schematic diagram of a battery having a four-layer battery unit structure according to an embodiment of the present application.
FIG. 26 is a schematic cross-sectional view of a heat exchange portion between the battery unit and a heat exchange surface segment of the thermal management component, along G-G portion in FIG. 25.

In some embodiments, as shown in FIG. 25, four or more layers of battery units are provided, comprising two layers of outer battery units 13, 15 and at least two layers of intermediate battery units. The temperature regulation system 2000 comprises two edge thermal management components 400, 500 arranged in parallel, and at least one intermediate thermal management component 600. The at least one intermediate thermal management component 600 is arranged between the two edge thermal management components 400, 500, and the intermediate thermal management component 600 is arranged in parallel with both the edge thermal management components 400, 500. The two second side plates 42, 52 of the two edge thermal management components 400, 500 are respectively adjacent to one of the third side plates 61, 62 of one of the intermediate thermal management components 600. The two first side plates 41, 51 of the two edge thermal management components 400, 500 are opposite to each other.

A layer of the outer battery units 13, 15 is arranged on each of the first side plates 41, 51 of the two edge thermal management components 400, 500. The outer battery units 13, 15 cooperate with the first heat exchange surfaces 410 and 510 of the corresponding first side plates 41, 51. The specific cooperation method is the same as that shown in FIGS. 20 and 22, and the description will not be repeated here.

A layer of intermediate battery units is arranged between each of the edge thermal management components 400, 500 and an adjacent one of the intermediate thermal management components 600; in the layer of intermediate battery units cooperating with the edge thermal management component 400, two side faces of each of the intermediate battery units respectively cooperate with the second edge heat exchange surface 420, 520 of the second side plates 42, 52 of the edge thermal management component 400, 500, and the second intermediate heat exchange surface 610 of the third side plate 61 of the one of the intermediate thermal management components 600, and/or a layer of intermediate battery units 17 is further arranged between every two adjacent intermediate thermal management components 600, and in a layer of intermediate battery units 17 cooperating with the intermediate thermal management components 600 on two sides, two side faces of each of the intermediate battery units 17 respectively cooperate with the second intermediate heat exchange surfaces 610 of the opposite third side plates 62 of the two intermediate thermal management components 600.

Compared with the embodiment of FIG. 20, the difference of the embodiment of FIG. 25 is that at least one intermediate thermal management component 600 and at least one layer of intermediate battery units are additionally provided. The number of the intermediate thermal management components 600 is the number of layers of the battery units minus 3.

The structure of the battery having the intermediate thermal management component 600 will be specifically described below.

In some embodiments, as shown in FIG. 25, the battery has four layers of battery units, comprising two layers of outer battery units 13, 15 and two layers of intermediate battery units 14, 16, and the temperature regulation system 2000 comprises two edge thermal management components 400, 500 and one intermediate thermal management component 600. The one intermediate thermal management component 600 is arranged between the two edge thermal management components 400, 500, and the intermediate thermal management component is arranged in parallel with both the edge thermal management components. The two second side plates 42, 52 of the two edge thermal management components 400, 500 are respectively adjacent to one of the third side plates 61, 62 of the one intermediate thermal management components 600. The two first side plates 41, 51 of the two edge thermal management components 400, 500 are opposite to each other. A layer of the outer battery units 13, 15 is arranged on each of the first side plates 41, 51 of the two edge thermal management components 400, 500. The outer battery units 13, 15 cooperate with the first heat exchange surfaces of the corresponding first side plates 41, 51. The specific structure and cooperation method are the same as those shown in FIGS. 20 and 22, and the description will not be repeated here.

On the other hand, as shown in FIG. 25, a layer of intermediate battery units 14, 16 is arranged between each of the edge thermal management components 400, 500 and an adjacent one of the intermediate thermal management components 600; and in the layer of intermediate battery units 14, 16 cooperating with the edge thermal management component 400, 600, a side face of each of the intermediate battery units 14, 16 respectively cooperates with the second edge heat exchange surface 420, 520 of the second side plates 42, 52 of the edge thermal management component 400, 500, and a further side face of each of the intermediate battery units 14, 16 cooperates with the second intermediate heat exchange surface 610 of the third side plate 61 of the one of the intermediate thermal management components 600.

As shown in FIG. 26, specifically taking the intermediate battery unit 16 as an example, an upper side face of the intermediate battery unit 16 exchanges heat with the second edge heat exchange surface 420 of the second side plate 42 of the upper edge thermal management component 400, and the heat exchange area is the second heat exchange area S2; and a lower side face of the intermediate battery unit 14 exchanges heat with the second intermediate heat exchange surface 610 of the third side plate 61 of the upper intermediate thermal management component 600, and the heat exchange area is the third heat exchange area S3, so the total heat exchange area between the intermediate battery unit 16 and one edge thermal management component 400 and one intermediate thermal management component 600 is the sum S2+S3 of the second heat exchange area S2 and the third heat exchange area S3. The heat exchange area between the outer battery unit 13, 15 and the edge thermal management component is S1. The intermediate battery unit 14 may refer to the intermediate battery unit 16 for details.

The ratio of the second heat exchange area S2 to the first heat exchange area S1 is between 0.1-0.9, and the ratio of the third heat exchange area S3 to the first heat exchange area S1 is between 0.1-0.9. Therefore, in the battery of this embodiment, the ratio of the total heat exchange area of the intermediate battery unit 14, 16 to that of the outer battery unit 13, 15 is the ratio (S2+S3)/S1 of the sum of the first heat exchange area S2 and the second heat exchange area S3 to the first heat exchange area S1, which may be between 0.2-1.8. In some embodiments, (S2+S3)/S1 may be 0.3, 0.4, 0.5, 0.6, 0.7, 0.8, 0.9, 1.0, 1.1, 1.2, 1.3, 1.4, 1.5, 1.6, 1.7, etc., but not limited to these specific values. The total heat exchange area ratio (S2+S3)/S1 of the intermediate battery unit 14, 16 to the outer battery unit 13, 15 can be selected in an appropriate range according to actual requirements. As an example, when the intermediate battery unit 14 and the outer battery unit 13, 15 are of the same type, (S2+S3)/S1 may be between 0.3-1.2, for example, between 0.4-1.0 or 0.3-0.6, or 0.6-0.8. In this way, the intermediate battery unit 14, 16 and the outer battery units 13, 15 can obtain substantially the same cooling effect, so that the temperatures and performances of the intermediate battery units 14, 16 and the outer battery units 13, 15 are kept consistent, and the battery has more stable performance, good reliability and longer life. As another example, when the heat dissipation effect of the intermediate battery unit 14, 16 is poor, or the intermediate battery unit 14, 16 and the outer battery units 13, 15 are of different types, etc., so that the intermediate battery unit 14, 16 needs a stronger cooling effect, (S2+S3)/S1 may also be between 1.2-1.8, for example, between 1.3-1.6 or 1.4-1.5. In this way, the intermediate battery can obtain stronger temperature regulation performance, so that the temperatures and performances of the intermediate battery units 14 and the outer battery units 13, 15 are kept consistent, and the battery has more stable performance, good reliability and longer life.

Therefore, the battery of this embodiment can realize the freely adjustable cooling effects of the intermediate battery units 14, 16 and the outer battery units 13, 15 by adjusting the ratio of (S2+S3)/S1, and can be compatible with different types of batteries, so as to meet different temperature regulation performance requirements of batteries at different portions. In addition, by using the intermediate thermal management component, the battery can achieve temperature regulation of four or more, odd- or even-numbered layers of battery units, so that the grouping of the battery is more flexible, the two side plates of each thermal management component can be both used for performing temperature regulation on the battery units, and the number of thermal management components is one less than the number of layers of battery units. The overall thickness of the battery is reduced, and a better space adaptability is provided. In addition, the second heat exchange area S2 and the third heat exchange area S3 may be the same or different, so that the size and ratio relationship of the first heat exchange area S1, the second heat exchange area S2 and the third heat exchange area S3 can be adjusted by combining different edge thermal management components and intermediate management components, various forms of battery units can be the combined, and differentiated design and more precise temperature regulation control can be implemented for different temperature regulation performance requirements of battery cooling units of each layer and the temperature difference of the heat exchange fluid in the thermal management components at various positions, so that the temperatures and performances of the intermediate battery units 14 and the outer battery units 13, 15 are kept consistent, and the battery has more stable performance, good reliability and longer life.

In some embodiments, the two edge thermal management components 400, 500 and the intermediate thermal management component 600 are in heat exchange fluid communication with each other, and the heat exchange fluid communication may be series connection or parallel connection, which will not be limited in the embodiments of the present application. Of course, the two edge thermal management components 400, 500 and the intermediate thermal management component may alternatively be not in communication with each other and operate independently.

Figure 27:
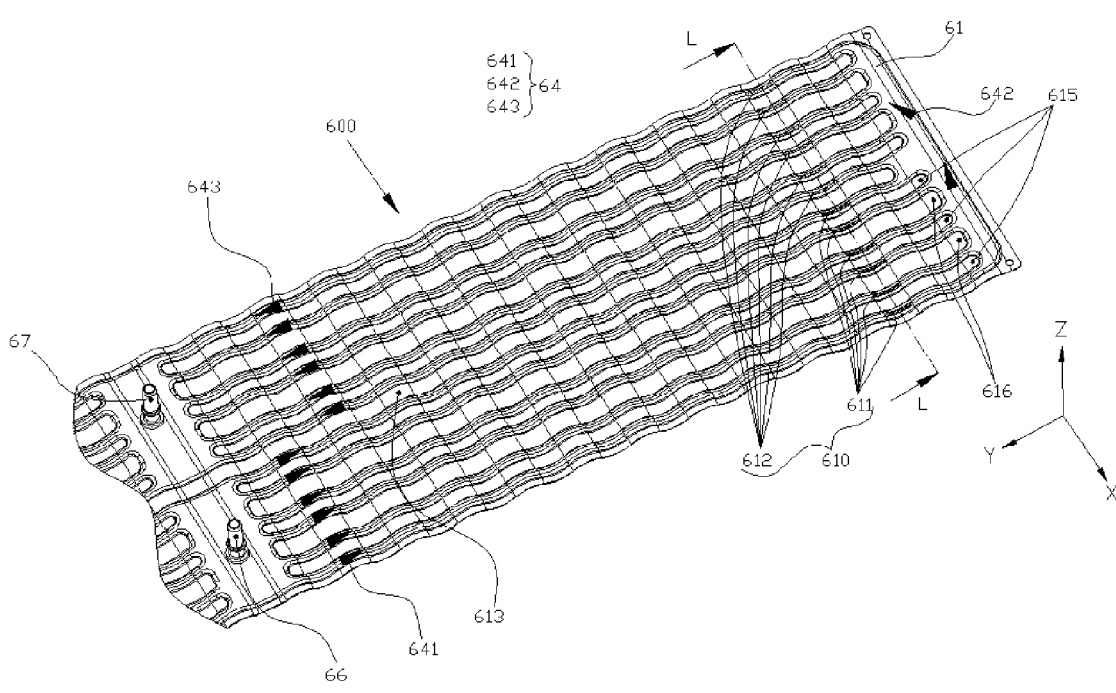
FIG. 27 is a schematic structural diagram of an intermediate thermal management component according to an embodiment of the present application.

Specifically, as shown in FIG. 27, the structure of an intermediate thermal management component 600 according to an embodiment of the present application is shown. Third side plates 61 and 62 on two sides of the intermediate thermal management component have a similar structure to the second side plate 32 of the thermal management component 300 in FIG. 13. The two third side plates 61, 62 are arranged symmetrically with respect to the center line of the thickness direction Z of the intermediate thermal management component 600.

A second heat exchange flow channel 64 through which heat exchange fluid flows is formed in the intermediate thermal management component 600, and the intermediate thermal management component comprises a fourth liquid inlet 66 and a fourth liquid outlet 67 which are in communication with the second heat exchange flow channel 64. A second heat exchange flow channel 64 comprises a plurality of flow channel segments arranged in a circuitous manner, and a third isolation portion 63 provided between two adjacent flow channel segments. The second heat exchange flow channel 64 further comprises a second intermediate flow channel segment 642, and the two adjacent flow channel segments are in communication with each other through the second intermediate flow channel segment 642.

Specifically, as shown in FIG. 27, in this embodiment, a second heat exchange flow channel 64 is provided with a third flow channel segment 641 which is in communication with the third liquid inlet 66, and a fourth flow channel segment 643 which is in communication with the third liquid outlet 67. The third flow channel segment 641 and the fourth flow channel segment 643 extend in the length direction Y of the intermediate thermal management component 600. A third isolation portion 63 is provided between the third flow channel segment 641 and the fourth flow channel segment 643, and the third isolation portion 63 separates the third flow channel segment 641 from the fourth flow channel segment 643. The second intermediate flow channel segment 642 is located at an edge of the third isolation portion 633, and the second intermediate flow channel segment 642 extends in the width direction X of the intermediate thermal management component. The adjacent third flow channel segment 641 and fourth flow channel segment 643 are in communication with each other through the second intermediate flow channel segment 642. As a whole, the second heat exchange flow channel 64 forms a circuitous structure, and the adjacent third flow channel segment 641 and fourth flow channel segment 643 are folded 180°, so that the cooling space for cooling the battery units is relatively compact. The number of segments of one second heat exchange flow channel 64 is determined according to the size of the battery actually to be cooled and the actual use environment, and the specific number and specific length dimension of flow channel segments are not limited. Since the heat exchange fluid near the third liquid inlet 66 is at a lower temperature, and the heat exchange fluid near the third liquid outlet 67 is at a higher temperature, one third heat exchange surface 610 that exchanges heat with one battery unit includes both a heat exchange facet at a lower temperature near the third liquid inlet 66 and a heat exchange facet at a higher temperature near the third liquid outlet 67, which can neutralize the temperature so that the battery unit will not be at an extreme temperature, and at the same time, it is possible that the temperatures of the battery units near the third liquid inlet 66 and the third liquid outlet 67 are not much different from the temperature of the battery units near the second intermediate flow channel segment 642 (located at the end of the intermediate thermal management component 600), improving the temperature uniformity of the battery unit.

In some embodiments, a second heat exchange flow channel 64 is respectively provided on either side of the third liquid inlet 66 and the third liquid outlet 67. Specifically, the third liquid inlet 66 and the third liquid outlet 67 are arranged in the middle of the intermediate thermal management component in the length direction Y, a second heat exchange flow channel 64 is respectively provided on either side of the third liquid inlet and the third liquid outlet, and the second heat exchange flow channels 64 on the two sides are both in communication with the third liquid inlet 66 and the third liquid outlet 67, so that the third liquid inlet 66 and the third liquid outlet are 67 can supply liquid to the two first heat exchange flow channels 64 at the same time. The third liquid inlet 66 and the third liquid outlet 67 are arranged in the middle of the thermal management component 600, and a second heat exchange flow channel 64 is respectively provided on either side of the connecting line between the third liquid inlet 66 and the third liquid outlet 67, so that it is possible to shorten the flow distance of the heat exchange fluid, to increase the effective flow resistance of parallel circuits of the heat exchange fluid, and at the same time, to improve the temperature consistency of the battery units on two sides of the connecting line between the third liquid inlet 66 and the third liquid outlet 67 of the intermediate thermal management component 600.

Figure 28:
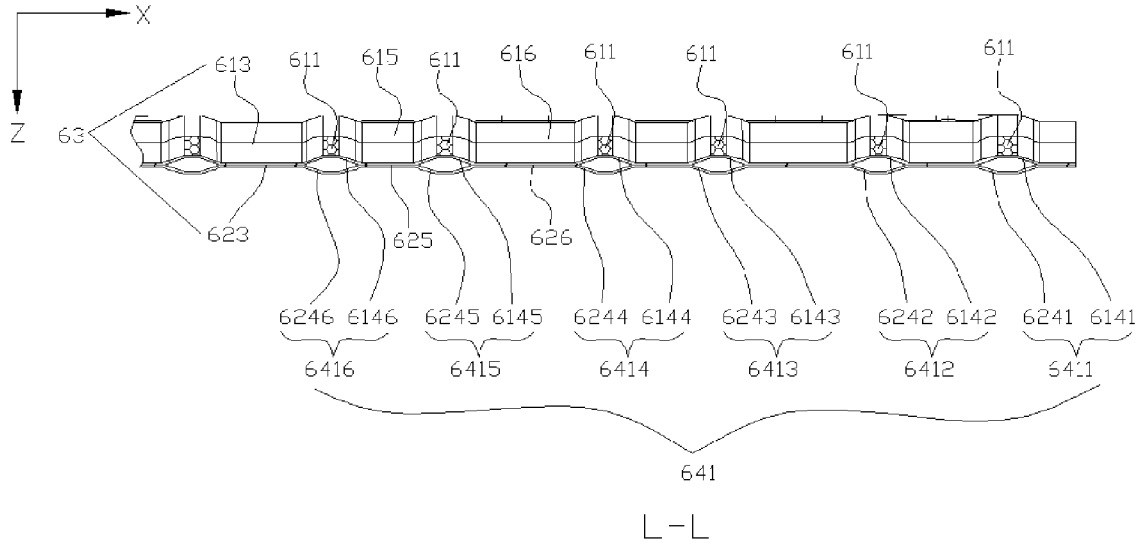
FIG. 28 is a schematic cross-sectional view, along L-L, of the intermediate thermal management component shown in FIG. 27.

Specifically, as shown in FIGS. 27 and 28, a third side flow channel segment is formed at each of the two third side plates 61, 62 of the intermediate thermal management component 600 at the position corresponding to the third flow channel segment 641, and a portion of the third side flow channel segment 614 that cooperates with one intermediate battery unit forms a plurality of second intermediate heat exchange surface first segments 611 arranged in the length direction Y. Each third side flow channel segment comprises a plurality of third side branch flow channels. In some embodiments, one third side branch flow channel segment comprises six third side branch flow channels, namely a third side first branch flow channel 6141, a third side second branch flow channel 6142, a third side third branch flow channel 6143, a third side fourth branch flow channel 6144, a third side fifth branch flow channel 6145 and a third side sixth branch flow channel 6146. The six third side branch flow channels are portioned by a number of third side partition portions 625 and 626. The six third side branch flow channels protrude from the third side plate 61, and a part of each third side branch flow channel that cooperates with one of the intermediate battery units 14 forms a third heat exchange facet. That is, the part of the arc-shaped outer wall, which is recessed toward the inside of the intermediate thermal management component 600, of each third side branch flow channel that cooperates with the intermediate battery unit 14 forms a third heat exchange facet. The structure of the fourth flow channel segment 643 may refer to the structure of the third flow channel segment 641.

Figure 29:
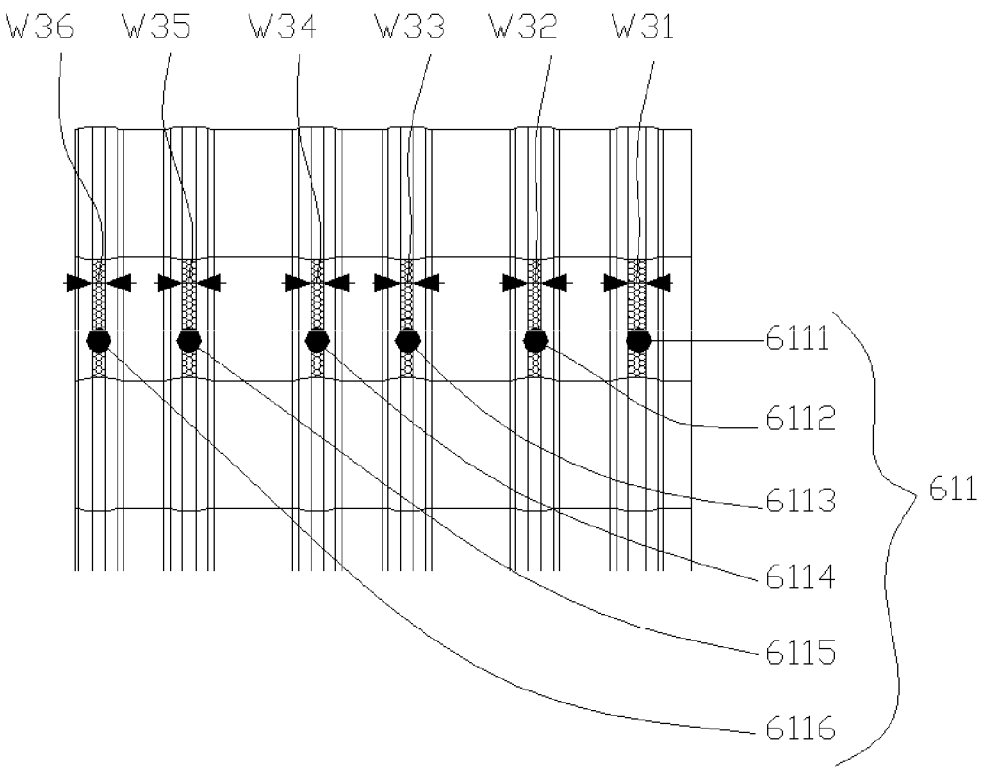
FIG. 29 is a schematic diagram of a second intermediate heat exchange surface first segment of the intermediate thermal management component shown in FIG. 27.

Specifically, as shown in FIG. 29, a second intermediate heat exchange surface first segment 611 comprises a third heat exchange first facet 6111 located at the third side first branch flow channel 6141, a third heat exchange second facet 6112 located at the third side second branch flow channel 6142, a third heat exchange third facet 6113 located at the third side third branch flow channel 6143, a third heat exchange fourth facet 6114 located at the third side fourth branch flow channel 6144, a third side fifth facet 6115 located at the third side fifth branch flow channel 6145, and a third heat exchange sixth facet 6116 located at the third side sixth branch flow channel 6146. The third heat exchange first facet 6111, the third heat exchange second facet 6112, the third heat exchange third facet 6113, the third heat exchange fourth facet 6114, the third heat exchange fifth facet 6115 and the third heat exchange sixth facet 6116 are located on the same recessed arc-shaped outer wall of the third side plate 61, and the third heat exchange first facet 6111, the third heat exchange second facet 6112, the third heat exchange third facet 6113, the third heat exchange fourth facet 6114, the third heat exchange fifth facet 6115 and the third heat exchange sixth facet 6116 are arranged in the width direction X. Similarly, at a portion where the third flow channel segment 641 is provided, a third side flow channel segment is also formed at the third side plate 61 of the intermediate thermal management component 600 at the position corresponding to the third flow channel segment 641, and a portion of the third side flow channel segment that cooperates with the third battery unit 14 forms a plurality of second intermediate heat exchange surface second segments 612 arranged in the length direction Y. Each second intermediate heat exchange surface second segment is arranged in parallel with one second intermediate heat exchange surface first segment 611 in the width direction X. Each second intermediate heat exchange surface second segment 612 also comprises six third heat exchange facets arranged in the width direction X. The structure of the second intermediate heat exchange surface second segment 612 may refer to the structure of the second intermediate heat exchange surface first segment 611, and the second intermediate heat exchange surface second segment 612 and the second intermediate heat exchange surface first segment 611 may have the same structure, or may be mirror-symmetrical with respect to the third isolation portion 63.

Specifically, as shown in FIG. 27, one second intermediate heat exchange surface first segment 611 and one second intermediate heat exchange surface second segment 612 arranged in parallel constitute one second intermediate heat exchange surface 610. One second intermediate heat exchange surface 610 is composed of twelve third heat exchange facets. However, the present application is not limited to this. If the second intermediate heat exchange surface first segment 611 or the plurality of smaller third heat exchange facets 6111-6116 are used to perform temperature regulation on one battery unit, the second intermediate heat exchange surface may also be the second intermediate heat exchange surface first segment 611 or the plurality of smaller third heat exchange facets. The number of segments and the number of facets of the second intermediate heat exchange surface 610 depend on the number of flow channel segments and the number of third side flow channel segments in each flow channel segment, may be determined according to the size of the battery actually to be cooled and the actual use environment are both not specifically limited. One second intermediate heat exchange surface 610 cooperates with one intermediate battery unit 14 for temperature regulation, and one intermediate battery unit 14 may comprise one battery cell, or a plurality of battery cells.

Specifically, each of the second intermediate heat exchange surfaces 610 is arranged in the width direction of the intermediate thermal management component 600, and the set of the second intermediate heat exchange surfaces 610 are arranged in the length direction of the intermediate thermal management component 600.

Specifically, the third heat exchange area S3 of at least one of the second intermediate heat exchange surfaces 610 is the sum of the surface areas of a plurality of third heat exchange facets that cooperate with one intermediate battery unit 14 for temperature regulation. Specifically, the third heat exchange area S3 of one second intermediate heat exchange surface 610 is the sum of the surface areas of six third heat exchange facets 6111-6116 of one second intermediate heat exchange surface first segment 611 and six third heat exchange facets of one second intermediate heat exchange surface second segment 612.

In some embodiments, as shown in FIG. 29, in one second intermediate heat exchange surface first segment 611, in the length direction Y, the widths of the third side first branch flow channel 6141, the third side second branch flow channel 6142, the third side third branch flow channel 6143, the third side fourth branch flow channel 6144, the third side fifth branch flow channel 6145 and the third side sixth branch flow channel 6146 all remain unchanged. The third heat exchange first facet 6111 has a first sub-width W31, the third heat exchange second facet 6112 has a third sub-width W32, the third heat exchange third facet 6123 has a third sub-width W33, the third heat exchange fourth facet 6114 has a fourth sub-width W34, the third heat exchange fifth facet 6125 has a fifth sub-width W35, and the third heat exchange sixth facet 6116 has a sixth sub-width W36. The first sub-width W31, the third sub-width W32, the third sub-width W33, the fourth sub-width W34, the fifth sub-width W35 and the sixth sub-width W36 may be the same or different, which will not be limited. In this way, the width of one second intermediate heat exchange surface 610 is the sum of the widths of the plurality of third heat exchange facets. Specifically, in FIG. 25, the total width of one second intermediate heat exchange surface 610, i.e. the third heat exchange width W3, is the sum of the widths of six heat exchange facets 6111-6116 of one second intermediate heat exchange surface first segment 611 and six heat exchange facets of one second intermediate heat exchange surface second segment 612.

In some embodiments, the width of the side branch flow channel of one second intermediate heat exchange surface segment may vary in the length direction Y, not a fixed value. In this case, the width of one third heat exchange facet is the average width thereof in the length direction Y, and the total width of one second intermediate heat exchange surface, i.e., the third heat exchange width W3, is the sum of the average widths of the plurality of third heat exchange facets.

In some embodiments, as shown in FIG. 28, the third side flow channels of the two third side plates 61, 62 are combined to form the second heat exchange flow channel 64. Specifically, the second heat exchange flow channel 64 may comprise a plurality of flow sub-channels, and the side flow channel on each of the third side plates 61, 62 may comprise a plurality of side branch flow channels. Each flow sub-channel comprises at least one branch flow channel of one of the third side plates 61 and at least one side branch flow channel of the other third side plate 62, and the side branch flow channels constituting one flow sub-channel are in communication with each other. With this arrangement, the second heat exchange flow channel 64 is divided into a plurality of flow sub-channels, and the heat exchange fluid in each flow sub-channel can exchange heat with both the two third side plates, simplifying the design of the second heat exchange flow channel 64 and facilitating the manufacture of the thermal management component.

Specifically, referring to FIGS. 28 and 29, a third side isolation portion 613 is provided on the third side plate 61, and a fourth side isolation portion 623 is provided on the third side plate 62. The third side isolation portion 613 is connected to the fourth side isolation portion 623 to form a third isolation portion 63, which divides the intermediate thermal management component 600 into a third flow channel segment 641 and a fourth flow channel segment 642 which are separated from each other. The third side plate 61 is provided with six third side branch flow channels, namely a third side first branch flow channel 6141, a third side second branch flow channel 6142, a third side third branch flow channel 6143, a third side fourth branch flow channel 6144, a third side fifth branch flow channel 6145, and a third side sixth branch flow channel 6146. The third side plate 62 is symmetrically arranged with respect to the third side plate 61, and is also provided with six fourth side branch flow channels 6241-6246. The third side branch flow channels 6141-6146 and the fourth side branch flow channels 6241-6246 are mirror-symmetrical with respect to the center line in the thickness direction Z of the intermediate thermal management component 600, and the two opposite third side branch flow channels and fourth side branch flow channels are in communication with each other to form six second flow sub-channels 6411-6416. A plurality of third side partition portions 625 and 626 are provided on each of the third side plates 61, 62 to partition the six second flow sub-channels 6411-6416. The fourth flow channel segment 643 has the same structure as the third flow channel segment 641. The second heat exchange flow channel 64 comprises a plurality of second flow sub-channels arranged in parallel perpendicular to the flow direction of the heat exchange fluid, each second flow sub-channel comprises at least two of the third side branch flow channels, and the at least two of the third side branch flow channels constituting one second flow sub-channel are in communication with each other.

It can be seen with reference to FIGS. 27 and 29 that the total width of one of the second intermediate heat exchange surfaces 610 of the third side plates 61 and 62, that is, the third heat exchange width W3, is the sum of the widths of six heat exchange facets of one second intermediate heat exchange surface first segment 611 and six heat exchange facets of one second intermediate heat exchange surface second segment 612 (which can be considered to be twice the sum of the widths of the six heat exchange facets 6111-6116 of the second intermediate heat exchange surface first segment 611, namely the third heat exchange width W3=2*(W31+W32+W33+W34+W35+W36)). The third heat exchange width W3 of the at least one of the second intermediate heat exchange surfaces 610 of the third side plates 61, 62 of the intermediate thermal management component 600 is smaller than the first heat exchange width W1 of the at least one of the first heat exchange surfaces 410 of the edge thermal management component 400, namely W3<W1. The first heat exchange width of the first heat exchange surface 510 of the edge thermal management component 500 is also W1.

Further, the third heat exchange area S3 of the at least one of the second intermediate heat exchange surfaces 610 of the third side plates 61, 62 of the intermediate thermal management component 600 is also smaller than the first heat exchange area S1 of the at least one of the first heat exchange surfaces 410 of the edge thermal management component 400, namely S3<S1. The heat exchange area of the first heat exchange surface 510 of the edge thermal management component 500 is also the first heat exchange area S1.

In some embodiments, the ratio of the third heat exchange width W3 to the first heat exchange width W1 is between 0.1-0.9. For example, W3/W1 may be selected among 0.15, 0.2, 0.25, 0.3, 0.35, 0.4, 0.45, 0.5, 0.6, 0.65, 0.7, 0.75, 0.8 and 0.85, but not limited to these specific values. The third heat exchange width W3 and the second heat exchange width W2 may be the same or different, and the combination of W3, W2 and W1 may be selected according to actual requirements.

In some embodiments, the ratio of the third heat exchange area S3 to the first heat exchange area S1 is between 0.1-0.9. S3/S1 may be selected among 0.15, 0.2, 0.25, 0.3, 0.35, 0.4, 0.45, 0.5, 0.6, 0.65, 0.7, 0.75, 0.8, 0.85, but not limited to these specific values. The third heat exchange area S3 and the second heat exchange area S2 may be the same or different, and the combination of S3, S2 and S1 may be selected according to actual requirements.

In some embodiments not shown in the figures, the intermediate thermal management component 600 is further provided with a second turbulator portion arranged in the third side flow channel. In some embodiments, the second turbulator portion is arranged at a portion of the third side flow channel that does not cooperate with any of the intermediate battery units 14, and the second turbulator portion is configured to generate a turbulent flow of the heat exchange fluid flowing through the third side flow channel. For the position and way in which the second turbulator portion is arranged, reference may be made to the foregoing embodiments.

Figure 30:
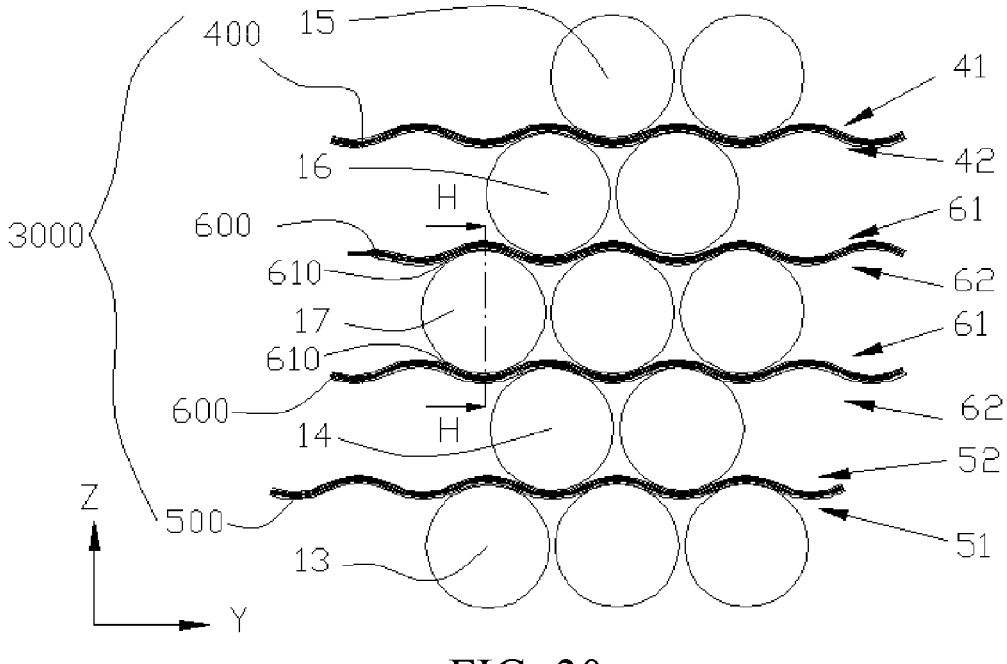
FIG. 30 is a schematic diagram of a battery having a five-layer battery unit structure according to an embodiment of the present application.
Figure 31:
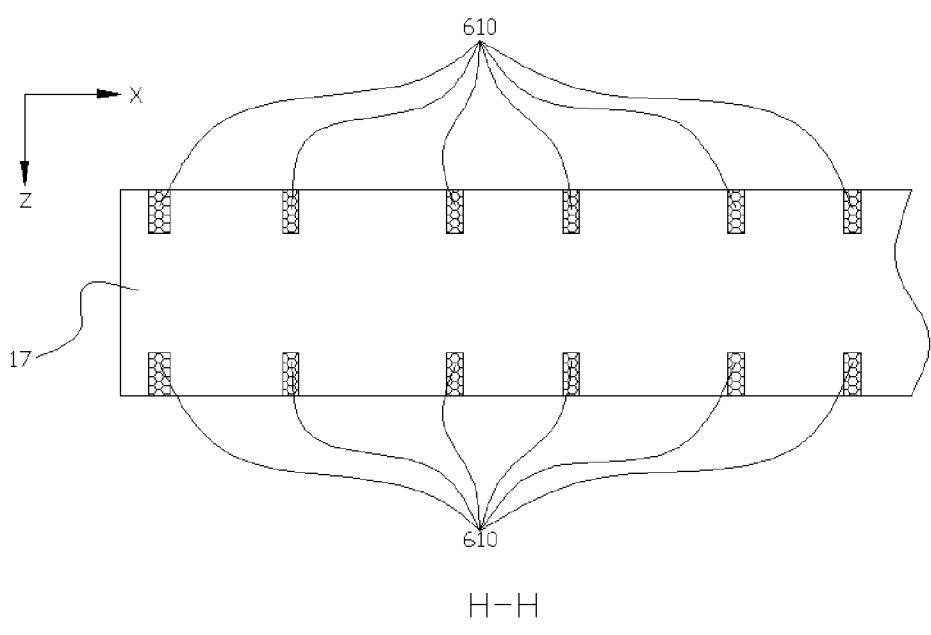
FIG. 31 is a schematic cross-sectional view of a heat exchange portion between the battery unit and a heat exchange surface segment of the thermal management component, along H-H portion in FIG. 30.

In some embodiments, as shown in FIG. 30, the temperature regulation system 3000 differs from the temperature regulation system 2000 in FIG. 20 in that there are two or more intermediate thermal management components 600, in addition to a layer of intermediate battery units 14, 16 provided between each edge thermal management component 400, 500 and an adjacent intermediate thermal management component 600, a layer of intermediate battery units 17 is also provided between two adjacent intermediate thermal management components 600; and the outer battery units 13, 15 and the intermediate battery units 14, 16 have the same temperature regulation method as the regulation method in FIG. 28, and the description will not be repeated. The temperature regulation method of the intermediate battery unit 17 will be described below.

Specifically, taking the intermediate battery unit 17 as an example, upper and lower side faces of the intermediate battery unit 17 both exchange heat with the second intermediate heat exchange surfaces 610 of the third side plates 61 of the intermediate thermal management components 600 on two sides, and the heat exchange area is the third heat exchange area S3, so the total heat exchange area between the intermediate battery unit 16 and two intermediate thermal management components 600 is twice the third heat exchange area S3, namely 2S3.

The ratio of the third heat exchange area S3 to the first heat exchange area S1 is between 0.1-0.9. Therefore, in the battery of this embodiment, the ratio of the total heat exchange area of the intermediate battery unit 17 to that of the outer battery unit 13, 15 is the ratio 2S3/S1 of twice the second heat exchange area S3 to the first heat exchange area S1, which may be between 0.2-1.8. In some embodiments, 2S3/S1 may be 0.3, 0.4, 0.5, 0.6, 0.7, 0.8, 0.9, 1.0, 1.1, 1.2, 1.3, 1.4, 1.5, 1.6, 1.7, etc., but not limited to these specific values. The total heat exchange area ratio 2S3/S1 of the intermediate battery unit 17 to the outer battery unit 13, 15 can be selected in an appropriate range according to actual requirements. As an example, when the intermediate battery unit 17 and the outer battery unit 13, 15 are of the same type, 2S3/S1 may be between 0.3-1.2, for example, between 0.4-1.0 or 0.3-0.6, or 0.6-0.8. In this way, the intermediate battery unit 17 and the outer battery units 13, 15 can obtain substantially the same cooling effect, so that the temperatures and performances of the intermediate battery units 17 and the outer battery units 13, 15 are kept consistent, and the battery has more stable performance, good reliability and longer life. As another example, when the heat dissipation effect of the intermediate battery unit 17 is poor, or the intermediate battery unit 17 and the outer battery units 13, 15 are of different types, etc., so that the intermediate battery unit 17 needs a stronger cooling effect, 2S3/S1 may also be between 1.2-1.8, for example, between 1.3-1.6 or 1.4-1.5. In this way, the intermediate battery 17 can obtain stronger temperature regulation performance. By adjusting the specific ratio of S1, S2 and S3, the temperatures and performances of the intermediate battery unit 14 and the intermediate battery units 14, 16 and the outer battery units 13, 15 are kept consistent, and the battery has more stable performance, good reliability and longer life.

Therefore, the battery of this embodiment can realize the freely adjustable cooling effects of the intermediate battery units 17, 14, 16 and the outer battery units 13, 15 by adjusting the ratio of S1, S2 and S3, and can then be compatible with different types of batteries, so as to meet different temperature regulation performance requirements of batteries at different portions. In addition, by using the intermediate thermal management component, the battery can achieve temperature regulation of four or more layers of battery units, the two side plates of each thermal management component can be both used for performing temperature regulation on the battery units, and the number of thermal management components is one less than the number of layers of battery units. The overall thickness of the battery is reduced, and a better space adaptability is provided. In addition, the second heat exchange area S2 and the third heat exchange area S3 may be the same or different, so that the size and ratio relationship of the first heat exchange area S1, the second heat exchange area S2 and the third heat exchange area S3 can be adjusted by combining different edge thermal management components and intermediate management components, various forms of battery units can be the combined, and differentiated design and more precise temperature regulation control can be implemented for different temperature regulation performance requirements of battery cooling units of each layer and the temperature difference of the heat exchange fluid in the thermal management components at various positions, so that the temperatures and performances of the intermediate battery units 14 and the outer battery units 13, 15 are kept consistent, and the battery has more stable performance, good reliability and longer life.

In this embodiment, the ratio relationship between the third heat exchange area S3 and the first heat exchange area S1 can be precisely adjusted by adjusting the width/area of the branch flow channels and the number of branch flow channels on the third side plates 61, 62, and an appropriate ratio of the third heat exchange area S3 to the first heat exchange area S1 is determined according to actual requirements, so as to adjust the ratios of (S2+S3)/S1 and 2S3/S1.

In some embodiments, the two edge thermal management components 400, 500 and the intermediate thermal management component 600 are in heat exchange fluid communication with each other, and the heat exchange fluid communication may be series connection or parallel connection, which will not be limited in the present application. Of course, the two edge thermal management components 400, 500 and the intermediate thermal management component may alternatively be not in communication with each other and operate independently.

Figure 32:
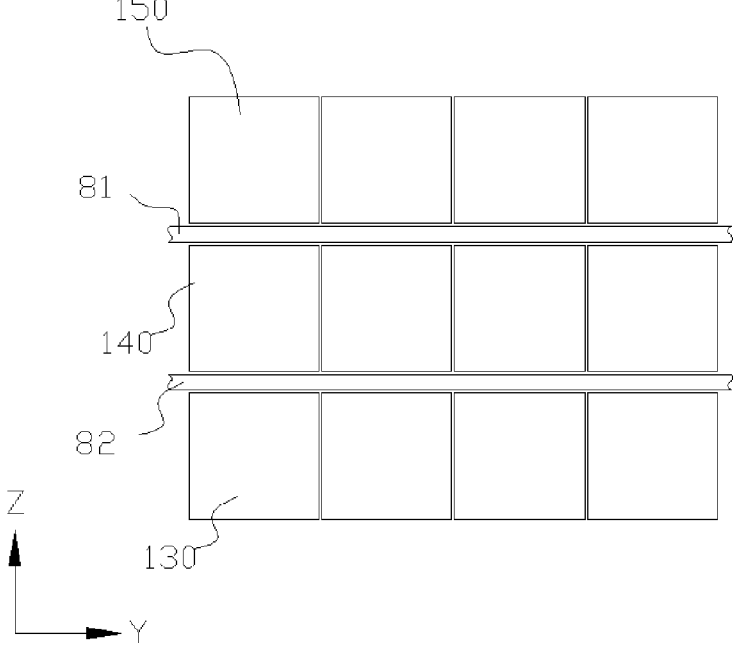
FIG. 32 is a schematic diagram of a battery using a cylindrical battery unit with a quadrangular cross-section according to an embodiment of the present application.

In some embodiments, as shown in FIG. 32, the battery units 130, 140, 150 are cylindrical batteries with a quadrangular cross-section, and the thermal management components 81, 82 are formed in a flat plate shape to match the shape of the battery units 130, 140, 150. The cross-sectional structures of the thermal management components 81, 82 are the same as those of the edge thermal management components 400, 500 in FIG. 23.

Figure 33:
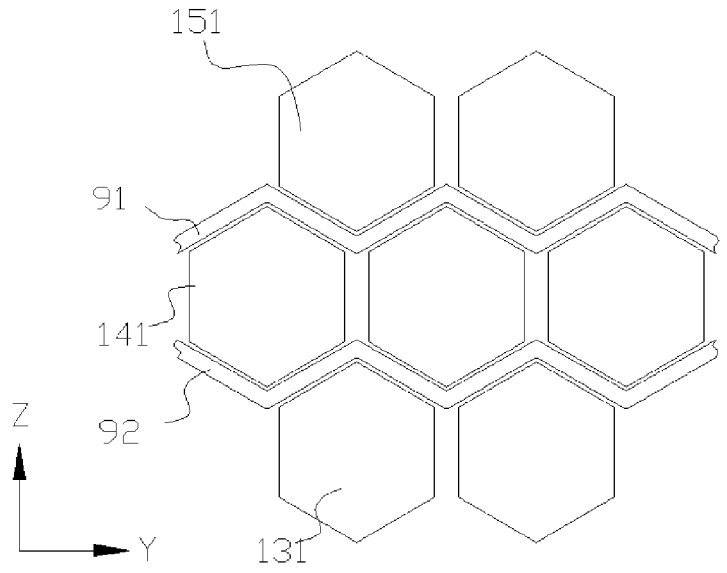
FIG. 33 is a schematic diagram of a battery using a cylindrical battery unit with a hexagonal cross-section according to an embodiment of the present application.

In some embodiments, as shown in FIG. 33, the battery units 131, 141, 151 are cylindrical batteries with a hexagonal cross-section, and the thermal management components 91, 92 are formed in a triangular wave shape to match the shape of the battery units 131, 141, 151. The cross-sectional structures of the thermal management components 91, 92 are the same as those of the edge thermal management components 400, 500 in FIG. 23.

In the embodiments shown in FIGS. 32 and 33, the thermal management component is formed into a flat plate or wave shape in the length direction to match the shape of the battery unit, which can better fit the battery unit and obtain a higher heat exchange efficiency and a better heat exchange effect.

A third aspect of the embodiments of the present invention further provides a powered device, comprising the battery described in the above embodiments, the battery being configured to supply electrical energy. The battery described in the embodiments of the present application is suitable for various powered devices using the battery, such as a mobile phone, a portable apparatus, a laptop, an electromobile, an electric vehicle, a ship, a spacecraft, an electronic toy, an electric tool, etc. For example, the spacecraft includes an airplane, a rocket, a space shuttle, a spaceship and the like; the electronic toy includes a fixed or mobile electronic toy, such as a game console, an electric vehicle toy, an electric ship toy, an electric aircraft toy and the like; and the electric tool includes a metal-cutting power tool, a grinding power tool, an assembly power tool and a railway power tool, such as an electric drill, an electric grinder, an electric wrench, an electric screwdriver, an electric hammer, an electric impact drill, a concrete vibrator and an electric planer.

Figure 34:
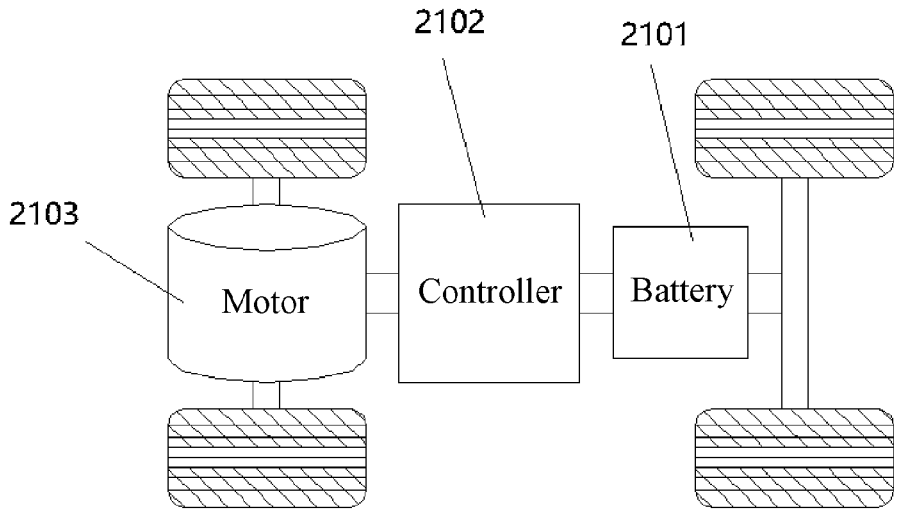
FIG. 34 is a schematic structural diagram of a powered device according to another embodiment of the present application.

For example, as shown in FIG. 34, which is a schematic structural diagram of a powered device according to another embodiment of the present application. The powered device may be a vehicle, which may be a fuel vehicle, a gas vehicle or a new-energy vehicle. The new-energy vehicle may be an all-electric vehicle, a hybrid vehicle, an extended-range electric vehicle, etc. The vehicle comprises a battery 2101, a controller 2102 and a motor 2103. The battery 2101 is configured to supply power to the controller 2102 and the motor 2103 as the operating power and driving power of the vehicle. For example, the battery 2101 is used for meeting the working power requirements of the vehicle during starting, navigating and running. For example, the battery 2101 supplies power to the controller 2102, the controller 2102 controls the battery 2101 to supply power to the motor 2103, and the motor 2103 receives and uses the power from the battery 2101 as the driving power of the vehicle, replacing or partially replacing the driving power provided by the fuel or natural gas for the vehicle.

Finally, it should be noted that the above embodiments are merely used for illustrating rather than limiting the technical solutions of the present application. Although the present application has been described in detail with reference to the above embodiments, those of ordinary skill in the art should understood that the technical solutions specified in the above various embodiments can still be modified, or some of the technical features therein can be equivalently substituted; but such modifications or substitutions do not make the essence of the corresponding technical solutions depart from the spirit and scope of the technical solutions of the various embodiments of the present application.

The invention claimed is:

1. A battery, comprising:

at least three layers of battery units, comprising two layers of outer battery units and at least one layer of intermediate battery units, the at least one layer of intermediate battery units being located between the two layers of outer battery units, and each layer of outer battery units and each layer of intermediate battery units respectively comprising a plurality of battery units;

a temperature regulation system configured to exchange heat with the outer battery units and with the intermediate battery units, the temperature regulation system comprising two sets of first heat exchange surfaces and a plurality of sets of second heat exchange surfaces, each set of first heat exchange surfaces comprising a plurality of the first heat exchange surfaces, each set of second heat exchange surfaces comprising a plurality of the second heat exchange surfaces, and the first heat exchange surfaces and the second heat exchange surfaces being capable of exchanging heat with a heat exchange fluid inside the temperature regulation system, wherein the temperature regulation system is configured such that a set of side faces of each layer of outer battery units cooperate with a set of first heat exchange surfaces for temperature regulation, wherein a side face of each outer battery unit cooperates with one of the first heat exchange surfaces for temperature regulation, and each of the first heat exchange surfaces has a first heat exchange area S1;

each layer of intermediate battery units is arranged between two sets of second heat exchange surfaces, and two sets of opposite side faces of each layer of intermediate battery units respectively cooperate with an adjacent set of second heat exchange surfaces for temperature regulation; two opposite side faces of each intermediate battery unit respectively cooperate with an adjacent second heat exchange surface for temperature regulation, and each of the second heat exchange surfaces has a second heat exchange area S2; and the first heat exchange area S1 is greater than the second heat exchange surface area S2.

2. The battery according to claim 1, wherein three layers of battery units are provided, comprising two layers of outer battery units and one layer of intermediate battery units;

the temperature regulation system comprises two edge thermal management components in each of which a first heat exchange flow channel is formed, the heat exchange flow channel being configured to provide a movement path of the heat exchange fluid; the edge thermal management component comprises a first side plate and a second side plate that are arranged opposite to each other; a set of the first heat exchange surfaces are formed on the first side plate;

the plurality of sets of second heat exchange surfaces comprise two sets of second edge heat exchange surfaces, each set of second edge heat exchange surfaces comprising a plurality of second edge heat exchange surfaces; a set of the second edge heat exchange surfaces are formed on each of the second side plates of the two edge thermal management components the two second side plates of the two edge thermal management components are adjacent to each other, and the two first side plates are opposite to each other;

a layer of the outer battery units is arranged on each of the first side plates of the two edge thermal management components, and a side face of each of the outer battery units cooperates with a corresponding one of the first heat exchange surfaces; and a layer of the intermediate battery units is arranged between the two edge thermal management components, and two opposite side faces of each of the intermediate battery units respectively cooperate with one of the second edge heat exchange surfaces of the two edge thermal management components.

3. The battery according to claim 1, wherein four or more layers of battery units are provided, comprising two layers of outer battery units and at least two layers of intermediate battery units;

the temperature regulation system comprises two edge thermal management components in each of which a first heat exchange flow channel is formed, the first heat exchange flow channel being configured to provide a movement path of the heat exchange fluid; the edge thermal management component comprises a first side plate and a second side plate that are arranged opposite to each other; a set of the first heat exchange surfaces are formed on the first side plate;

the plurality of sets of second heat exchange surfaces comprise two sets of second edge heat exchange surfaces, each set of second edge heat exchange surfaces comprising a plurality of second edge heat exchange surfaces; a set of the second edge heat exchange surfaces are formed on each of the second side plates of the two edge thermal management components;

the temperature regulation system further comprises at least one intermediate thermal management component in each of which a second heat exchange flow channel is formed, the second heat exchange flow channel also being configured to provide a movement path of the heat exchange fluid; each intermediate thermal management component comprises two third side plates on opposite sides; the plurality of sets of second heat exchange surfaces further comprises a plurality of sets of second intermediate heat exchange surfaces, wherein a set of the second intermediate heat exchange surfaces are formed on each of the third side plates, and each set of second intermediate heat exchange surfaces comprises a plurality of the second intermediate heat exchange surfaces; each of the second intermediate heat exchange surfaces has a third heat exchange area S3; the first heat exchange area S1 is greater than the third heat exchange area S3;

the number of the intermediate thermal management components is the number of layers of the battery units minus 3;

wherein the at least one intermediate thermal management component is arranged between the two edge thermal management components; the two second side plates of the two edge thermal management components are respectively adjacent to one of the third side plates of one of the intermediate thermal management components; the two first side plates of the two edge thermal management components are opposite to each other;

a layer of the outer battery units is arranged on each of the first side plates of the two edge thermal management components, and each of the outer battery units cooperates with one of the first heat exchange surfaces of the corresponding first side plate; wherein a layer of intermediate battery units is arranged between each of the edge thermal management components and an adjacent one of the intermediate thermal management components; in the layer of intermediate battery units cooperating with the edge thermal management component, a side face of each of the intermediate battery units cooperates with one of the second edge heat exchange surfaces of the second side face of the edge thermal management component, and a further side face of each of the intermediate battery units cooperates with one of the second intermediate heat exchange surfaces of the third side plate of the one of the intermediate thermal management components, and/or a layer of intermediate battery units is further arranged between every two adjacent intermediate thermal management components, and in a layer of intermediate battery units cooperating with the intermediate thermal management components on two sides, two side faces of each of the intermediate battery units respectively cooperate with one of the second intermediate heat exchange surfaces of the opposite third side plates of the two intermediate thermal management components.

4. The battery according to claim 2, wherein a first side flow channel is formed in the first side plate of the edge thermal management component, and a portion of the first side flow channel that cooperates with a layer of the outer battery units forms the plurality of the first heat exchange surfaces;

a second side flow channel is formed in the second side plate of the edge thermal management component, and a portion of the second side flow channel that cooperates with a layer of the intermediate battery units forms the plurality of the second edge heat exchange surfaces; and the first side flow channel and the second side flow channel are combined to form the first heat exchange flow channel.

5. The battery according to claim 4, wherein one first side flow channel is provided, a portion of the first side flow channel that cooperates with one of the outer battery units forms the one of the first heat exchange surfaces, and the first heat exchange area S1 is a surface area of the first heat exchange surface; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet;

the one of the second edge heat exchange surfaces comprises a plurality of second edge heat exchange facets cooperating with one of the intermediate battery units; and the second heat exchange area S2 is a sum of the surface areas of the plurality of second edge heat exchange facets.

6. The battery according to claim 5, wherein the first side flow channel and the plurality of second side branch flow channels are in communication with each other to form the first heat exchange flow channel.

7. The battery according to claim 6, wherein each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is the width of the portion of the first side flow channel that cooperates with one of the outer battery units; the second heat exchange width W2 is a sum of the widths of the plurality of second edge heat exchange facets; and the ratio of the second heat exchange width W2 to the first heat exchange width W1 is between 0.1-0.9.

8. The battery according to claim 4, wherein the first side flow channel comprises a plurality of first side branch flow channels arranged in parallel perpendicular to a flow direction of the heat exchange fluid, and a part of each first side branch flow channel that cooperates with one of the outer battery units forms a first heat exchange facet; each of the first heat exchange surfaces comprises a plurality of first heat exchange facets cooperating with one of the outer battery units; the first heat exchange area S1 is a sum of the surface areas of the plurality of first heat exchange facets; the second side flow channel comprises a plurality of second side branch flow channels arranged in parallel perpendicular to the flow direction of the heat exchange fluid, and a part of each second side branch flow channel that cooperates with one of the intermediate battery units forms a second edge heat exchange facet; each of the second edge heat exchange surfaces comprises a plurality of second edge heat exchange facets cooperating with one of the intermediate battery units; and the second heat exchange area S2 is a sum of the surface areas of the plurality of second edge heat exchange facets.

9. The battery according to claim 8, wherein each of the first heat exchange surfaces has a first heat exchange width W1, and each of the second edge heat exchange surfaces has a second heat exchange width W2, the first heat exchange width W1 being greater than the second heat exchange width W2, wherein the first heat exchange width W1 is a sum of the widths of the plurality of first heat exchange facets, and the second heat exchange width W2 is a sum of the widths of the plurality of second edge heat exchange facets; and the ratio of the second heat exchange width W2 to the first heat exchange width W1 is between 0.1-0.9.

10. The battery according to claim 8, wherein the first heat exchange flow channel comprises a plurality of first flow sub-channels arranged in parallel perpendicular to the flow direction of the heat exchange fluid, each first flow sub-channel comprises at least one of the first side branch flow channels and at least one of the second side branch flow channels, and the first and second side branch flow channels constituting one of the first flow sub-channels are in communication with each other.

11. The battery according to claim 3, wherein a third side flow channel is formed in each of the third side plates of the intermediate thermal management component, and a portion of each of the third side flow channels that cooperates with a layer of the intermediate battery units forms a set of the second intermediate heat exchange surfaces; and the third side flow channels of the two opposite third side plates are combined to form the second heat exchange flow channel.

12. The battery according to claim 11, wherein the third side flow channel comprises a plurality of third side branch flow channels arranged in parallel perpendicular to the flow direction of the heat exchange fluid, and a portion of each of the third side branch flow channels that cooperates with one of the intermediate battery units forms a second intermediate heat exchange facet; each of the second intermediate heat exchange surfaces comprises a plurality of second intermediate heat exchange facets cooperating with one of the intermediate battery units; and the third heat exchange area S3 is a sum of the surface areas of the plurality of second intermediate heat exchange facets.

13. A powered device, comprising a battery of claim 1.

14. The battery according to claim 2, wherein the thermal management component further comprises a first turbulator portion, the first turbulator portion is arranged in the first side flow channel and/or the second side flow channel, the first turbulator portion is configured to generate a turbulent flow of the heat exchange fluid flowing through the first side flow channel and/or the second side flow channel.

* * * * *